(12) United States Patent
Betzer-Zilevitch

(10) Patent No.: US 8,789,608 B2
(45) Date of Patent: *Jul. 29, 2014

(54) STEAM GENERATION PROCESS FOR ENHANCED OIL RECOVERY

(75) Inventor: Maoz Betzer-Zilevitch, SW Calgary (CA)

(73) Assignee: Ex-Tar Technologies Inc., SW Calgary, Alberta (CA)

( * ) Notice: Subject to any disclaimer, the term of this patent is extended or adjusted under 35 U.S.C. 154(b) by 1265 days.

This patent is subject to a terminal disclaimer.

(21) Appl. No.: 12/635,597

(22) Filed: Dec. 10, 2009

(65) Prior Publication Data

US 2010/0170453 A1    Jul. 8, 2010

Related U.S. Application Data

(60) Provisional application No. 61/122,195, filed on Dec. 12, 2008.

(30) Foreign Application Priority Data

May 12, 2009    (CA) .................................. 2665751

(51) Int. Cl.
*E21B 43/00*    (2006.01)
*E21B 43/24*    (2006.01)

(52) U.S. Cl.
USPC ................... 166/369; 166/272.3; 166/75.11; 122/6 R

(58) Field of Classification Search
None
See application file for complete search history.

(56) References Cited

U.S. PATENT DOCUMENTS

| | | | |
|---|---|---|---|
| 6,536,523 B1 | 3/2003 | Kresnyak et al. | |
| 6,733,636 B1 | 5/2004 | Heins | |
| 7,578,345 B2 | 8/2009 | Minnich et al. | |
| 7,591,311 B2 | 9/2009 | Minnich et al. | |
| 8,424,601 B2 * | 4/2013 | Betzer-Zilevitch | 166/272.3 |
| 2006/0032630 A1 * | 2/2006 | Heins | 166/266 |
| 2010/0282644 A1 * | 11/2010 | O'Connor et al. | 208/427 |

FOREIGN PATENT DOCUMENTS

| | | |
|---|---|---|
| CA | 2547503 A | 6/2005 |
| CA | 2609419 A1 | 11/2007 |
| CA | 2609859 A1 | 11/2007 |
| CA | 2610052 A1 | 11/2007 |

OTHER PUBLICATIONS

Heins, et al, "World First SAGD facility Using Evaporators, Drum Boilers, and Zero Liquid Discharge Crystallizer to treat Produced Water", Paper 2005-115, 2005 Canadian International Petroleum Conference, 2005.
Giesbrecht, Gary, Canadian Heavy Oil Association presentation, Petro-Canada, Feb. 13, 2007.

* cited by examiner

*Primary Examiner* — Angela M DiTrani
(74) *Attorney, Agent, or Firm* — Andrew W. Chu; Craft Chu PLLC

(57) ABSTRACT

The system and method for steam production for extraction of heavy bitumen includes a method of mixing fuel and oxidizing gases, combusting the mixture, mixing combustion gas with water containing solids and organics, separating solids, using heat from the separated gas to produce distilled water, recycling the distillation facility brine with the combustion gas and removing solids thereof, generating steam from the distilled water and injecting the steam through an injection well or using it above ground for oil recovery. The system includes a combustion boiler, a direct contact steam generator, a gas-solids separator, and a heat exchanger with a water treatment facility like a distillation facility. The water feed of the present invention can be water separated from produced oil and/or low quality water salvaged from industrial plants, such as refineries and tailings as make-up water.

19 Claims, 32 Drawing Sheets

Simulation pressure-1500 kpa at the produced steam discharge

|  | S-1(O2) | S-2(fuel) | S-5 | S-7 | S-9 | S-10 | stream/NCG mix product S-11 |
|---|---:|---:|---:|---:|---:|---:|---:|
| T,C | 25.00 | 25.00 | 25.00 | 289.39 | 289.39 | 25.00 | 192.23 |
| Vapor fraction | 0.45 | 0.00 | 0.00 | 0.97 | 0.00 | 0.00 | 1.00 |
| Enthalpy , MJ/h | -32752.59 | -15890.46 | -128297.60 | -178942.00 | -7954.88 | -17215.22 | -188187.80 |
| mass Flow rate, kg/h | 5262.13 | 2070.00 | 8660.08 | 15992.22 | 1265.73 | 1085.00 | 15811.50 |
| Water | 2000.00 | 1000.00 | 7673.08 | 10673.08 | 0.00 | 1085.00 | 11758.08 |
| Petcoke | 0.00 | 1000.00 | 0.00 | 0.00 | 0.00 | 0.00 | 0.00 |
| CO2 | 0.00 | 0.00 | 0.00 | 3760.23 | 0.00 | 0.00 | 3760.23 |
| Oxygen | 2879.91 | 0.00 | 0.00 | 110.97 | 0.00 | 0.00 | 110.97 |
| Ar | 182.22 | 0.00 | 0.00 | 182.22 | 0.00 | 0.00 | 182.22 |
| Water solids | 200.00 | 0.00 | 767.00 | 967.00 | 967.00 | 0.00 | 0.00 |
| Sulfur | 0.00 | 70.00 | 0.00 | 0.00 | 0.00 | 0.00 | 0.00 |
| Lime stone | 0.00 | 0.00 | 220.00 | 1.47 | 1.47 | 0.00 | 0.00 |
| CaSO3/CaSO4(HYDRATE) | 0.00 | 0.00 | 0.00 | 297.25 | 297.25 | 0.00 | 0.00 |

Simulation pressure-200 kpa at the produced steam discharge

|  | S-1(O2) | S-2(fuel) | S-5 | S-7 | S-9 | S-10 | S-11 |
|---|---:|---:|---:|---:|---:|---:|---:|
| T,C | 25.00 | 25.00 | 25.00 | 285.03 | 285.03 | 25.00 | 116.27 |
| Vapor fraction | 0.36 | 0.00 | 0.00 | 0.97 | 0.00 | 0.00 | 1.00 |
| Enthalpy , MJ/h | -49059.23 | -15890.46 | -111008.30 | -178375.30 | -8443.73 | -26338.49 | -196268.30 |
| Mass Flow rate, kg/h | 6362.13 | 2070.00 | 7498.37 | 16028.98 | 1365.75 | 1660.00 | 16323.26 |
| Water | 3000.00 | 1000.00 | 6617.37 | 10609.84 | 0.00 | 1660.00 | 12269.84 |
| Petcoke | 0.00 | 1000.00 | 0.00 | 0.00 | 0.00 | 0.00 | 0.00 |
| CO2 | 0.00 | 0.00 | 0.00 | 3760.23 | 0.00 | 0.00 | 3760.23 |
| Oxygen | 2879.91 | 0.00 | 0.00 | 110.97 | 0.00 | 0.00 | 110.97 |
| Ar | 182.22 | 0.00 | 0.00 | 182.22 | 0.00 | 0.00 | 182.22 |
| Water solids | 300.00 | 0.00 | 661.00 | 1067.00 | 1067.00 | 0.00 | 0.00 |
| Sulfur | 0.00 | 70.00 | 0.00 | 0.00 | 0.00 | 0.00 | 0.00 |
| Lime stone | 0.00 | 0.00 | 220.00 | 1.47 | 1.47 | 0.00 | 0.00 |
| CaSO3/CaSO4(HYDRATE) | 0.00 | 0.00 | 0.00 | 297.25 | 297.25 | 0.00 | 0.00 |

Simulation pressure-103 kpa at the produced steam discharge

|  | S-1(O2) | S-2(fuel) | S-5 | S-7 | S-9 | S-10 | S-11 |
|---|---:|---:|---:|---:|---:|---:|---:|
| T,C | 25.00 | 25.00 | 25.00 | 285.85 | 285.85 | 25.00 | 96.76 |
| Vapor fraction | 0.37 | 0.00 | 0.00 | 0.97 | 0.00 | 0.00 | 1.00 |
| Enthalpy , MJ/h | -48993.34 | -15890.46 | -111124.60 | -178003.40 | -7929.33 | -29353.13 | -199426.30 |
| Mass Flow rate, kg/h | 6362.13 | 2070.00 | 7506.38 | 15937.52 | 1259.72 | 1850.00 | 16527.80 |
| Water | 3000.00 | 1000.00 | 6624.38 | 10624.38 | 0.00 | 1850.00 | 12474.38 |
| Petcoke | 0.00 | 1000.00 | 0.00 | 0.00 | 0.00 | 0.00 | 0.00 |
| CO2 | 0.00 | 0.00 | 0.00 | 3760.23 | 0.00 | 0.00 | 3760.23 |
| Oxygen | 2879.91 | 0.00 | 0.00 | 110.97 | 0.00 | 0.00 | 110.97 |
| Ar | 182.22 | 0.00 | 0.00 | 182.22 | 0.00 | 0.00 | 182.22 |
| Water solids | 300.00 | 0.00 | 662.00 | 961.00 | 961.00 | 0.00 | 0.00 |
| sulfur | 0.00 | 70.00 | 0.00 | 0.00 | 0.00 | 0.00 | 0.00 |
| Lime stone | 0.00 | 0.00 | 220.00 | 1.47 | 1.47 | 0.00 | 0.00 |
| CaSO3/CaSO4(HYDRATE) | 0.00 | 0.00 | 0.00 | 297.25 | 297.25 | 0.00 | 0.00 |

FIG. 21

FIG 17 / H&M Balance / System pressure - 5bar

| | 41 (AIR) | 42 (FUEL) | 14 (BRINE) | PURGE | 14 (BRINE IN) | Flow (13) | Flow 12 |
|---|---|---|---|---|---|---|---|
| T, C | 25.00 | 25.00 | 75.85 | 75.85 | 75.85 | 200.26 | 200.26 |
| P, bar | 1.00 | 5.00 | 0.40 | 0.40 | 0.40 | 5.00 | 5.00 |
| Vapor Fraction | 1.00 | 0.00 | 0.00 | 0.00 | 0.00 | 0.97 | 1.00 |
| Enthalpy, MJ/h | -68.30 | -15866.56 | -216078.00 | -8643.12 | -207435.00 | -220438.50 | -203924.00 |
| Mass Flowrate, kg/h | 12527.84 | 2070.00 | 14370.01 | 574.80 | 13795.21 | 28393.07 | 26767.17 |
| H2O | 0.00 | 1000.00 | 12850.01 | 514.00 | 12336.01 | 13336.01 | 13169.31 |
| Petcoke | 0.00 | 1000.00 | 0.00 | 0.00 | 0.00 | 0.00 | 0.00 |
| CO2 | 7.70 | 0.00 | 0.00 | 0.00 | 0.00 | 3671.84 | 3671.84 |
| N2 | 9573.56 | 0.00 | 0.00 | 0.00 | 0.00 | 9573.56 | 9573.56 |
| O2 | 2930.56 | 0.00 | 0.00 | 0.00 | 0.00 | 196.55 | 196.55 |
| Ar | 16.03 | 0.00 | 0.00 | 0.00 | 0.00 | 16.03 | 16.03 |
| SO2 | 0.00 | 0.00 | 0.00 | 0.00 | 0.00 | 139.88 | 139.88 |
| S | 0.00 | 70.00 | 0.00 | 0.00 | 0.00 | 0.00 | 0.00 |
| CaCO3 | 0.00 | 0.00 | 0.00 | 0.00 | 0.00 | 0.00 | 0.00 |
| TDS / Solids | 0.00 | 0.00 | 1520.00 | 60.80 | 1459.20 | 1459.20 | 0.00 |
| CH4 | 0.00 | 0.00 | 0.00 | 0.00 | 0.00 | 0.00 | 0.00 |

| | Flow 17 | Flow 19 | Flow 22 | STEAM TO MED (26) | STEAM FROM MED (27) | Flow 45 | NCG (40) |
|---|---|---|---|---|---|---|---|
| T, C | 200.26 | 25.00 | 135.46 | 110.00 | 90.00 | 115.00 | 115.00 |
| P, bar | 5.00 | 5.00 | 5.00 | 1.00 | 1.00 | 5.00 | 5.00 |
| Vapor Fraction | 0.00 | 0.00 | 1.00 | 1.00 | 0.00 | 0.55 | 1.00 |
| Enthalpy, MJ/h | -16631.54 | -66481.40 | -210402.40 | -124439.50 | -146343.50 | -232306.40 | -84428.02 |
| Mass Flowrate, kg/h | 1625.90 | 4250.00 | 26974.64 | 9384.27 | 9384.27 | 26974.64 | 17425.78 |
| H2O | 166.70 | 4000.00 | 13513.92 | 9384.27 | 9384.27 | 13513.92 | 3968.12 |
| Petcoke | 0.00 | 0.00 | 0.00 | 0.00 | 0.00 | 0.00 | 0.00 |
| CO2 | 0.00 | 0.00 | 3671.84 | 0.00 | 0.00 | 3671.84 | 3669.37 |
| N2 | 0.00 | 0.00 | 9573.44 | 0.00 | 0.00 | 9573.44 | 9573.19 |
| O2 | 0.00 | 0.00 | 196.54 | 0.00 | 0.00 | 196.54 | 196.54 |
| Ar | 0.00 | 0.00 | 16.03 | 0.00 | 0.00 | 16.03 | 16.03 |
| SO2 | 0.00 | 0.00 | 2.81 | 0.00 | 0.00 | 2.81 | 2.54 |
| S | 0.00 | 0.00 | 0.00 | 0.00 | 0.00 | 0.00 | 0.00 |
| CaCO3 | 0.00 | 250.00 | 0.06 | 0.00 | 0.00 | 0.06 | 0.00 |
| TDS / Solids | 1459.20 | 0.00 | 0.00 | 0.00 | 0.00 | 0.00 | 0.00 |

| | Condensate (29) | Brine (38) | DISTILLATE (37) | Injection Steam (5) | BFW (29) | Feed Water (1) |
|---|---|---|---|---|---|---|
| T, C | 115.00 | 75.85 | 75.85 | 300.00 | 88.67 | 20.00 |
| P, bar | 5.00 | 0.40 | 0.40 | 80.00 | 80.00 | 0.60 |
| Vapor Fraction | 0.00 | 0.01 | 0.00 | 1.00 | 0.00 | 0.00 |
| Enthalpy, MJ/h | -147878.40 | -211395.40 | -424793.10 | -484482.10 | -572200.00 | -645887.10 |
| Mass Flowrate, kg/h | 9548.85 | 14370.01 | 27149.99 | 36698.84 | 36698.84 | 41520.00 |
| H2O | 9545.80 | 12850.01 | 27149.99 | 36695.79 | 36695.79 | 40000.00 |
| Petcoke | 0.00 | 0.00 | 0.00 | 0.00 | 0.00 | 0.00 |
| CO2 | 2.47 | 0.00 | 0.00 | 2.47 | 2.47 | 0.00 |
| N2 | 0.25 | 0.00 | 0.00 | 0.25 | 0.25 | 0.00 |
| O2 | 0.01 | 0.00 | 0.00 | 0.01 | 0.01 | 0.00 |
| SO2 | 0.26 | 0.00 | 0.00 | 0.26 | 0.26 | 0.00 |
| S | 0.00 | 0.00 | 0.00 | 0.00 | 0.00 | 0.00 |
| CaCO3 | 0.06 | 0.00 | 0.00 | 0.06 | 0.06 | 0.00 |
| TDS / Solids | 0.00 | 1520.00 | 0.00 | 0.00 | 0.00 | 1520.00 |

FIG. 22

FIG 17 / H&M Balance / System pressure - 10bar

|  | 41 (AIR) | 42 (FUEL) | 14 (BRINE) | PURGE | 14 (BRINE IN) | Flow (13) | Flow 12 |
|---|---|---|---|---|---|---|---|
| T, C | 25.00 | 25.00 | 75.85 | 75.85 | 75.85 | 198.76 | 198.76 |
| P, bar | 1.00 | 10.00 | 0.40 | 0.40 | 0.40 | 10.00 | 10.00 |
| Vapor Fraction | 1.00 | 0.00 | 0.00 | 0.00 | 0.00 | 0.96 | 1.00 |
| Enthalpy, MJ/h | -68.30 | -15866.56 | -233189.30 | -3731.03 | -229458.30 | -240708.30 | -218753.70 |
| Mass Flowrate, kg/h | 12527.84 | 2070.00 | 15611.85 | 249.79 | 15362.06 | 29959.91 | 27854.51 |
| H2O | 0.00 | 1000.00 | 13692.85 | 219.09 | 13473.76 | 14473.76 | 14256.66 |
| Petcoke | 0.00 | 1000.00 | 0.00 | 0.00 | 0.00 | 0.00 | 0.00 |
| CO2 | 7.70 | 0.00 | 0.00 | 0.00 | 0.00 | 3671.84 | 3671.84 |
| N2 | 9573.56 | 0.00 | 0.00 | 0.00 | 0.00 | 9573.56 | 9573.56 |
| O2 | 2930.56 | 0.00 | 0.00 | 0.00 | 0.00 | 196.55 | 196.55 |
| Ar | 16.03 | 0.00 | 0.00 | 0.00 | 0.00 | 16.03 | 16.03 |
| SO2 | 0.00 | 0.00 | 0.00 | 0.00 | 0.00 | 139.88 | 139.88 |
| S | 0.00 | 70.00 | 0.00 | 0.00 | 0.00 | 0.00 | 0.00 |
| CaCO3 | 0.00 | 0.00 | 0.00 | 0.00 | 0.00 | 0.00 | 0.00 |
| TDS / Solids | 0.00 | 0.00 | 1919.00 | 30.70 | 1888.30 | 1888.30 | 0.00 |
| CH4 | 0.00 | 0.00 | 0.00 | 0.00 | 0.00 | 0.00 | 0.00 |

|  | Flow 17 | Flow 19 | Flow 22 | STEAM TO MED (26) | STEAM FROM MED (27) | Flow 45 | NCG (40) |
|---|---|---|---|---|---|---|---|
| T, C | 198.76 | 25.00 | 161.83 | 110.00 | 90.00 | 115.00 | 115.00 |
| P, bar | 10.00 | 10.00 | 10.00 | 1.00 | 1.00 | 10.00 | 10.00 |
| Vapor Fraction | 0.00 | 0.00 | 1.00 | 1.00 | 0.00 | 0.42 | 1.00 |
| Enthalpy, MJ/h | -21548.07 | -46648.20 | -219614.00 | -168011.60 | -197585.20 | -249187.50 | -52811.82 |
| Mass Flowrate, kg/h | 2105.40 | 3000.00 | 27713.57 | 12670.15 | 12670.15 | 27713.57 | 15030.33 |
| H2O | 217.11 | 2750.00 | 14253.29 | 12670.15 | 12670.15 | 14253.29 | 1579.80 |
| CO2 | 0.00 | 0.00 | 3671.84 | 0.00 | 0.00 | 3671.84 | 3663.53 |
| N2 | 0.00 | 0.00 | 9573.32 | 0.00 | 0.00 | 9573.32 | 9572.46 |
| O2 | 0.00 | 0.00 | 196.54 | 0.00 | 0.00 | 196.54 | 196.52 |
| SO2 | 0.00 | 0.00 | 2.49 | 0.00 | 0.00 | 2.49 | 2.00 |
| S | 0.00 | 0.00 | 0.00 | 0.00 | 0.00 | 0.00 | 0.00 |
| CaCO3 | 0.00 | 250.00 | 0.06 | 0.00 | 0.00 | 0.06 | 0.00 |
| TDS / Solids | 1888.30 | 0.00 | 0.00 | 0.00 | 0.00 | 0.00 | 0.00 |

|  | Condensate (29) | Brine (38) | DISTILLATE 37 | Injection Steam (5) | BFW (29) | Feed Water (1) |
|---|---|---|---|---|---|---|
| T, C | 115.00 | 75.85 | 75.85 | 300.00 | 88.52 | 20.00 |
| P, bar | 10.00 | 0.40 | 0.40 | 80.00 | 80.00 | 0.60 |
| Vapor Fraction | 0.00 | 0.01 | 0.00 | 1.00 | 0.00 | 0.00 |
| Enthalpy, MJ/h | -196375.80 | -227352.10 | -575891.00 | -653323.00 | -771635.20 | -815433.00 |
| Mass Flowrate, kg/h | 12683.25 | 15611.85 | 36807.15 | 49490.40 | 49490.40 | 52419.00 |
| H2O | 12673.49 | 13692.85 | 36807.15 | 49480.64 | 49480.64 | 50500.00 |
| CO2 | 8.31 | 0.00 | 0.00 | 8.31 | 8.31 | 0.00 |
| N2 | 0.87 | 0.00 | 0.00 | 0.87 | 0.87 | 0.00 |
| O2 | 0.03 | 0.00 | 0.00 | 0.03 | 0.03 | 0.00 |
| SO2 | 0.49 | 0.00 | 0.00 | 0.49 | 0.49 | 0.00 |
| S | 0.00 | 0.00 | 0.00 | 0.00 | 0.00 | 0.00 |
| CaCO3 | 0.06 | 0.00 | 0.00 | 0.06 | 0.06 | 0.00 |
| TDS / Solids | 0.00 | 1919.00 | 0.00 | 0.00 | 0.00 | 1919.00 |

FIG. 23

System Pressure - 10 bar

| | No Heat Removal | 10% Heat Removal | 20% Heat Removal | 30% Heat Removal | 40% Heat Removal | 50% Heat Removal | 60% Heat Removal | 70% Heat Removal | 80% Heat Removal | 90% Heat Removal | No BRINE Input |
|---|---|---|---|---|---|---|---|---|---|---|---|
| Heat Removed for HP steam generation MJ/hr | 0.00 | 3341.10 | 6682.20 | 10023.30 | 13364.40 | 16705.50 | 20046.60 | 23387.70 | 26728.80 | 30069.90 | 33190.40 |
| Heat Removed for HP steam generation kBtu/hr | 0.00 | 3166.74 | 6333.48 | 9500.22 | 12666.96 | 15833.70 | 19000.44 | 22167.18 | 25333.92 | 28500.66 | 31458.31 |
| Brine In Total Solids kg/hr | 1882.54 | 1681.51 | 1493.36 | 1142.11 | 1067.19 | 894.67 | 710.60 | 501.34 | 317.51 | 128.74 | 0.00 |
| Brine In kg/hr | 15368.40 | 13719.72 | 12191.28 | 10465.92 | 9029.17 | 7483.41 | 5964.69 | 4413.44 | 2890.06 | 1367.76 | 0.00 |
| Feed Water kg/hr | 52419.00 | 46821.35 | 41278.15 | 35655.75 | 30621.00 | 24912.00 | 19410.60 | 14220.60 | 8823.00 | 3581.10 | 519.00 |
| Distillate kg/hr | 36752.93 | 32835.91 | 28941.89 | 25000.94 | 21136.58 | 17283.65 | 13445.91 | 9637.59 | 5882.96 | 2188.27 | 334.73 |
| Steam Produced @ 100 bar | 0.00 | 1398.00 | 2796.00 | 4194.00 | 5592.00 | 6990.00 | 8388.00 | 9786.00 | 11184.00 | 12582.00 | 13890.00 |
| Heat Removed kBtu/hr | 0.00 | 3166.74 | 6333.48 | 9500.22 | 12666.96 | 15833.70 | 19000.44 | 22167.18 | 25333.92 | 28500.66 | 31458.31 |

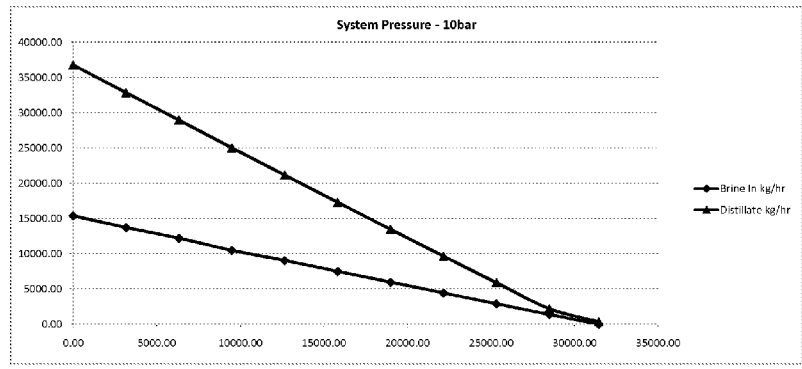

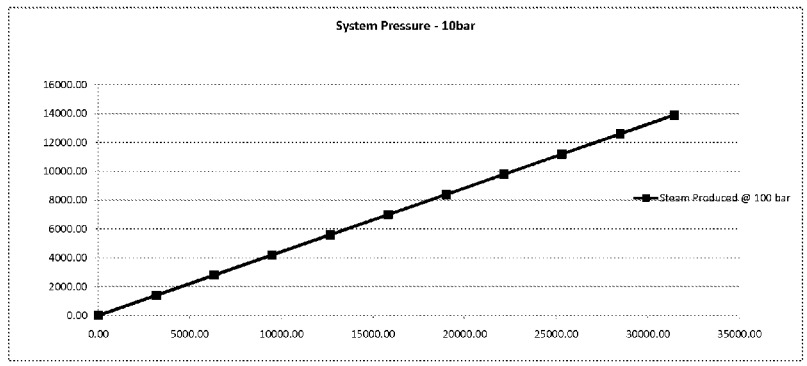

FIG. 24

System Pressure - 5 bar
| | No Heat Removal | 10% Heat Removal | 30% Heat Removal | 50% Heat Removal | 70% Heat Removal | No BRINE Input |
|---|---|---|---|---|---|---|
| Heat Removed for HP steam generation MJ/hr | 0 | 3341.1 | 10023.3 | 16705.5 | 23387.7 | 31318.4 |
| Heat Removed for HP steam generation kBtu/hr | 0 | 3166.74 | 9500.22 | 15833.7 | 22167.18 | 29684.0053 |
| Brine In Total Solids kg/hr | 1680.188 | 1500.525 | 1128.437 | 726.8792 | 338.58 | 0 |
| Brine In kg/hr | 14022.348 | 12522.795 | 9511.028 | 6467.9102 | 3452.59 | 0 |
| Feed Water kg/hr | 47363.94 | 42039 | 30932.4 | 20137.2 | 9342 | 0 |
| Distillate kg/hr | 36752.93 | 29195.1099 | 21387.96633 | 13577.4531 | 5854.53601 | 0 |
| Steam Produced @ 100 bar | 0 | 1398 | 4194 | 6990 | 9786 | 13104.4 |
| Heat Removed kBtu/hr | 0 | 3166.74 | 9500.22 | 15833.7 | 22167.18 | 29684.0053 |
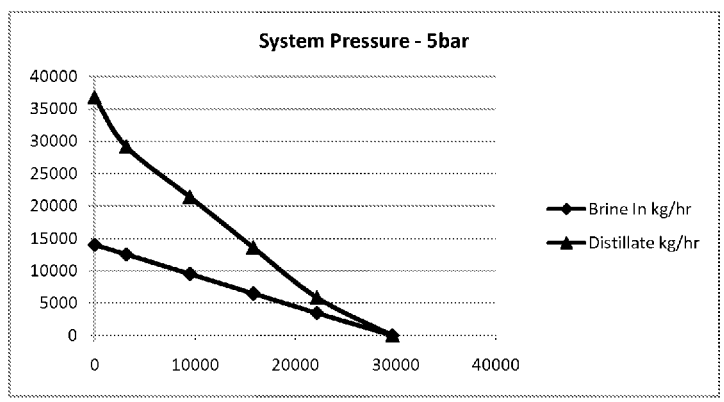
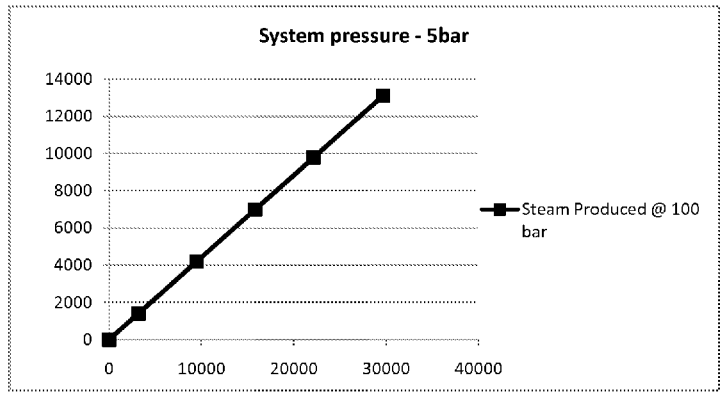
FIG. 25

STEAM GENERATION PROCESS FOR ENHANCED OIL RECOVERY

RELATED U.S. APPLICATIONS

The present application claims priority from U.S. Provisional Patent Application Ser. No. 61/122,195, filed on Dec. 12, 2008 and entitled "INTEGRATED STEAM GENERATION PROCESS FOR ENHANCED OIL RECOVERY USING A SOLID FUEL BOILER AND DISTILLATION UNIT."

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

This application relates to a system and method for producing steam for Enhanced Oil Recovery (EOR) facilities. This invention relates to processes for producing steam in a commercially available steam generation facility from carbon or hydrocarbon fuel and any water source, possibly with high levels of solids and organics, without liquid waste discharge.

2. Description of Related Art Including Information Disclosed Under 37 CFR 1.97 and 37 CFR 1.98

The invention includes an atmospheric or pressurized solid fuel boiler package, OTSG (Once Through Steam Generator) unit or any other commercial available steam generator unit. The BFW (Boiler Feed Water) water for the commercially available steam generation facility is produced using a commercially available water treatment plant. This system can be based on distillation technology. The distillation technology used can be any commercially available water distillation unit like a Single Effect Distiller, Multi Effect Distillation (MED), Single or Multi-Stage Flash (MSF), or, Mechanical Vapor Compression (MVC). Other commercially available water treatment methods, like lime softeners, or cation-anion reactors, can also be used. The treated water is used by the steam generation facility to generate pure steam (without combustion gases) for injection into an underground formation to recover heavy crude oil. The rejected liquids from the water treatment facility (like brine, lime sludge, filter back-wash etc.) and oil contaminated water from the water-oil separation facility are used by a DCSG (Direct Contact Steam Generation) to generate gas (steam and combustion gas) and a solid waste discharge. The water and the heat recovered from the DCSG discharged gas flow are pressurized, at pressures greater then 103 kpa, and used in the water treatment facility, like in thermal distillation facilities, or for BFW heating for steam generation.

The injection of steam into heavy oil formations was proven to be an effective method for EOR and it is the only method currently used commercially for recovery of bitumen from deep underground oilsand formations in Canada. It is known that EOR can be achieved where combustion gases, mainly $CO_2$, are injected into the formation, possibly with the use of DCSG as described in my previous applications. The problem is that oil producers are reluctant to implement significant changes to their facilities, especially if they include changing the composition of the injected gas to the underground formation and the risk of corrosion in the carbon steel pipes due to the presence of the $CO_2$. That problem is solved in this application with the use of commercially available steam generation and water treatment facilities together with the DCSG, and maintains most of the advantages of the DCSG for the overall process in the integrated system as described herein.

By integrating a commercially available boiler, a commercially available distillation facility, and DCSG with an enhanced oil recovery unit, as described in this application, the water and combustion gas are separated with Zero Liquid Discharge (ZLD). A ZLD facility is more environmentally friendly compared to a system that generates reject water and sludge. In one embodiment, most of the water vapor and heat is recovered and used to generate distilled water for additional steam production. The system might also include a direct contact brine evaporator dryer (similar to DCSG), a dry solids removal system (to remove solids from the gas stream), and a wet steam generator (a scrubbing vessel for scrubbing solids, sulfur and generating saturated wet steam). In one embodiment of the current invention, the boiler can be a Pressurized low efficiency boiler (without economizer) as the heat of the discharged combustion gas is used in the direct contact dryer and in the direct contact wash vessel to evaporate water by direct contact with the boiler combustion gas. The brine from the distillation facility can be recycled to the direct contact liquid evaporator and dryer where additional steam is generated and dry solid wastes will be removed from the product gas in a commercially available gas-solid separation unit.

The use of a crystallizer to further concentrate the brine and a direct-fired dryer (typically operated with natural gas) to treat the concentrated discharge from the crystallizer is a known prior art. One of the problems is that most of the energy and the water generated are wasted. As a result, the $CO_2$ emissions for a prior art ZLD system will be higher when compared to a similar system with liquid discharge, to deep disposal wells, as an example. In the present invention, the DCSG generates a pressurized high temperature flow where the energy, including the evaporation/condensation energy, is recovered while most of the steam is condensed and recovered as liquid water. The overall thermal efficiency depends on the system pressure (as well as on other factors)— for higher pressures, the temperatures and the thermal efficiency will increase. (see examples 1 and 2) The downside of higher pressures is the increased cost of the facility (both to construct and to operate). The operating pressure for the system will be dictated by evaluating the efficiency in comparison to the TIC (Total Installed Cost) and the operating cost.

The definition of "Direct Contact Steam Generation" (DCSG) is that the heat is transferred between the liquid water and the combustion gas. This is accomplished through the direct mixing of the two flows (the water and the combustion gases). In the DCSG, the combustion pressure is similar to the produced steam pressure and the combustion gases are mixed with the steam. (See FIG. 20 for the schematic of the Direct and Non-Direct steam generation methods)

In a Non-Direct Steam Generator (like a steam boiler with a steam drum and a mud drum) or "Once Through Steam Generator" (OTSG), the heat transfer and combustion gases are not mixed and the heat transfer is done through a wall (typically a metal wall), where the pressure of the generated steam is higher than the pressure of the combustion. This allows for the use of atmospheric combustion pressure. The product is pure steam (or a steam and water mixture, as in the case of the OTSG) without combustion gases. A direct and indirect steam generator can be integrated into one unit as described, for example, in the down-flow boiler described in FIG. 5 and in the fluidized bed boiler described in FIG. 15 where a portion of the combustion heat is used for generating high pressure steam from di-mineralized treated water through the metal walls (usually tube type) of the heat exchanger, where the rest of the heat is used for generating steam from low quality water (such as water that may include high levels of solids, organics and hydrocarbons) through direct contact with the combustion gas.

There are patents and disclosures issued in the field of the present invention. U.S. Pat. No. 6,536,523 issued to Kresnyak et al. on Mar. 25, 2003 describes the use of the blow-down heat as the heat source for water distillation of de-oiled produced water in a single stage MVC water distillation unit. The concentrated blow-down from the distillation unit can be treated in a crystallizer to generate solid waste.

U.S. Pat. No. 6,733,636 issued to Heins on May 11, 2004 describes a produced water treatment process with a vertical MVC evaporator.

Paper 2005-115 introduced at the 2005 Canadian International Petroleum Conference named: "World First SAGD facility Using Evaporators, Drum Boilers, and Zero Liquid Discharge Crystallizer to treat Produced Water" by Heins et al, describes the integration of vertical MVC and crystallizer to generate BFW (Boiler Feed Water).

A CHOA (Canadian Heavy Oil Association) presentation by Gary Giesbrecht from Petro-Canada on Feb. 13, 2007 described the Zero Liquid Discharge at Mackay River that includes evaporators, steam drive crystallizer and air-cooled condensers.

Canadian patent application 2,547,503, filed Jun. 16, 2005 by Minnich et al, describes the use of a high pressure and high temperature distillation unit combined with a steam boiler for the production of steam for injection into a SAGD injection well.

U.S. Pat. No. 7,578,354 issued to Minnich et al. on Aug. 25, 2009 describes the use of MED for generating steam for injecting into an underground formation. U.S. Pat. No. 7,591,311 issued to Minnich et al. on Sep. 22, 2009 describes evaporating water to produce distilled water and brine discharge, feeding the distilled water to a boiler, and injecting the boiler blow-down water from the boiler to the produced steam. The solids and possibly volatile organic remains are carried with the steam to the underground oil formation. The concentrated brine is discharged in liquid form.

Canadian patent application 2609419 filed on Nov. 2, 2007 by Speirs et al. describes a method to recover heat and water from tailing water by using inert gas. The tailing water heat energy is used for evaporation. The water vapor behaves according to its partial pressure with the inert gas, resulting in low condensation temperatures at the low pressures.

Canadian patent application 2609859 filed on Nov. 2, 2007 by Speirs et al. describes a method to recover heat and water from hot tailing water discharged from downstream oil production facilities by using vacuumed MED or MSF to generate distilled Boiler Feed Water quality from waste heat of the tailing water.

Canadian patent application 2610052 filed on Nov. 8, 2007 by Speirs et al. describes a method to recover heat, energy and water from the hot tailing water discharged from downstream oil production facilities. The recovery process is using MSF process. Due to the low temperature of the feed water there is a need for a strong vacuum and especially a very cool condensing side. In this application, the process is driven by the temperature differences occurring between different process flows in an oil-sand plant where the inlet cold water flow is used as a heat sink to condense the low pressure steam. There are problems with the general approach of recovering heat and distilled water from tailing water. The tailing water is generally at a low temperature that requires the use of a strong vacuum and low condensing temperature for recovered distilled water. Due to the low levels of energy only small portion of the water can be recovered. Another significant problem is the high levels of abrasive solids content and the other impurities in the source as other contaminates (like hydrocarbon traces). This can make the use of heat exchanger and other equipment impractical. In my application the solids are removed in solid form from the steam during or after the combustion or the DCSG.

This invention's method and system for producing steam for extraction of heavy bitumen includes the steps of mixing fuel with an oxidizing gas; combustion of the mixture and possibly capturing a portion of the combustion heat for generating steam from clean, de-mineralized water (BFW). Then, mixing the combustion gas with low quality contaminated water and transferring the liquid water to gas phase with solids, wherein solids are separated from the gas phase. The gas phase is mixed with saturated water to scrub the remaining solids and produce saturated steam. The solid rich saturated water is recycled back and mixed with the combustion gases for liquid gasification. The saturated steam is condensed to generate heat and clean condensed water for steam generation. The heat can be used for evaporating additional low quality water at the distillation facility to produce distilled water and concentrate brine. The brine is recycled back for liquid gasification. The high pressure steam is sent to an enhanced oil recovery facility and injected into an injection well for extraction of heavy oil.

The above-mentioned invention also relates to processes for making SAGD and CSS (Cyclic Steam Stimulation) facilities, or other EOR facilities, more environmentally friendly by using low quality fuels, like petcoke or coal, instead of natural gas. It reduces the amount of greenhouse gas emissions through increased thermal efficiency. The generated $CO_2$ gas can be recovered for underground sequestration or for usage in EOR.

Steam injection into deep underground formations has proven to be an effective method for EOR facilities producing heavy oil from an oil-sand formation. It is typically done through SAGD, Steam Drive or by CSS. In recent years, the SAGD method has become more popular, especially for heavy oil sand formations. Presently, different forms of steam injection (sometimes with hydrocarbons) are the only method commercially used on a large scale for recovering oil from deep oil sands formations.

The use of DCSG (Direct Contact Steam Generator) to generate high pressure steam and flue gas mixture has many advantages; however it might have some significant disadvantages resulting from the presence of the combustion gases, mainly $CO_2$, within the steam. That might present a problematic situation when used in combination with particular types of underground formations and recovery processes.

It is a goal of the present invention to provide a system and method for the improvement of EOR facilities like SAGD, through a supply of high-pressure steam for underground injection wells.

Another objective of the present invention is to provide a system that can produce steam from distilled water and the brine produced by the distillation facility without liquid discharge.

Another objective of the invention is to provide a system and method that utilizes low-grade fuel with commercially available solid fuel burner packages.

An additional objective of the present invention is to provide a system and method that will remove produced solids from the system by converting the liquids to gas phase and removing solids from the gas phase. The solids are a product of the fuel and the evaporated water. The solids can be silicon based materials, calcium based materials, different type of salts carried by the water, etc.

Furthermore, it is another objective of the present invention to provide a system and method that enhances thermal efficiency and minimizes the amount of energy used to produce the steam injected into the underground formation to recover heavy oil.

It is a further objective of the present invention to provide a system and method that minimizes the amount of greenhouse gases released into the atmosphere.

A further objective of the present invention is to provide a system and method that serves to make EOR facilities, like SAGD, more environmentally friendly by using low-quality fuel like petcoke or coal.

It is still a further objective of the present invention to provide a method for steam production for the extraction of heavy bitumen.

It is an objective of the present invention to provide a method for producing super-heated, dry, solid-free steam.

It is still a further objective of the present invention to provide a method that uses discarded water, possibly mixed with oil, clay or silica sand from a SAGD facility.

It is another objective of the present invention to provide a system for oil recovery using heat injection.

These and other objectives and advantages of the present invention will become apparent from a reading of the attached specifications and appended claims.

SUMMARY OF THE INVENTION

The method and system of the present invention for steam production for extraction of heavy bitumen by injecting the steam to an underground formation or by using it as part of an above ground oil extraction facility includes the following steps: (1) mixing carbon or hydrocarbon fuel, possibly with water, and oxidizing gases like oxygen, enriched air or air; (2) combustion of the mixture under high pressure and temperature; (3) using combustion heat to transfer liquid water containing solids and organics to a gas phase; (4) separating the solids from the gas phase; (5) using the gas phase heat to evaporate the de-oil produced water and make-up water at the distillation facility to produce distilled water and concentrated brine; (6) recycling the discharge fluids, like brine from the water treatment facility and blow down from the steam generation facility, back to the first step and heating them with the combustion heat; (7) using the produced water (BFW) for steam generation through non-direct heat exchange with combustion gas, being done in a separate commercially available steam generation facility or by recovering part from the combustion heat from step (3); and (8) using the produced steam to recover oil. In another embodiment, to improve the solids removal and possible SO2 removal if sulfur rich fuel is used, the produced gas will include these two additional steps after step (4) above: (4A) mixing the produced gas with liquid water, possibly with lime or other alkaline materials for SO2 removal, at saturated temperature and pressure in order to produce a clean, wet saturate steam and gas mixture, while removing most of the SO2 and scrubbing any remaining solids from the gas; (4B) recycling at least part of the solid rich water that includes the scrubbed solids, the generated calcium sulfite and calcium sulfate back to step (3) and mixing it with combustion gas to convert the liquid phase water to steam.

Step (3) can be done in a Direct Contact Steam Generator reactor, where most of the water evaporates as it is converted to steam. There are several feasible designs for the DCSG. The structure can include, but is not limited to: a horizontal rotating reactor, a fluidized bed boiler and an up-flow evaporator or any other reactor that can be used to generate a stream of gas and solids. Any other DCSG, like a pressurized spray dryer that can consume the highly contaminated water can be used as well to convert the water to steam and solids.

The discharged NCG is at a relatively low temperature, close to the water condensation temperature. The cooled combustion gases can be discharged to the atmosphere. An additional option, if the recovery of CO2 for sequestration is required, is to separate the CO2 from combustion gases using a membrane. Low temperature membrane technology is commercially available. The discharged pressure will be used for the separation process.

Another option is to use an oxygen plant where the combustion gases will be mainly CO2 that can be directly recovered for sequestration.

According to one aspect of the present invention, a method has been provided for producing a steam and gas mixture for injection into an underground formation to extract heavy bitumen by mixing fuel with oxidation gases to form a mixture; combustion of the mixture under high pressures and temperatures to generate combustion gases; mixing said combustion gases with water having a high level of solids therein to form a combustion gas mixture; evaporating the water in the combustion gas mixture to leave the solids in a dry form; washing the combustion gas mixture with water at a saturated temperature and pressure; scrubbing any remaining solids from the combustion gas mixture to form a clean steam and gas mixture; and injecting the clean steam and gas mixture into the underground formation to extract the heavy bitumen.

According to another aspect of the present invention, a system is provided for producing a clean steam and gas mixture for injection into an underground formation to extract heavy bitumen by mixing fuel with oxidation gases in a combustion boiler to form a mixture, combustion of the mixture under high pressures and temperatures in the combustion boiler to generate combustion gases, mixing said combustion gases with water in the combustion boiler having a high level of solids therein to form a combustion gas mixture, evaporating the water in the combustion gas mixture to leave the solids in a dry form, transferring the combustion gases to a gas-solid separator unit, removing the dry form solids from a gas-solid separator unit, transferring the combustion gases to a steam generation and wash vessel, washing the combustion gas mixture in the steam generation and wash vessel with water at a saturated temperature and pressure, scrubbing any remaining solids from the combustion gas mixture to form the clean steam and gas mixture, and injecting the clean steam and gas mixture into the underground formation to extract the heavy bitumen.

According to another aspect of the present invention, a method is provided for producing a pure steam mixture for injection into an underground formation to extract heavy bitumen by mixing fuel with oxidation gases to form a mixture, combustion of the mixture under high pressures and temperatures to generate combustion gases; mixing said combustion gases with water having a high level of solids therein to form a combustion gas mixture, evaporating the water in the combustion gas mixture to leave the solids in a dry form, removing the dry form solids; washing the combustion gas mixture with water at a saturated temperature and pressure, scrubbing any remaining solids from the combustion gas mixture to form the clean steam and gas mixture, transferring the clean steam and gas mixture to a heat exchange condenser, using heat from the clean steam and gas mixture to heat water supplied from a distillation facility, combustion of the water from the distillation facility to generate a pure steam mixture that can be used to extract the heavy bitumen, and injecting the pure steam mixture into the underground formation to extract the heavy bitumen.

BRIEF DESCRIPTION OF THE DRAWINGS

FIG. 21 is a chart of analysis and results for example 1.

FIG. 22 is a chart of analysis and results for 5 bar system pressure in example 2.

FIG. 23 is another chart of analysis and results for 5 bar system pressure in example 2.

FIG. 24 is a chart and graph illustration of analysis and results for 10 bar system pressure in example 3.

FIG. 25 is another chart and graph illustration of analysis and results for 5 bar system pressure in example 3.

DETAILED DESCRIPTION OF THE DRAWINGS

FIG. 1, 1A, 1B, 2 and 2A shows the conceptual flowchart of the method and the system.

Figure 1:
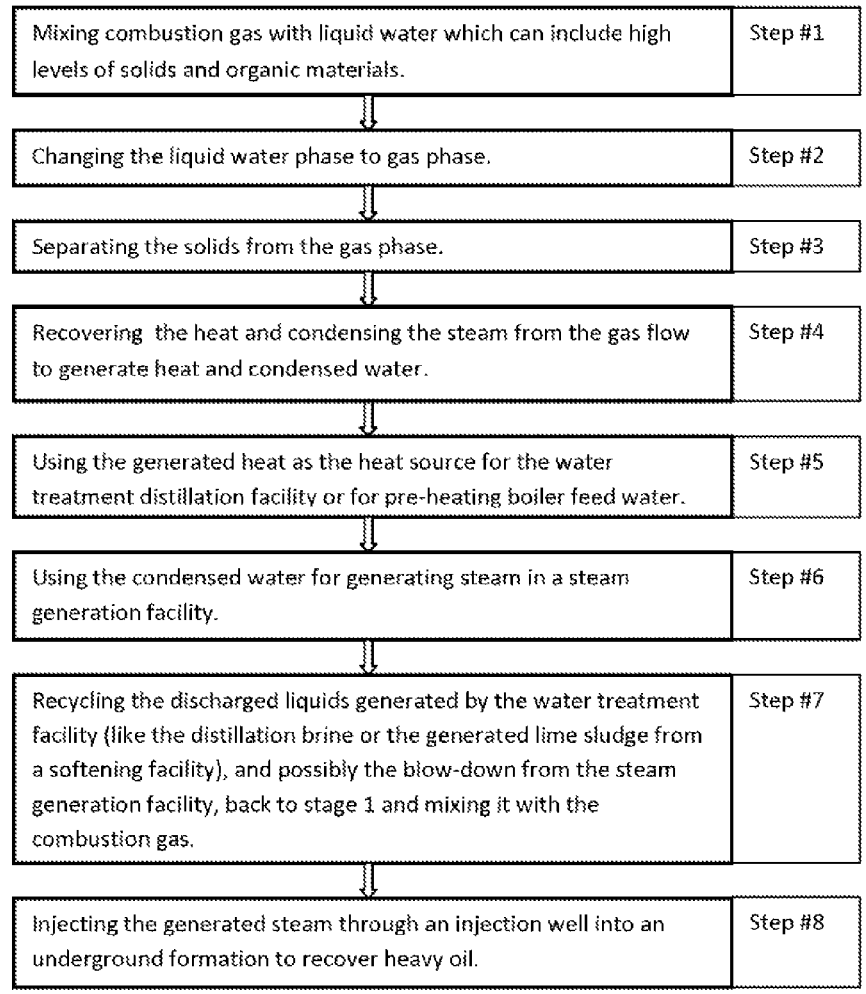
FIG. 1 is a schematic view of a diagram of the current invention.
Figure 1A:
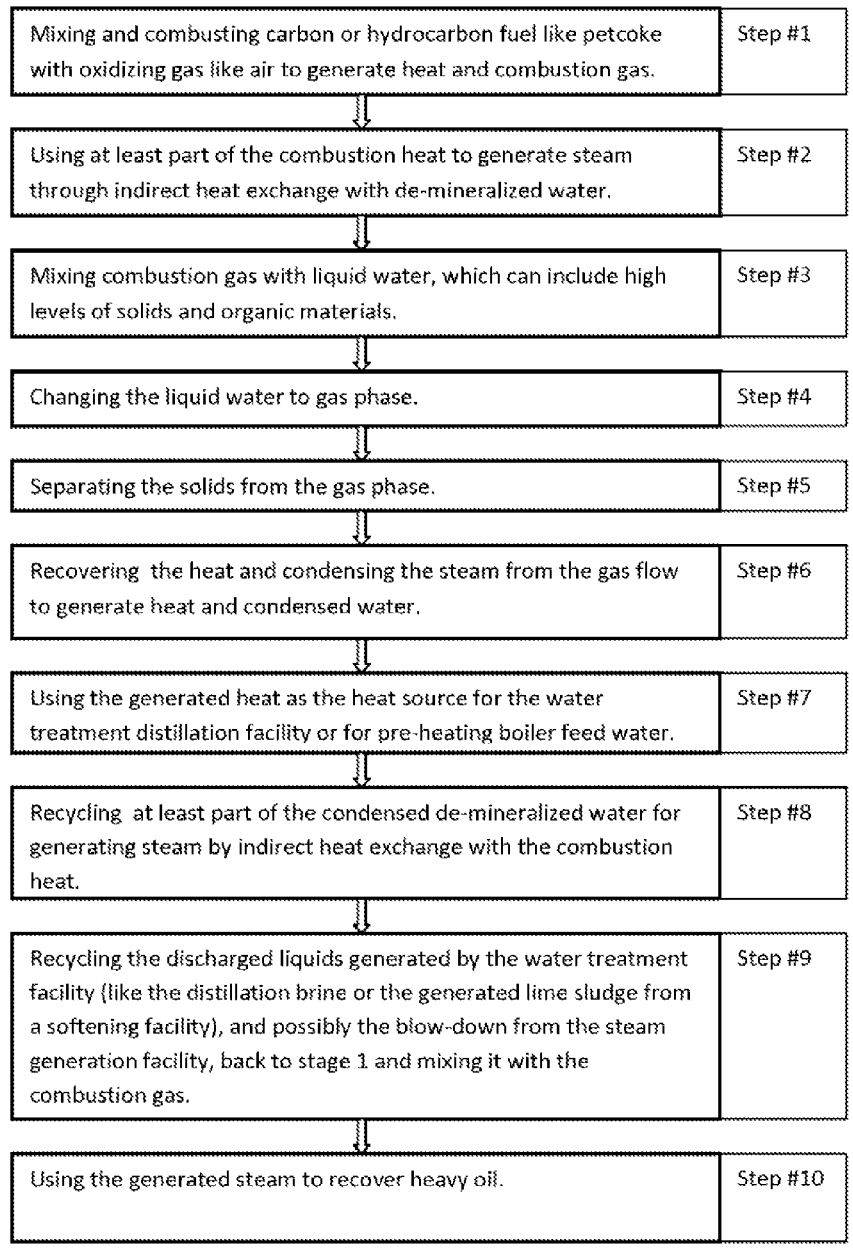
FIG. 1A is a schematic view of a diagram of the current invention.
Figure 1B:
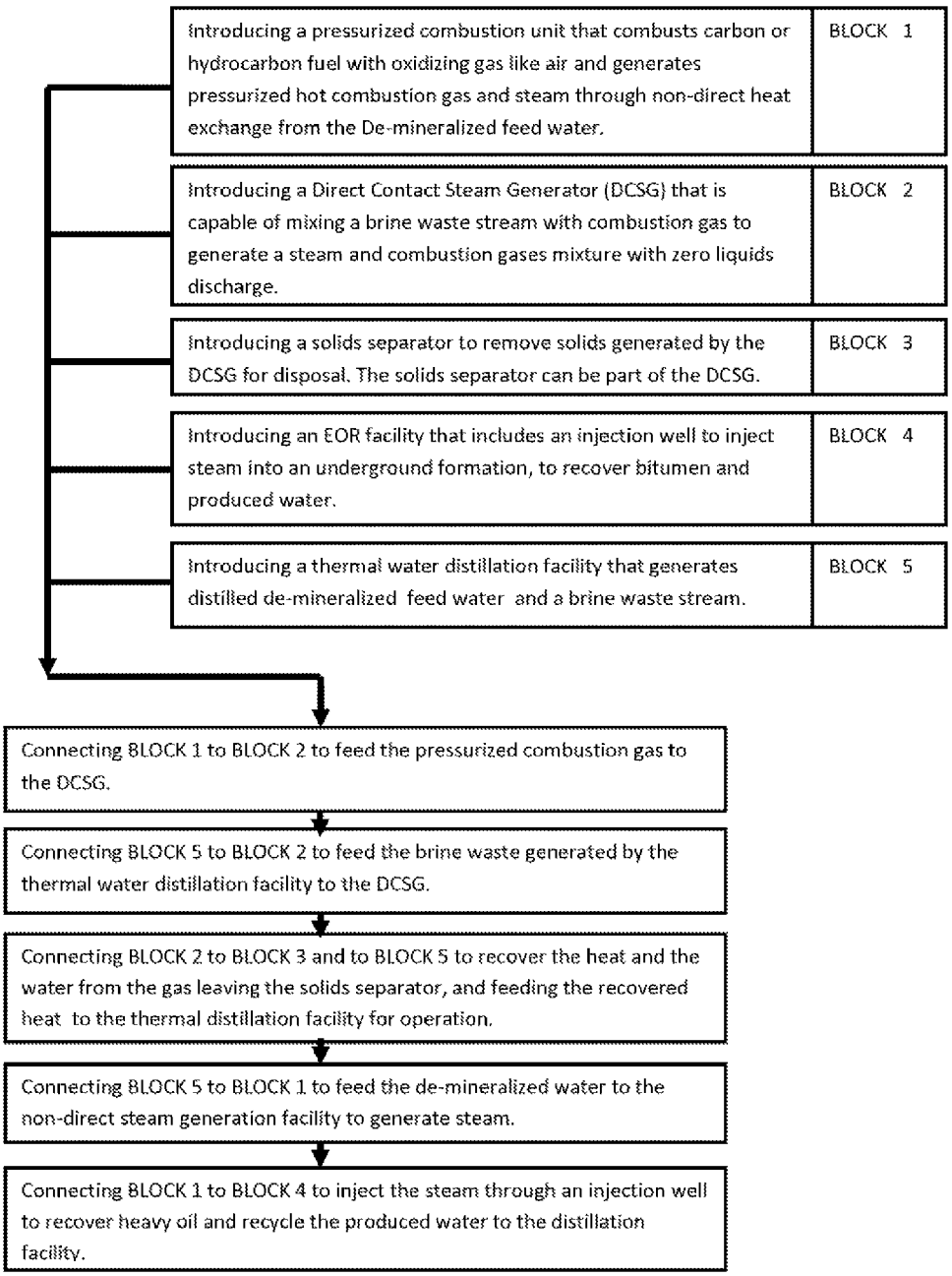
FIG. 1B is a schematic view of a diagram of the current invention.
Figure 2:
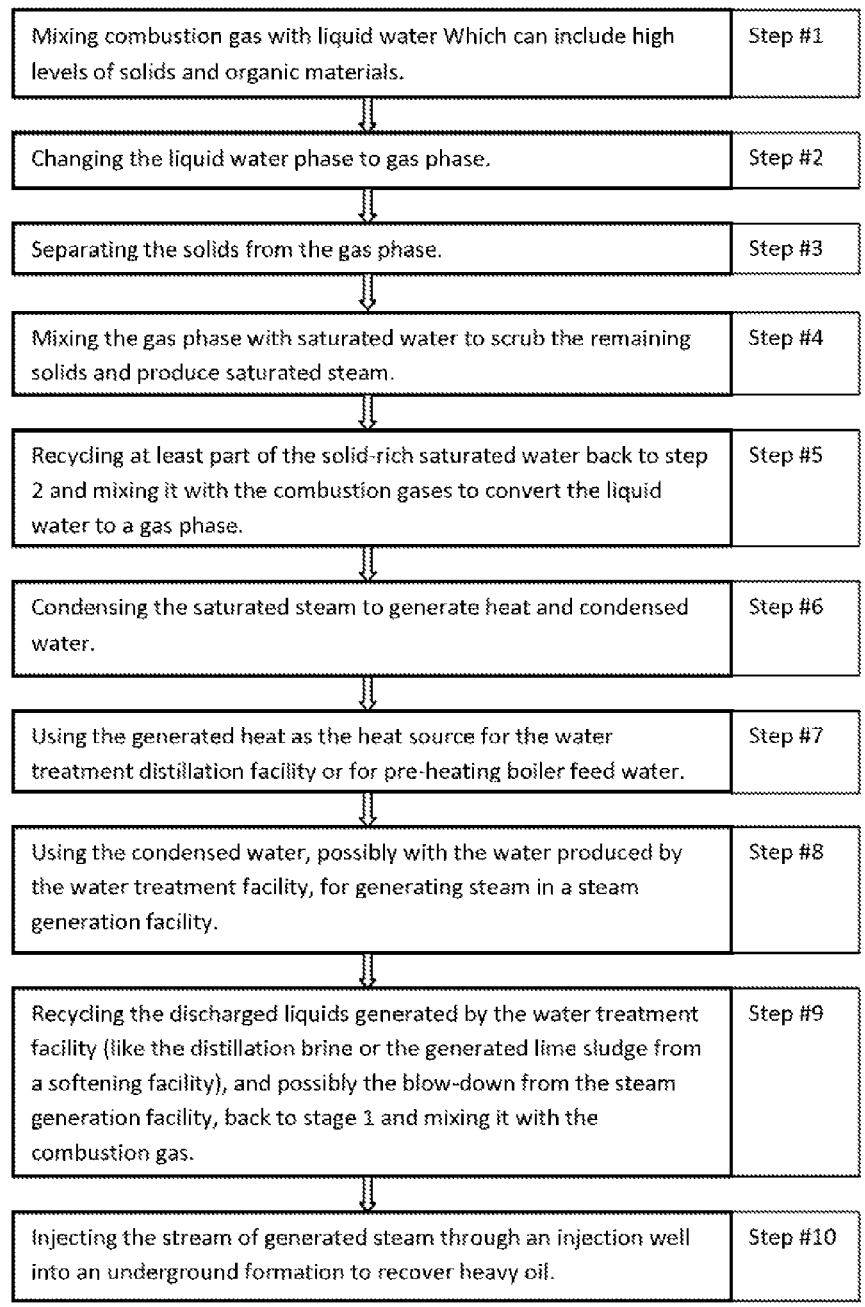
FIG. 2 is another schematic view of a diagram of the current invention.
Figure 2A:
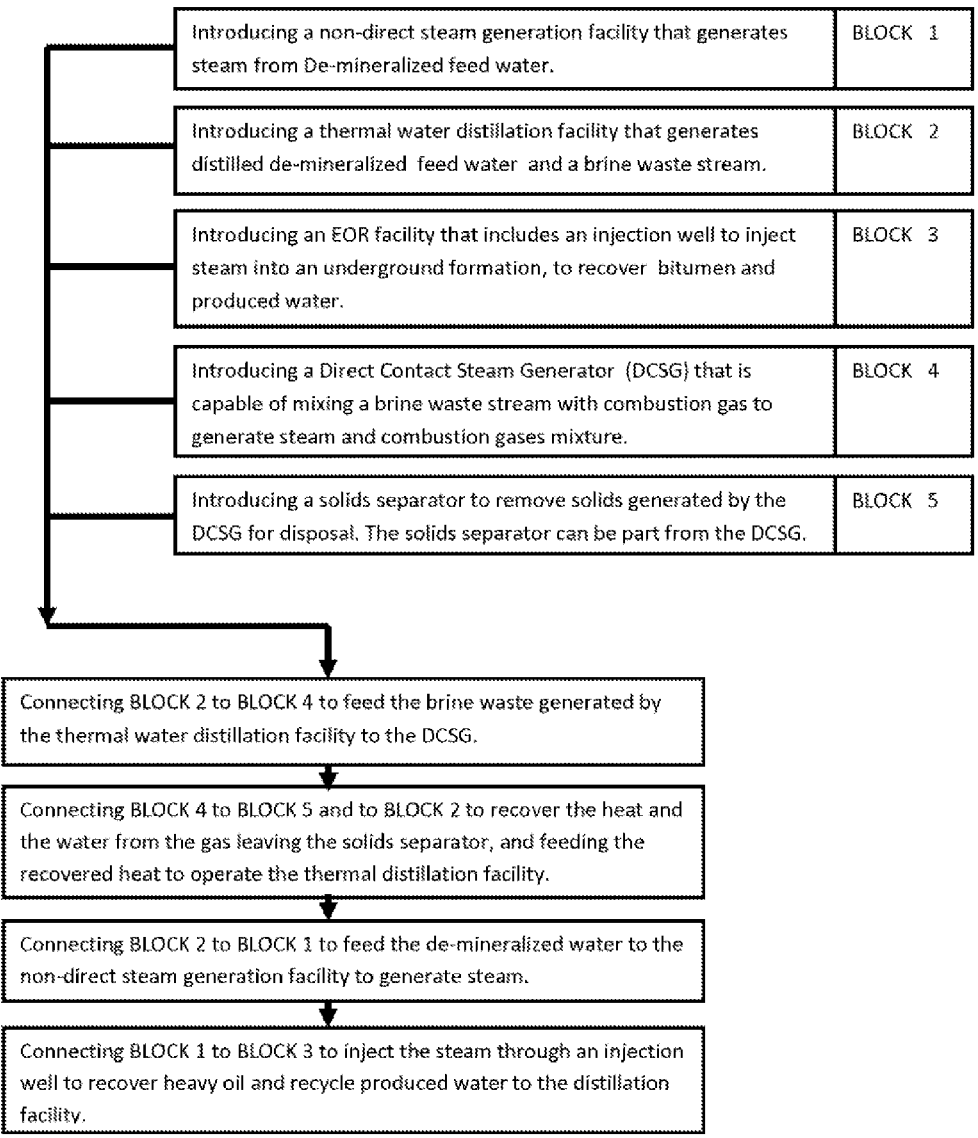
FIG. 2A is another schematic view of a diagram of the current invention.
Figure 3:
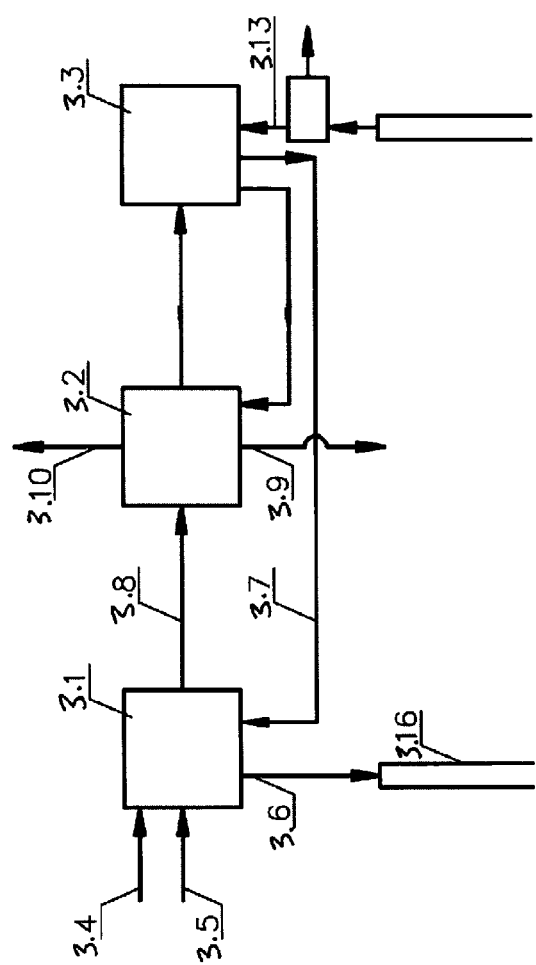
FIG. 3 is a schematic view of an illustration of the current invention for an integrated solid fuel boiler and distillation for EOR.

FIG. 3 shows a block diagram. Boiler 3.1 combusts low quality fuel 3.4. For example: untreated, heavy crude oil, vacuum residue (VR), coal, asphaltin or petcoke in slurry form—the fuel is injected simultaneously with oxidation gas 3.5 (oxygen, air or enriched air). Next, they are combusted; the combustion boiler can be any boiler capable of combusting the particular fuel. Water 3.7 is used to generate high-pressure steam 3.6 for EOR. The discharged combustion gases 3.8 are treated in block 3.2, where they are used to generate additional water vapor, remove the SO2 and the waste solids. This is done by injecting slurry water with the high levels of solids into the combustion gases that are discharged from the boiler. The amount of the injected water is controlled, so that all the injected water evaporates, leaving the solids it carried in a dry form. This can be done in a rotating kiln type unit used by different industries to dry solids; or by an up-flow high pressure dryer, capable of eliminating the internal solids deposits. The solids rich gas further flows to a gas-solid separator unit. Such units are commercially available and are capable of removing most of the solids in a dry form. The removed solids are released through the de-compression hopper system, possibly with heat exchange, to remove their heat before they are discharged. For dust control, the low quality water can be sprayed onto the dry powder. After most of the solids have been removed in a dry form 3.9, the solid, lean gas flow 3.10 flows into liquid scrubber and steam generation vessel where the gas is washed by water at a saturated temperature. To remove the SO2 the water can contain lime as well as other alkali materials. Removing heat separates the saturated gas from the steam; the water is recovered in a liquid form. For a pressurized boiler, the liquid water can be flashed to generate low-pressure steam. The condensation heat and steam are further used for distillation of brackish and produced water 3.13 in a commercially available distillation facility 3.3. The distillation facility can be MED (Multi Effect Distillation) MSF (Multi-Stage Flash), or combined with VC (Vapor Compression) facilities. The distilled water 3.7 is used for generating steam 3.6 and is injected into the oil formation using injection well 3.16 for EOR. The brine produced by the distillation facility 3.3 is recycled back to generate steam and dry solids 3.2.

Figure 4:
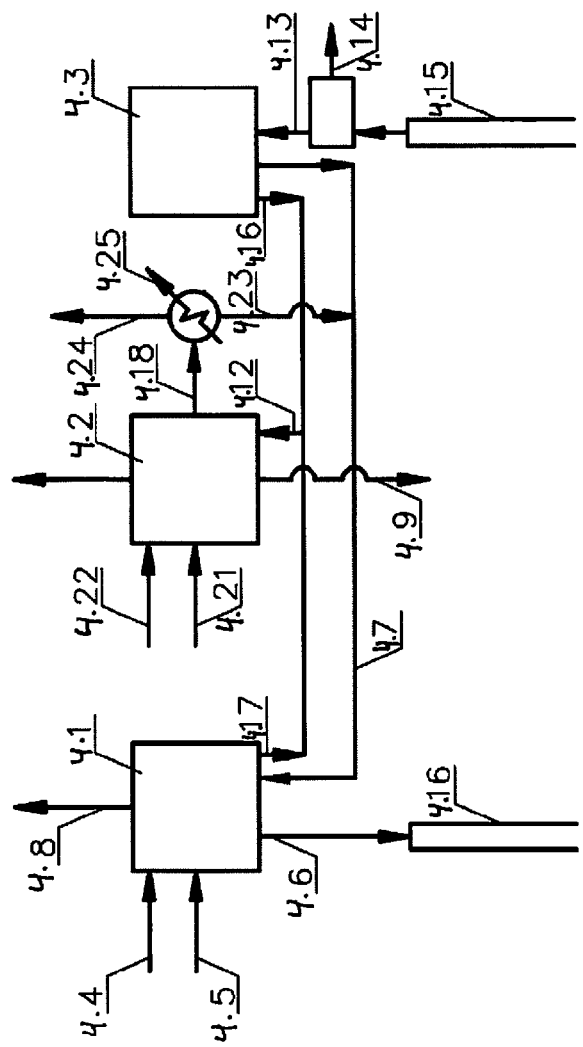
FIG. 4 is a schematic view of an illustration of the current invention with a boiler, fired direct contact steam generator and distillation for EOR.

FIG. 4 shows a block diagram. The steam generation unit 4.1 combusts carbon or hydrocarbon fuel 4.4. For example: Natural gas, synthetic gas, heavy crude oil, vacuum residue (VR), coal, asphaltin or petcoke in slurry form—the fuel is injected simultaneously with oxidation gas 4.5 (oxygen, air or enriched air). Next, they are combusted. The combustion boiler can be any boiler capable of combustion for the particular fuel. In this embodiment the combustion is an atmospheric combustion, thus a common boiler or OTSG can be used. Another advantage is that an existing boiler or OTSG that is currently installed in EOR facilities can be used as is. Currently most of the steam generation facilities are atmospheric steam generators. Clean water (BFW quality) 4.7 is used to generate high-pressure steam 4.6 for EOR. The discharged combustion gases 4.8 are released to the atmosphere as currently done by the oil producers, or can be further treated, like removing the CO2, (not part of this application). In unit 4.2, fuel 4.21 is injected and combusted. Fuel 4.21 can be any available carbon or hydrocarbon fuel. For example: untreated, heavy crude oil, vacuum residue (VR), coal, asphaltin or petcoke in slurry form—the fuel is injected simultaneously with oxidation gas 4.22 (oxygen, air or enriched air). Next, they are combusted. The combustion heat is used to generate steam and combustion gas mixture by direct contact between liquid water 4.12 and hot combustion gases. This is done by injecting slurry water with high levels of solids into the combustion gases. The amount of the injected water is controlled, so that all the injected water evaporates, leaving the solids it carried in a dry form 4.9. This can be done in a modified rotating kiln type unit used by different industries to dry solids; or by an up-flow high pressure dryer, capable of eliminating the internal solids deposits.

The solids 4.9 are further separated from the solid-rich gas which flows to a gas-solid separator unit. Such units are commercially available and are capable of removing most of the solids in a dry form. The removed solids 4.9 are released through the de-compression hopper system, possibly with heat exchange to recover their heat before they are discharged. For dust control, the discharged solids can include some water or the low quality water can be sprayed onto the dry discharged powder. After most of the solids have been removed in a dry form 4.9, the solid, lean gas flow in facility 4.2 can be wet scrubbed. To remove the scrubbing SO2 the water can contain lime as well as other alkali materials. The generated steam and combustion gas mixture 4.18 is separated into water 4.23 and non-condensable gas 4.24. The condensation heat 4.25 is further used for distillation of brackish, produced or any other water source 4.13 in a commercially available distillation facility 4.3. The distillation facility can be MED, MSF, or combined with VC facilities. If a non-distillation water treatment system is used, the heat can be used for pre-heating the water before reaching the boiler or the OTSG. The produced emulsion from the production well 4.15 is separated to produce bitumen 4.14 and produced water. The water treatment facility generates liquid waste 4.16 like brine in a distillation facility, lime sludge in a softening facility or other waste. The liquid waste 4.16 from the water treatment facility 4.3 is recycled back to the DCSG at block 4.2 to recover the water and generate solid waste. For distillation water treatment facilities, like MED or MSF, the brine 4.16 produced by the distillation facility 4.3 is recycled back to generate steam and dry solids at facility 4.2.

Liquid waste 4.17 from the steam generation unit 4.1, like blow-down water, can be also recycled to the DCSG facility 4.2, the same way as liquid waste from the water treatment facility. The produced BFW water, like the distilled water 4.7 is used in the steam generation block 4.1 for generating steam 6. The produced steam is injected into the oil formation using an injection well 4.16 for EOR.

Figure 5:
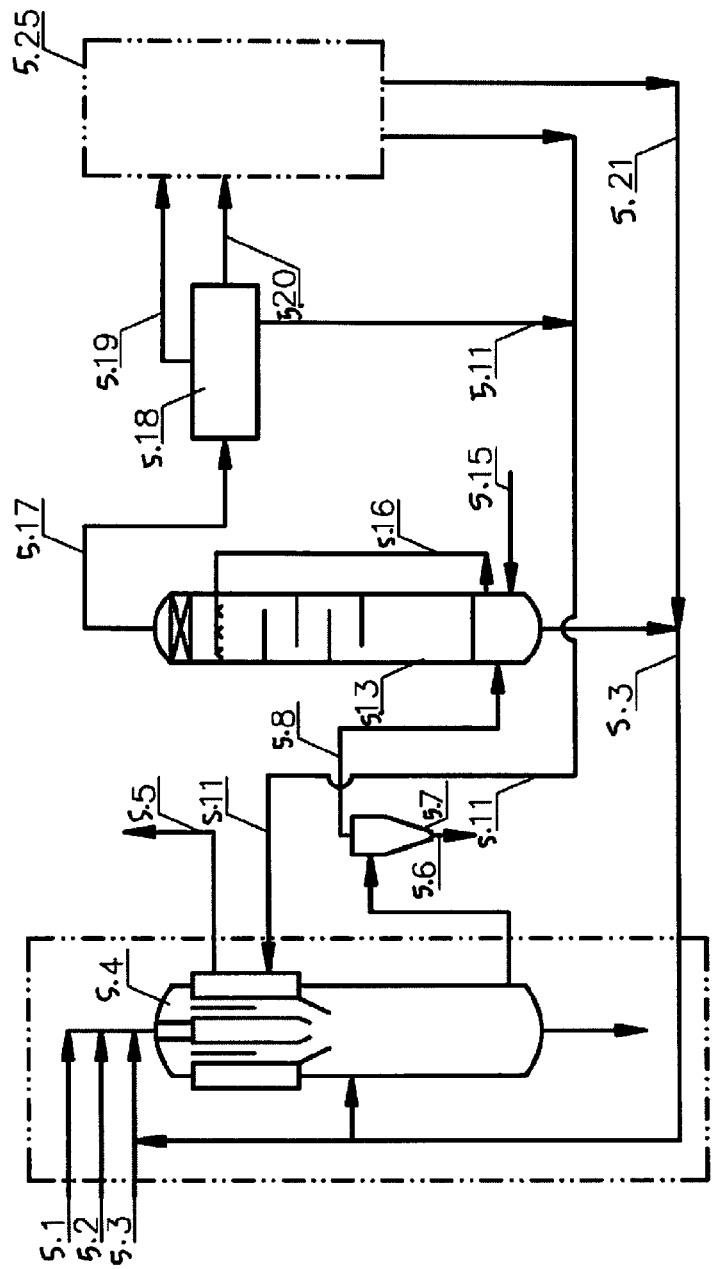
FIG. 5 is a schematic view of an illustration of a boiler, solids removal, wet steam scrubber and integrated distillation unit for the production of steam for heavy oil recovery.

FIG. 5 is one illustration of the present invention. Fuel 5.2, possibly with water 5.3, is mixed with oxidized gas 5.1 and injected into a pressurized steam boiler 5.4 where the combustion occurs at an elevated pressure. The boiler can have solid char discharged from the bottom of its combustion chamber. The boiler produces high-pressure steam 5.5 from BFW distilled water feed 5.11. The steam is injected to the underground formation EOR.

Solids rich water 5.3 is injected into the combustion boiler 5.4. The amount of water 5.3 is controlled to make sure that all the water is converted to steam and that the remaining solids are in a dry form. The solid rich combustion gases discharged from the boiler flow to a dry solids separator 5.7; the dry solids separator is commercially available. There are several gas-solid separation designs than can be used. The dry solids are removed in a dry form from the separator 5.6. The solids lean flow 5.8 is mixed with saturated water 5.14 in a direct contact steam generation and wash vessel 5.13 where the heat, carried with the gas 5.8, generates steam. Saturated liquid water 5.16 washes the solids carried within the gas. The liquid water may include alkaline materials (like lime) to scrub the SO2 present in the pressurized combustion gases generated by the boiler. Make-up water 5.15 is added to the scrubbing vessel 5.13 to replace the evaporated water and the solid rich water discharged from the vessel bottom. The solids rich water 5.3 is discharged from the bottom of vessel 5.13 and recycled back to the boiler 5.4 where the liquid water is converted to steam and the solids are removed in a dry form, ready for disposal. The combustion gases saturated with wet steam 5.17 are free of solids. Also, most of the sulfuric gas generated from burning sulfur-rich fuels can be removed in the form of calcium sulfite and gypsum. The wet gas mixture flows to the condenser and heat exchanger 5.18. Heat is removed from the combustion gases. This results in condensed steam that is separate from the non-condensing combustion gases. The recovered heat is used to generate low-pressure steam 5.20 and to heat the feed water for operating the distillation facility 5.25. The saturated steam in the combustion gas condenses to water 5.20 and it is used for steam generation. It also acts as a heat source for the distillation facility (5.25). The non-condensable combustion gas 5.19 is carried for further treatment and use. For example, inject the CO2 into an oil formation to maintain underground pressure, inject the CO2 for permanent sequestration, or release the NCG directly out into the environment (if there is no requirement for CO2 sequestration).

The combustion gas condenses with the distilled water 5.11 from the distillation facility, which is used as boiler-feed water 5.11 for generating the steam for EOR injection. The distillation facility continually generates brine water with a high dissolved solids concentration 5.21. The brine water is recycled back to boiler 5.4, where the liquid water is converted to steam and the dissolved solids remain in a dry form. Some of the brine water can be used as make-up water in the scrubbing and steam-generating vessel 5.13.

The distillation unit discussed 5.25 is a commercially available facility. There are a few principles and designs that can be used. For example, an MED can be used. The distillation facility treats de-oiled produced water and make up water. This could potentially be brackish water from underground wells (not shown on the sketch).

Figure 6:
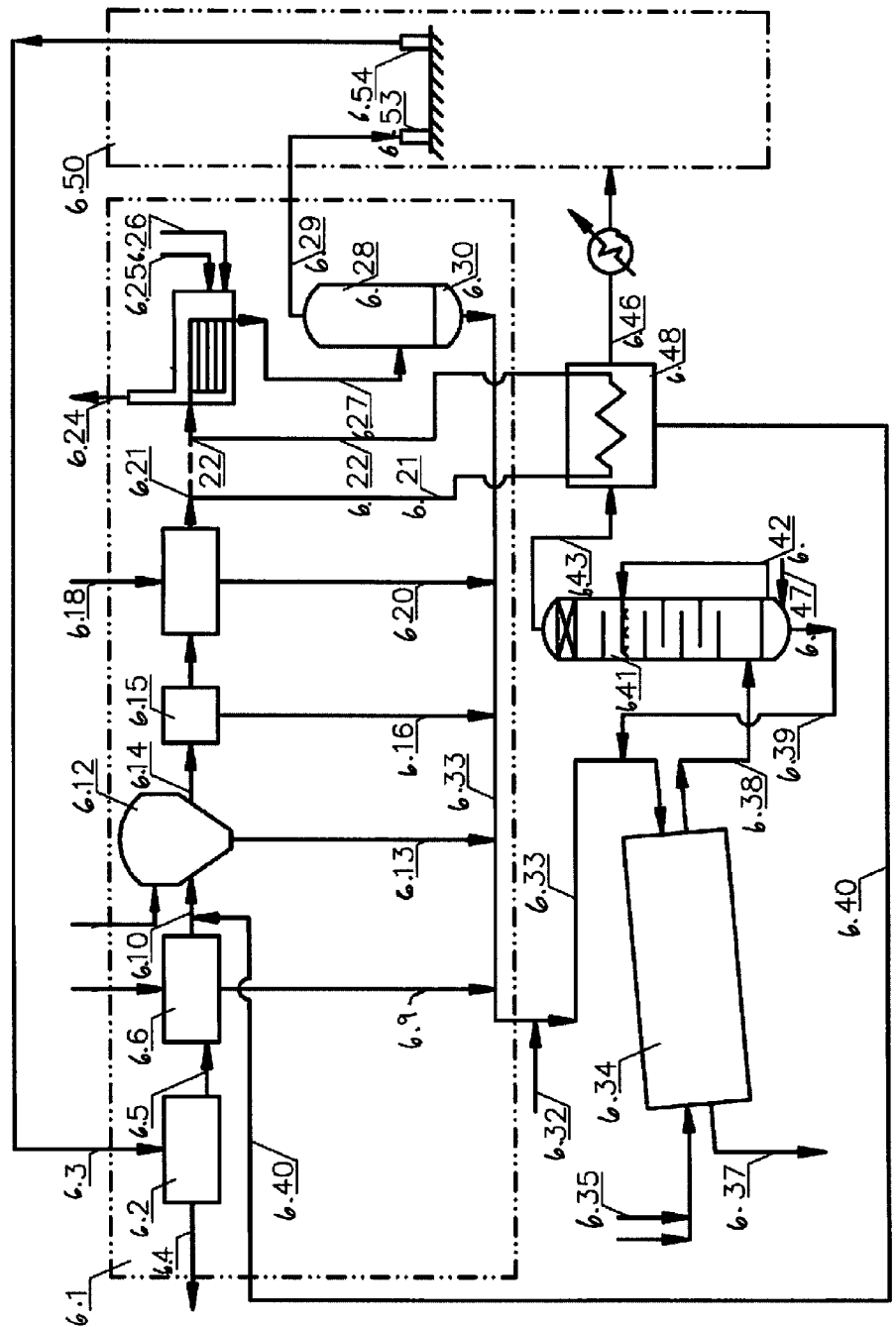
FIG. 6 is a schematic view of a diagram of a lime softener water treatment plant with fired DCSG and OTGS for generating steam for EOR.

FIG. 6 is a schematic view of an integrated facility of the present invention with a commercially available steam generation facility and EOR for heavy oil production. The steam for EOR is generated using a lime softener based water treatment plant and OTSG steam generation facility. This type of configuration is most common in EOR facilities in Alberta. It recovers bitumen from deep oil sand formations using SAGD, CSS etc. Produced water 6.3 from the production well 6.54, is separated inside the separator facility to bitumen 6.4 and water 6.5. There are many methods of separating the bitumen from the water. The most common one uses gravity. Light hydrocarbons can be added to the product to improve the separation process. The water, with some oil remnants, flows to a produced water de-oiling facility 6.6. In this facility, de-oiling polymers are added. Waste water, with oil and solids, is rejected from the de-oiling facility 6.6. In a traditional system, the waste water would be recycled or disposed of in deep injection wells. The de-oiled water 6.10 is injected into warm or hot lime softener 6.12, where lime, magnesium oxide and other softening chemicals are added 8. The softener generates sludge 6.13.

In a standard facility, the sludge is disposed of in a landfill. The sludge is semi-wet, and hard to stabilize. The softened water 6.14 flows to a filter 6.15 where filter waste is generated 6.16. The waste is sent to an ion-exchange package 16.9, where regeneration chemicals 6.18 are continually used and rejected with carry-on water as waste 6.20. In a standard system, the treated water 6.21 flows to an OTSG where approximately 80% quality steam is generated 6.27. The OTSG typically uses natural gas 6.25 and air 6.26 to generate steam. The flue gas is released to the atmosphere through a stack 6.24. Its saturated steam pressure is around 100 bar and the temperature is slightly greater than 300 C. The steam is separated in a separator 6.28, to generate 100% steam 6.29 for EOR and blow-down water 6.30. The blow down water can be used as a heat source and also to generate low pressure steam.

The steam, 6.29 is delivered to pads, where it is processed and injected into the ground through an injection well 6.53. The production well 6.54 produces an emulsion of water and bitumen 6.3. In some EOR facilities, injection and production occur in the same well, where the steam is 80% quality steam 6.27. The steam is then injected into the well with the water. This is typical of the CSS pads.

The reject streams include the blow down water from OTSG 6.33, as well as the oily waste water, solids and polymer remnants from the produced water de-oiling unit. This also includes sludge 6.13 from the lime softener, filtrate waste 6.16 from the filters and regeneration waste from the Ion-Exchange system 6.20. The reject streams are collected 6.33 and injected into Direct Contact Steam Generation 6.34. Additional water 6.32, from any available water source, can be added. The energy source can be a gas, liquid, solid, carbon or hydrocarbon-based fuel 36 and oxidizing gas, (like air) 6.35. The DCSG can be vertical, stationary, horizontal or rotating, as shown in the schematic 6.34. Dry solids 6.37 are discharged from the DCSG, after most of the liquid water is converted to steam. The combustion gas and steam 6.38 temperatures can vary between 120 C and 300 C. The pressure can vary between 1 bar and 50 bar. The produced gas 6.38 is injected into a vessel 6.41 where the gas is washed with saturated water 6.42 to remove the solid remnants and generate additional steam. The make-up water 6.47 can include lime to remove sulfur gas. The sludge from the lime softener 6.13 can also remove some SO2 gas. Solid rich water 6.39, possibly with gypsum and calcium sulfite (generated from the reaction between the sulfur and the lime), is continually removed from the bottom of vessel 6.41. It is recycled back to the DCSG, where the solids are removed in dry or semi-dry form 6.37. The liquid water is converted back to steam 6.38. The solid-free saturated steam and combustion gases 6.43 flow to the heat exchanger 6.48. The steam condenses to liquid water 6.40. The heat is used to heat the BFW water 6.21. The heated BFW water 6.22 is used in the OTSG to generate 80% quality steam. Or, the water 6.40 can be recycled back to a water treatment facility, where it is added to de-oiled produced water 6.10. The heat exchange 6.48 can also be done in a pressure vessel by direct contact between the up-flow steam and combustion gas and down flow recycled cooler water (not shown). The generated steam is injected into an underground formation for EOR.

Figure 6A:
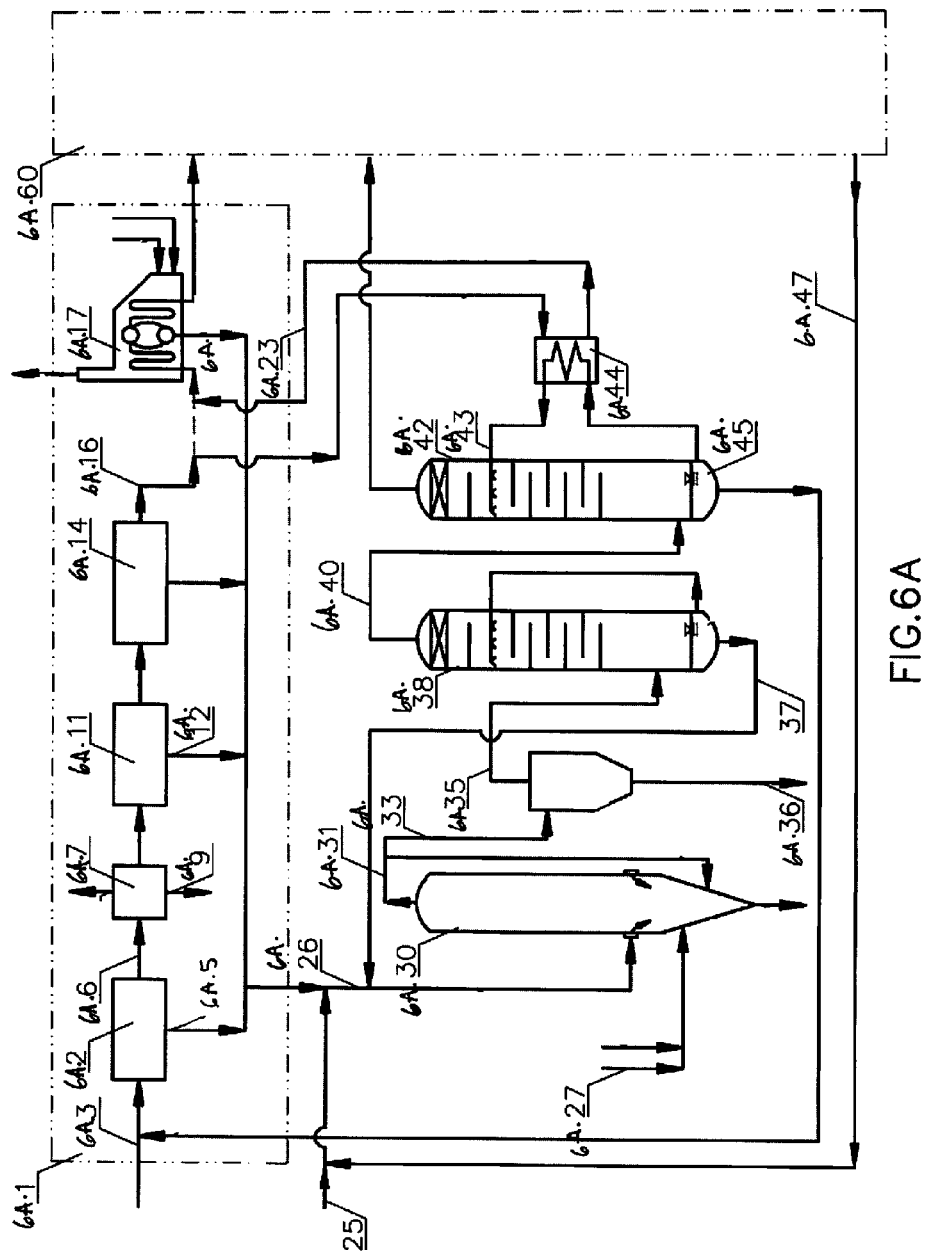
FIG. 6A is a schematic view of an integrated facility of the present invention with a commercially-available steam generation facility and open-mining oilsand facility.

FIG. 6A is a schematic of an integrated facility with a commercially available steam generation facility 6A.1, for open mining oilsand facility 6A.60. The steam for the bitumen extraction is generated with commercially available boilers 6A.17 that include steam and mud drums. The water for steam generation is produced using a standard, commercially available water treatment facility that is based on ion exchange and polishers. Raw water 6A.3 flows to the de-mineralized water clarifier and filter 6A.2. The filtered water 6A.6 flows to a cation reactor and de-gasifier 6A.7. The water then flows to anion reactor 6A.11. From the anion reactor, it goes to a mixed bed polisher 6A.14, to generate de-mineralized BFW quality water 6A.16. Chemicals are continually supplied during the process, to remove minerals. In the process, reject and backwash water is continually generated 6A.5, 6A.9, 6A.12, 6A.15. The reject water contains minerals and water treatment chemicals. The reject water is collected and injected into the vertical up-flow, cold fluid bed, direct contact steam generator 6A.30. Fuel 6A.27 and oxidizer are injected to the bottom of fluidized bed steam generator 6A.30. The water 6A.26 is sprayed into the steam generator 6A.30, above the combustion zone. The sprayed water is composed of: water treatment or steam generation facility 6A.1 reject water, boiler blow-down water 6A.22, and reject water 6A.47 from oilsand mine extraction facility 6A.60. The reject water includes tailing water and possibly hydrocarbon contaminants. The liquid water is converted to steam and carries most of the solids upwards, where they are discharged at the top of the vessel as a solid-rich stream of gas 6A.31. Some of the cooler discharged gas, at a temperature range of 150 C-400 C, is recycled back to the bottom of the steam generator 6A.30 to maintain the cold fluid bed below the combustion zone. This reduces the temperature and increases the up-flow stream in vessel of the steam generator 6A.30. Solids 6A.36 are removed in dry form from the solid-rich gas flow 6A.33. The solid lean gas flow 6A.35 is washed in tower 6A.38 with saturated water to remove any solid remnants. Sulfur gas can be removed as well with the use of lime. After most of the solids have been removed, the solid rich water is recycled back to steam generator 6A.30. Make-up water, possibly with alkali material like lime stone, is added to vessel 6A.38 to maintain saturated liquid water level. The saturated stream of steam and NCG 6A.40 flows to vessel 6A.42, where heat is recovered using direct-contact cold water circulation 6A.43. The recovered heat goes in through liquid heat exchanger 6A.44. The heat increases the temperature of the treated BFW (Boiler Feed Water) in steam generation facility 6A.1. The heated BFW temperature can be in the range of 70 C-200 C, depending on the partial steam pressure of vessel 6A.42. The heated BFW 6A.23 is fed to the boiler steam generator 6A.17 to generate high pressure steam for the oil sand mine and bitumen extraction facility 6A.60. The condensate 6A.45 can also be used directly as process water in facility 6A.60.

Figure 7:
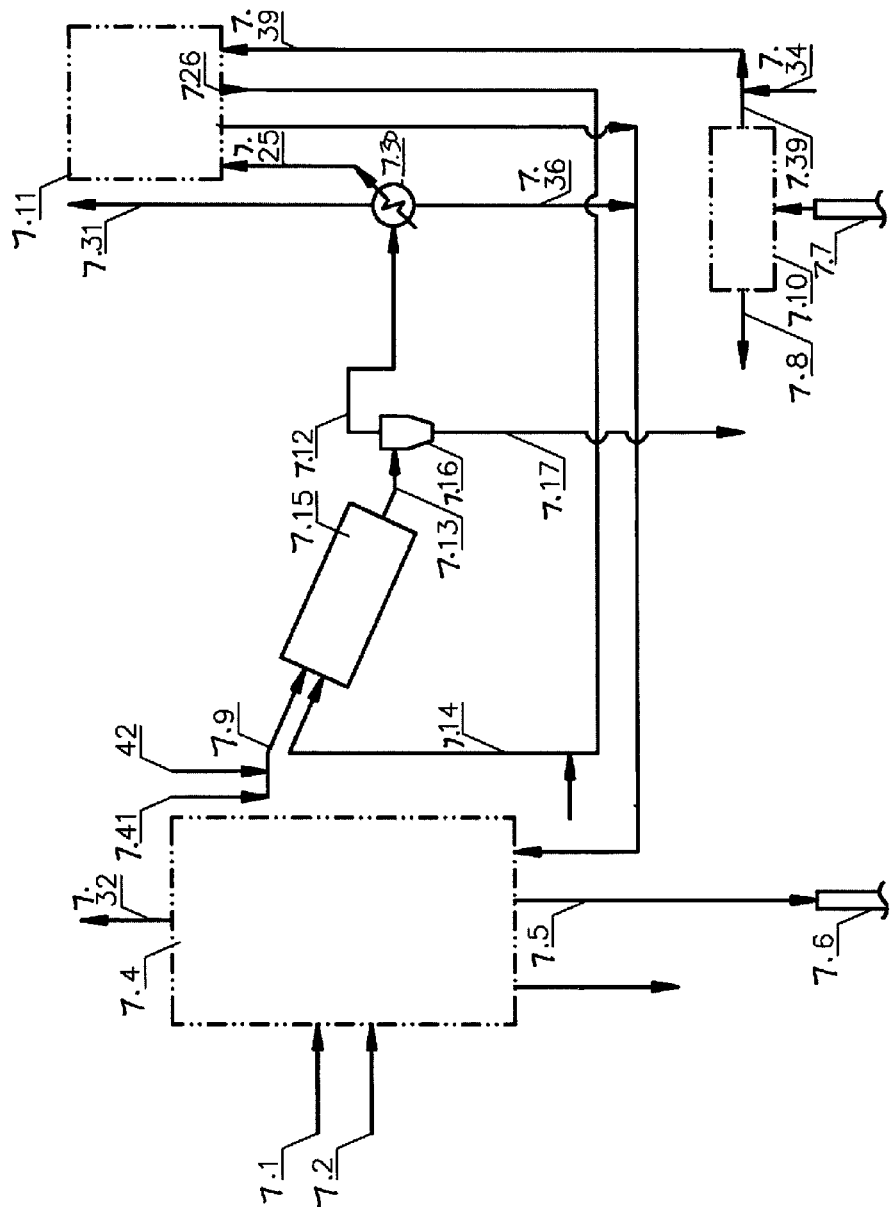
FIG. 7 is a schematic view of an illustration of a boiler, fired direct contact steam generator with dry solid generation, solid removal, heat exchanger and condenser and distillation facility for generating distilled water for steam generation for EOR.

FIG. 7 is an illustration of one embodiment of the present invention. Fuel 7.2 is mixed with oxidizing gas 7.1 and injected into the steam boiler 7.4. The boiler is a commercially available atmospheric pressure boiler. If a solid fuel boiler is used, the boiler might include a solid waste discharge. The boiler produces high-pressure steam 7.5 from distilled BFW 7.19. The steam is injected into the underground formation through injection well 7.6 for EOR.

The boiler combustion gas are possibly cleaned and discharged from stack 7.32. If natural gas is used as the fuel 7.2, there is currently no mandatory requirement in Alberta to further treat the discharged flue gas or remove CO2.

Fuel 7.41, possibly solid fuel in a slurry form, is mixed with oxidizing gas 7.1 and is injected into a pressurized, direct-contact steam generator (DCSG) 7.15 where the combustion occurs at an elevated pressure. The DCSG design can include a horizontal rotating reactor, a fluidized bed reactor and an up-flow reactor or any other reactor that can be used to generate a stream of gas and solids. Solids-rich water 7.14 is injected into the direct contact steam generator 7.15 where the water evaporates to steam and the solids are carried on with gas flow 7.13. The amount of water 7.14 is controlled to verify that all the water is converted to steam and that the remaining solids are in a dry form. The solid-rich gas flow 7.13 flows to a dry solids separator 7.16. The dry solids separator is a commercially available package and it can be used in a variety of gas-solid separation designs. The solids 7.17 are taken to a land-fill. The solids lean flow 7.12 flows to the heat exchanger 7.30. The heat exchanger can be a non-direct or direct contact heat exchanger. In a direct heat exchanger, cold distilled boiler-feed quality water 4 can be sprayed into the saturated steam and combustion gas 24 (not shown). The steam continually condenses because of heat exchange. The non-condensable combustion gases 7.31 (after most of the water vapor was condensed) are released for further treatment, like CO2 recovery for sequestration, or directly to the environment, if there is no requirement for CO2 capture. In a non-direct heat exchanger, heat 7.25 is recovered from gas flow 7.12. The condensed water 7.36 can be used for steam generation. The condensation heat 7.25 can be used to supply the heat to operate the distillation unit 7.11.

The distillation unit 7.11 produces distillation water 7.18. The brine water 7.26 is recycled back to the direct contact steam generator (also named solids dryer) 7.15 where the liquid water is converted to steam and the dissolved solids remain in a dry form.

The distillation facility 7.11 receives de-oiled produced water 7.39 that is separated in a commercially available separation facility 7.10 like that which is currently in use by the industry. Additional make-up water 7.34 is added. This water can be brackish water, from deep underground formation, or from any other water source that is locally available to the oil producers. The quality of the make-up water 7.34 is suitable for the distillation facility 7.11, where there are typically very low levels of organics due to their tendency to damage the evaporator's performance or carry on and damage the boiler. Water that contains organics is a by-product of the separation unit 7.10 and it will be used in the DCSG. By integrating the separation unit 7.10 and the DCSG 7.15, the organic contaminated by-product water can be used directly, without any additional treatment by the DCSG 7.15. This simplifies the separation facility 7.10 that can reject contaminated water without environmental impact. It is sent to the DCSG and solids dryer 7.15, where most of the organics are reacted in direct contact with the hot combustion gas flow.

The distilled water 7.19 produced by the distillation facility 7.11, possibly with the condensed steam from flow 7.12, are sent to the commercially available, non-direct, steam generator 7.4. The produced steam 7.5 is injected into an underground formation for EOR.

The brine 7.26 is recycled back 7.14 to the DCSG and solids dryer 7.15 as described before. The production well 7.7 produces a mixture of tar, water and other contaminants. The oil and the water are separated in commercially available plants 7.10 into water 7.9 and oil product 7.8.

Figure 7A:
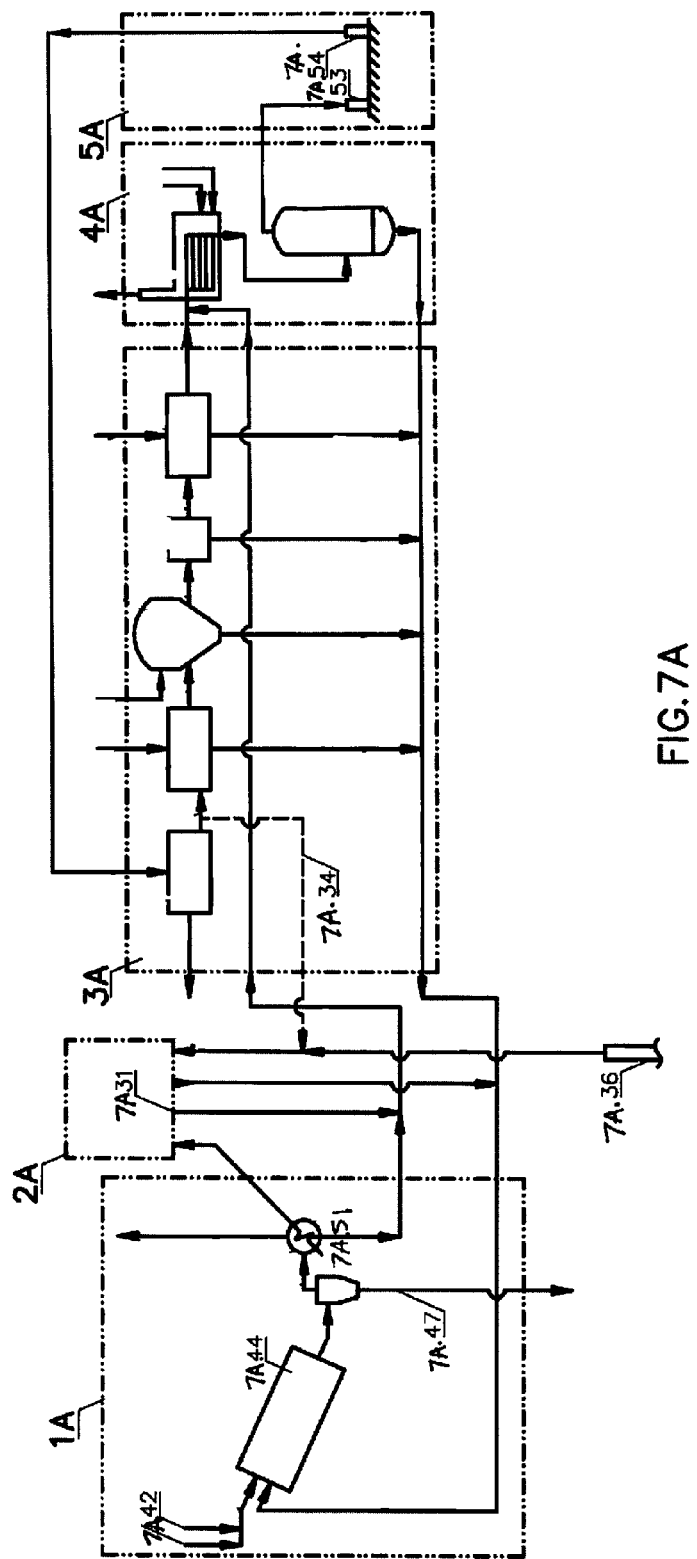
FIG. 7A is a schematic view of an illustration of one embodiment of the present invention that integrates the hot lime softener water treatment facility from FIG. 6 and the thermal distillation system of FIG. 7.

FIG. 7A is an illustration of one embodiment of the present invention that integrates the hot lime softener water treatment facility from FIG. 6 and the thermal distillation system of FIG. 7.

Block 3A is a typical oil separation and lime softener water treatment facility that was described in FIG. 6. Block 4A is a typical steam generation facility based on OTSG as described in FIG. 6. Block 5A is a typical oil-sand production pad that include a steam injection well 7A.53 and a production well 7A.54, where the production and the injection wells can be a single well used in intervals for injection of steam and production of oil and water ("huff & puff"). Block 2A is a thermal distillation facility that consumes heat and generates BFW for steam generation from de-mineralized water. Block 1A is a DCSG that consumes all the liquid waste from Block 2A, 3A and 4A and generates solid waste, water and heat to operate the distillation facility in Block 2A.

The fuel 7A.42 used in Block 1A is a high sulfur petcoke or coal. The lime softener sludge from Block 3A, together with lime stone slurry is used to remove the SO2 generated by the DCSG. This creates an over-all ZLD system as the slurry is converted to dry solids (after reacting with the SO2 to generate calcium sulfite and possibly gypsum) and removed in a dry form 7A.47 that can be disposed of with minimum impact to the environment. The water from the DCSG 7A.44 is condensed 7A.51 and used for steam generation. The heat generated by the DCSG 7A.50 is used to operate a thermal distillation facility 2A. The thermal distillation facility 2A consumes de-oiled water, possibly make-up water with high levels of TDS-like the water produced from wells 7A.36 for deep underground water formations. Recycled De-oiled water 7A.34 can be used as well by the distillation facility in Block 2A. The BFW produced by the distillation facility in Block 2A is used to produce steam in Block 4A. Typically the steam generated from lime softening treatment facility like 3A is used for producing 80% steam by OTSG 4A, while de-mineralized distilled water 7A.31 can be used for producing 100% steam with an industrial boiler (not shown in Block 4A).

Figure 8:
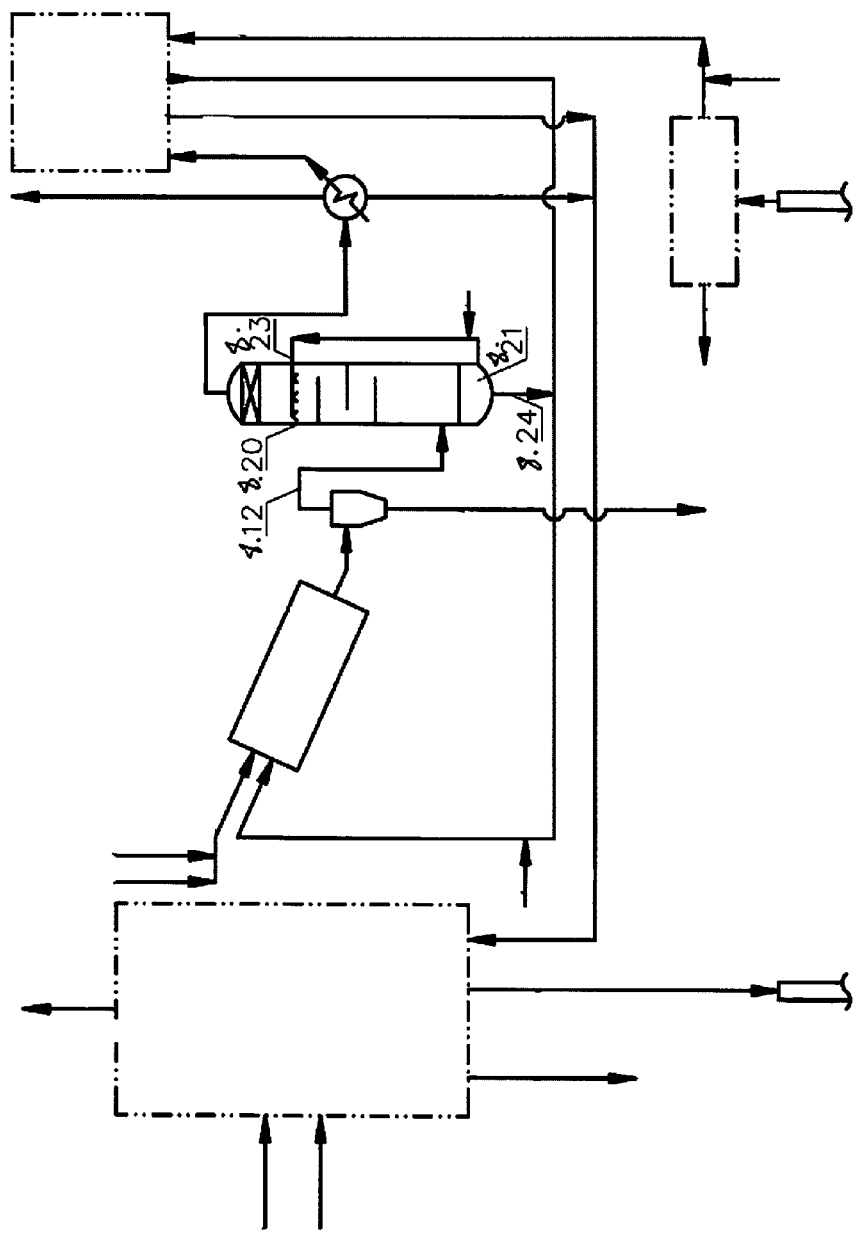
FIG. 8 is a schematic view of an illustration of a boiler, fired direct contact steam generator with dry solids generation, solids removal, direct-contact scrubber with wet steam generator, heat exchanger and condenser and distillation facility for generating distilled water for steam generation for EOR.

FIG. 8 is an illustration of one embodiment of the present invention. It is similar to FIG. 7 with the following modifications described below:

The solids lean flow 8.12 is mixed with saturated water 8.21 in vessel 8.20. The heat carried in the gas of the solids lean flow 8.12 can generate additional steam if its temperature is higher than the saturated water 8.21 temperature. The solids carried with the gas are washed by saturated liquid water 8.23. When sulfur-rich fuel (like petcoke or coal) is used, the liquid water may include lime stone to scrub the SO2 discharged from the fuel, while generating additional solids like calcium sulfite and gypsum. The solids rich water 8.24 is discharged from the bottom of the vessel 8.20 and recycled back to the DCSG 8.15 where the liquid water is converted to steam and the solids are removed in a dry form for disposal. The combustion gases, saturated with wet steam 8.22 are solids free and most of the sulfuric gases generated from burning sulfur-rich fuel are removed in the form of calcium sulfite and gypsum. The wet, solids free, gas mixture flows to heat exchanger 8.30 as described in FIG. 7 above.

Figure 9:
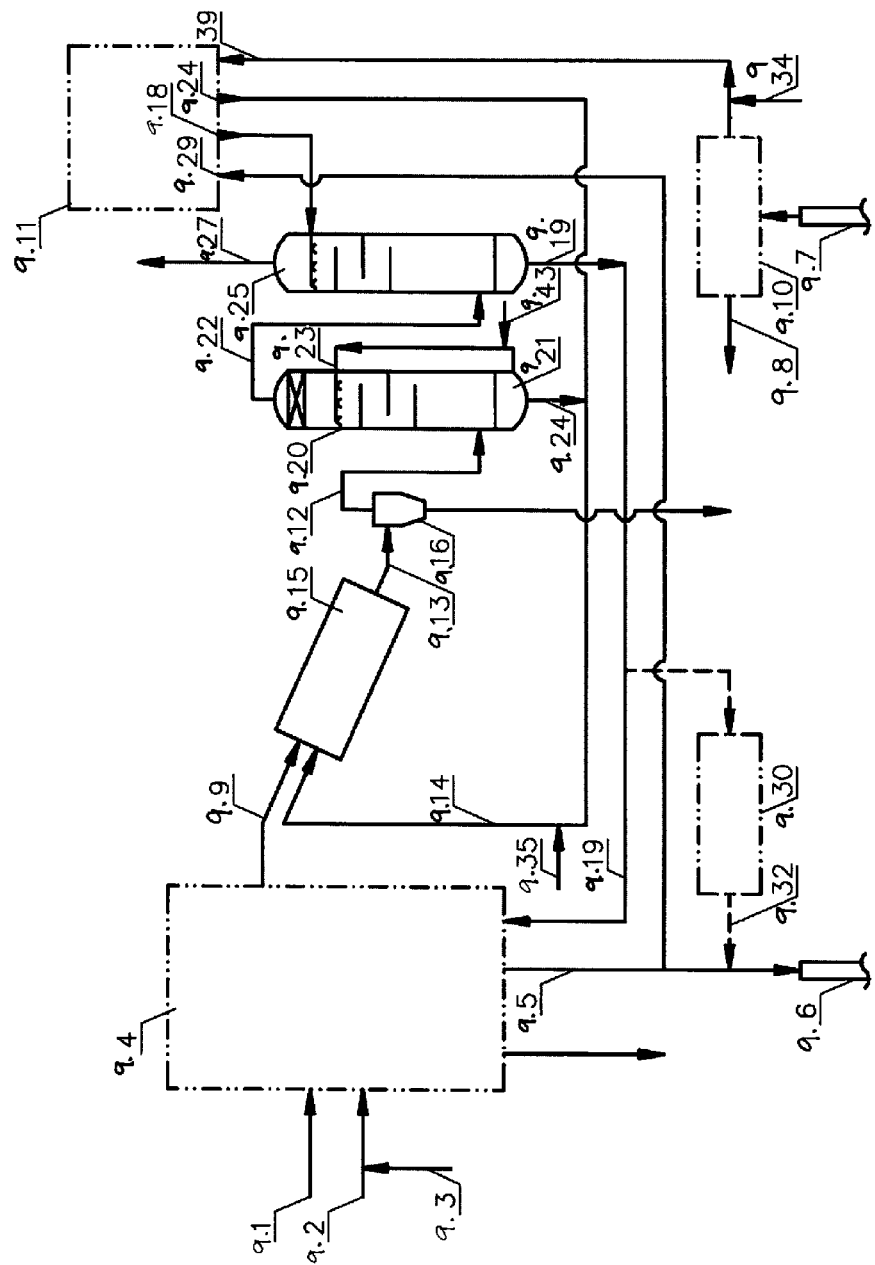
FIG. 9 is a schematic view of an illustration of a boiler with the boiler directly connected to a direct contact steam generator with dry solid generation, solid removal, a direct-contact scrubber with wet steam generator, a direct-contact condenser and low-pressure steam generation and distillation facility for generating distilled water for steam generation for EOR.

FIG. 9 is an illustration of one embodiment of the present invention. Fuel 9.2, possibly with water 9.3 is mixed with oxidizing gas 9.1 and injected into a pressurized steam boiler 9.4. The boiler can have solid waste discharged from the bottom of the combustion chamber. The boiler produces high-pressure steam 9.5 from the distilled feed water 9.19. The steam is injected to the underground formation through injection well 9.6 for EOR.

The combustion gases with carry-on flying solids flow to a direct contact pressurized dryer 9.15 (also called DCSG). The dryer generates steam from solid-rich water 9.14. The dryer discharges a stream of combustion gas 9.13 with dry steam and solid particles that are carried from the boiler 9.4 and from the solid rich water 9.14 that was used for steam generation. The amount of water 9.14 is controlled to verify that all the water is converted into steam and that the remaining solids are in a dry form. The solid-rich gas flow goes to a dry solids separator 9.16. The dry solids separator is a commercially available package and it can be used in a variety of gas-solid separation designs. In some designs the solids separator can be apart from the DCSG 9.15. The solids lean flow 9.12 is mixed with saturated water 9.21 in DCSG and in the wash vessel 9.20 where the excess heat carried with gas of the solids lean flow 9.12 generates steam. The solids carried with the gas are washed by the saturated liquid water (9.23). The liquid water may include lime to scrub the SO2 discharged from the boiler, generating additional solids. The solids rich water 9.24 is discharged from the bottom of the vessel 9.20 and recycled back to the dryer 9.15 where the liquid water is converted to steam and the solids are removed in a dry form for disposal. The combustion gases, saturated with wet steam 9.22, are solids free and most of the sulfuric gases generated from burning sulfur-rich fuel are removed in the form of gypsum and calcium sulfite. The wet gas mixture flows to a direct contact heat exchanger 9.25. Cold, distilled, boiler-feed quality water 9.18 is continually sprayed into the vessel of the heat exchanger 9.25, thus condensing some of the steam that is part of the combustion gases. The steam operating the distillation facility 9.29 is supplied from the boiler 9.5. The saturated steam in the combustion gas 9.22 continually condenses because of heat exchange with the cold distilled water 9.18. The non-condensable combustion gases 9.27 (after most of the water vapor has been condensed) are released from the pressure vessel of the heat exchanger 9.25 for further treatment, like CO2 recovery for sequestration, or directly to the environment, if there is no requirement for CO2 sequestration.

The distillation unit 9.11 produces distillation water 9.18 and brine water 9.24. The brine water is recycled back to the DCSG/solids dryer 9.15 where the liquid water is converted to steam and the dissolved solids remain in a dry form.

The distillation unit 9.11 receives de-oiled produced water 9.39 that has been separated in a commercially available separation facility 9.10 like that which is currently in use by the industry. Additional make-up water 9.34 is added. This make-up water can be brackish water, from deep underground formations or from any other water source that is locally available to the oil producers. The quality of the make-up water 9.34 which is suitable for the distillation facility or unit 9.11, there are typically very low levels of organics due to their tendency to damage the evaporator's performance or to damage the boiler further in the process. Low quality water 9.35 with high levels of dissolved and suspended solids that include organics is not acceptable by the distillation facility or unit 9.11. This low quality water 9.35 (if available) is sent directly to the DCSG and solids dryer 9.15, where the water is evaporated in direct contact with the hot combustion gas flow into two components: gas and dry solids 9.13.

The cold distilled water produced by the distillation facility or unit 9.11 is used to recover the steam and the condensation heat in the saturated gas flow 9.22. The condensate and the distilled water 9.19, possibly after some additional treatment (not shown), are sent for the generation of high-pressure steam 5 in the boiler 9.4 for EOR. If the amount of distillate water is larger than the amount of steam generated by the boiler 9.4, it will be possible to use a separate steam generation facility 9.30 for the production of high-pressure steam 9.32 for EOR.

The brine 9.24 and the scrubbing water 9.21 are recycled back to 9.14 (to the DCSG and solids dryer 9.15) as described earlier. Some brine 9.24 can be used in the make-up water 9.43. The high-pressure steam from the boiler 9.5 and from a possible separate steam generator facility 9.32 is injected into the injection well for EOR.

The well 9.7 produces a mixture of tar, water and other contaminates. The oil and the water are separated in commercially available plants 9.10 into de-oiled water 9.9 and the oil product 9.8.

Figure 10:
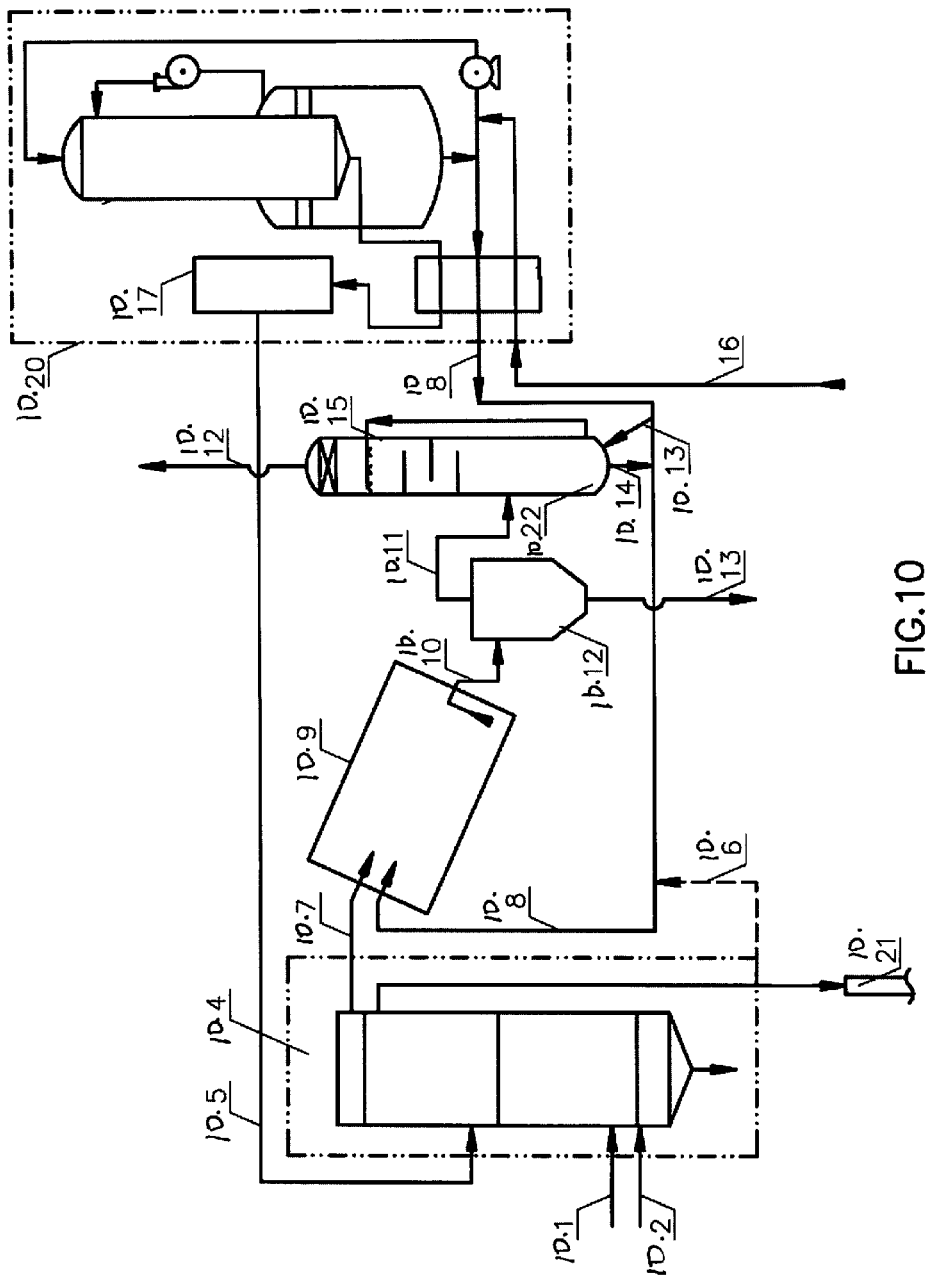
FIG. 10 is a schematic view of an illustration including an atmospheric boiler, direct contact dryer with dry solid generation, solid removal, direct-contact scrubber with wet steam generator, and Mechanical Vapor Compression distillation facility for generating distilled water for steam generation in the boiler for EOR.

FIG. 10 is an illustration of a boiler, direct contact dryer with dry solid generation, solid removal, direct-contact scrubber with wet steam generator, and Mechanical Vapor Compression distillation facility for generating distilled water for steam generation in the boiler for EOR. Fuel 10.2, possibly with water, is mixed with air 10.1 and injected into a steam boiler 10.4. The boiler may have waste discharged from the bottom of the combustion chamber. The boiler produces high-pressure steam 10.3 from treated distillate feed water 10.5. The steam is injected into the underground formation through injection well 10.21 for EOR.

The combustion gases with carry-on flying solids flow to direct contact dryer 10.9. The dryer can be a commercially available direct-contact rotary dryer or any other type of direct contact dryer capable of generating solid waste and steam from solid-rich brine water 10.8. The dryer discharges a stream of combustion gas 10.10 with dry steam and solid particles that are carried on from boiler 10.4 and from the solid rich water 10.8. The amount of water 10.8 is controlled to verify that all the water is converted to steam and that the remaining solids are in a dry form. The solid-rich gas flow goes to a dry solids separator 10.12. The dry solids separator is a commercially available package and it can be used in a variety of gas-solid separation designs. The solids lean flow 10.11 is mixed with saturated water 10.22 in a direct contact wash vessel 10.15. The solids carried with the gas are washed by saturated liquid water 10.22. The liquid water may include lime to scrub the SO2 discharged from the boiler, generating additional solids. The solids rich water 10.14 is discharged from the bottom of the vessel 10.22 and recycled back to dryer 10.9 where the liquid water is converted to steam and the solids are removed in a dry form for disposal. The combustion gases of the dry solids separator 10.12 are solids-free and most of the sulfuric gases generated from burning sulfur-rich fuel are removed in the form of calcium sulfite and gypsum. The combustion gases are released from vessel 10.15 for further treatment, like CO2 recovery for EOR, or directly to the environment if there is no requirement for CO2 sequestration.

The commercially available distillation unit 10.20 produces distillation water 10.8. The brine water 10.24 is recycled back to the direct contact steam generator and solids dryer 10.15 where the liquid water is converted to steam and the dissolved solids remain in dry form.

Distillation unit 10.11 is a Mechanical Vapor Compression (MVC) distillation facility. It receives de-oiled produced water 10.16 that has been separated in a commercially available separation facility currently in use by the industry with additional make-up water (not shown). This water can be brackish, from deep underground formations or from any other water source that is locally available to the oil producers. The quality of the make-up water is suitable for the distillation facility 10.20, where there are typically very low levels of organics due to their tendency to damage the evaporator's performance or damage the boiler further in the process. The distilled water produced by distillation facility 10.11 is treated by the distillate treatment unit 10.17, typically supplied as part of the MVC distillation package. The treated distilled water 5 can be used in the boiler to produce 100% quality steam for EOR.

The brine 10.8 and the scrubbing water 10.14 are recycled back to the dryer 10.9 as previously described. The heat from flow 10.12 can be recovered through a heat transfer (not shown) to heat the produced water and the feed water. The condensing steam from flow of the dry solids separator 10.12 can be recovered in the form of liquid water by condensation (not shown). Some brine 8 can be use in the make-up water 10.13. The high-pressure steam from the boiler 10.4 is injected into the injection well 10.21 for EOR. With the use of a low pressure system, the thermal efficiency of the system is lower than using a high pressurized system with pressurized DCSG instead of a low pressure dryer.

Figure 11:
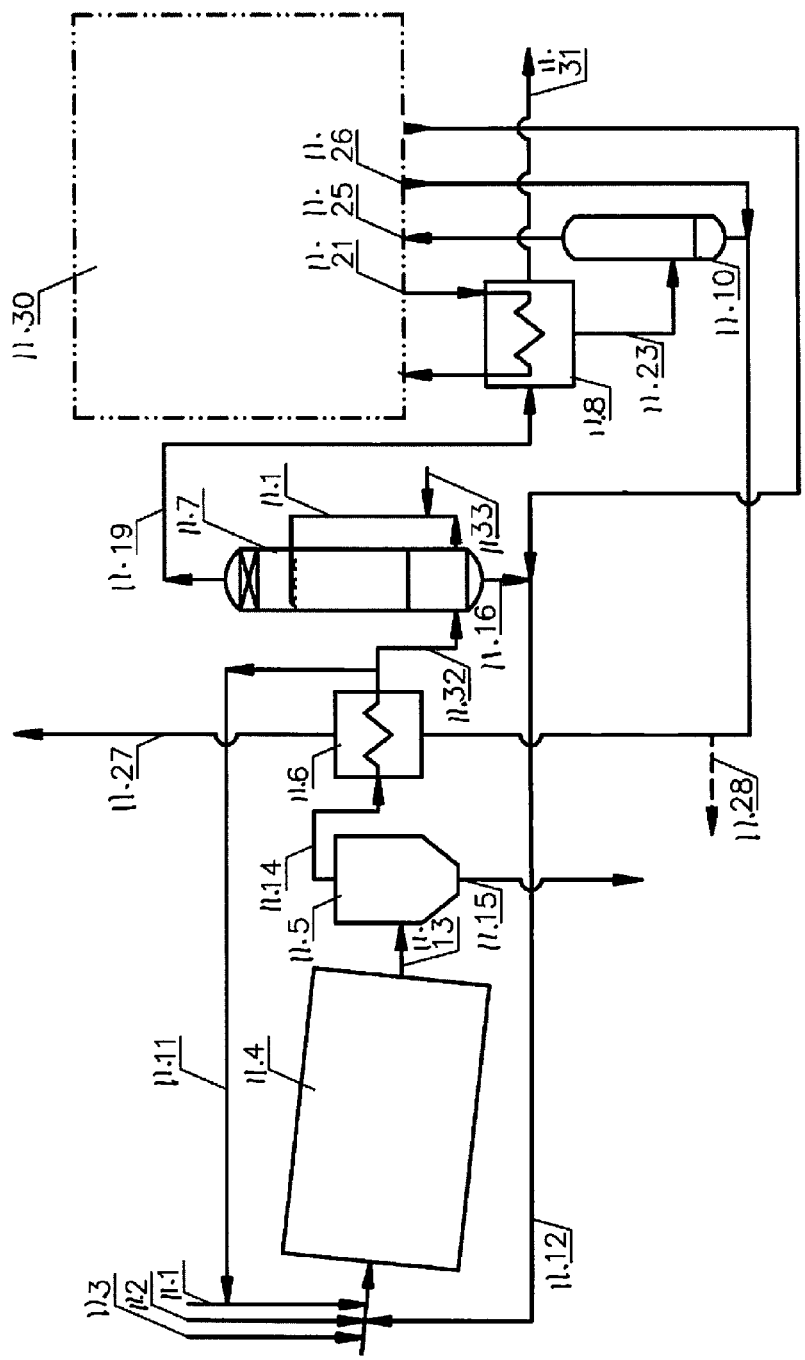
FIG. 11 is a schematic view of a diagram of a direct contact steam generator, solids separator, heat exchanger for steam generation, scrubbing vessel and condenser for generating low pressure steam for distillation facilities.

FIG. 11 is a schematic diagram of one embodiment of the invention. Fuel 11.2, possibly with water 11.3 is mixed with oxidizing gas 11.1, possibly with recycled cooled combustion gas 11.11, and is injected into a pressurized, direct-contact rotating steam generator 11.4 where the combustion occurs at an elevated pressure. This produces high-pressure combustion gases and steam 11.13. Solids-rich water 11.12 is injected to the direct contact steam generator 11.4 where the water evaporates to create steam and the solids are carried on with gas flow 11.13. The amount of water 11.3 is controlled to verify that all the water is converted into steam and that the remaining solids are in a dry form and at the desired temperature. The solids-rich combustion gases discharged from the steam generator flow to a dry solids separator 11.5. The dry solids separator is a commercially available package. The solids are removed in a dry form from the separator 11.15. The solids lean flow 11.14 goes through heat exchanger 11.6 where high-pressure steam 11.27 is generated from distilled water 11.17. Some of the distilled water 11.28 can be used to generate steam in a separate steam generation facility. If the oxidized gas is comprised of oxygen or oxygen enriched air, some of the combustion gases can be recycled back to the direct-contact steam generator 11.4 and mixed with the oxidizing gas to control the combustion temperature. The steam-rich combustion gases are mixed with saturated water in a direct-contact steam generation and wash vessel 11.7 where the excess heat carried by the gas 11.32 generates steam and the solids carried with the gas are washed by the saturated liquid water 11.16. The liquid water may include alkali materials, like lime, to scrub the SO2 presence in the pressurized combustion gases generated by the steam generator 11.4. Make-up water 11.33 is added to the scrubbing vessel 11.7 to replace the evaporated water and the solid-rich water is discharged and recycled from the vessel bottom 11.16. The combustion gases, saturated with wet steam 11.19, are solids-free and most of the sulfuric gas generated from burning sulfur rich-fuel, is removed in the form of gypsum and calcium sulfite. The wet gas mixture 11.19 flows to the heat exchange condenser 11.8 where the thermal energy is used to heat the produced and make-up water 11.21 used by the distillation facility 11.30. The distillation facility 11.30 is also a commercially available facility. For example, it could be a Multi Effect Distillation unit or Multi Stage Flash unit. The condensed water 11.23 from condenser 11.8 flows to a flash tank separator 11.10. Steam generated in flash tank 11.25 is used to operate the distillation facility. The distillation facility produces distillation water. The distillation water 11.26, together with the liquid water from the flash tank 11.10, is used for steam generation in a non-direct steam generator boiler 11.6. Brine water 11.29 rejected from distillation facility 11.30 is recycled, together with 11.16-the solid-rich water discharged from vessel 11.12, back to the direct contact steam generator 11.4 where the water is converted to steam and the solids are removed in a dry form 11.15. The non-condensable combustion gases 11.31 are released from the heat exchanger 11.8. The CO2 can be recovered and used for sequestration or released to the environment if there is no requirement for the CO2 recovery.

Figure 12:
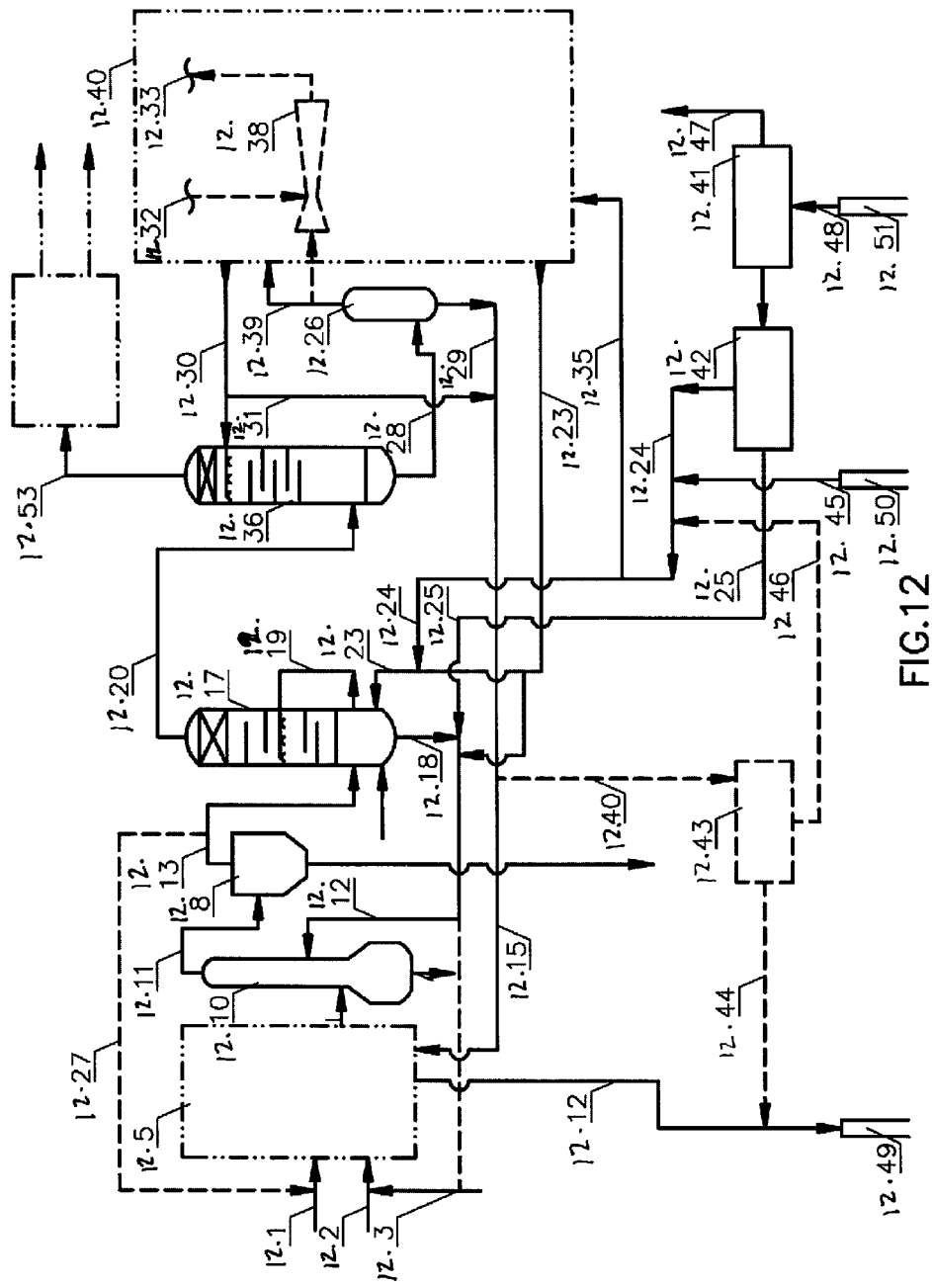
FIG. 12 is a schematic view of an illustration of a boiler, direct contact steam generator with dry solids generation, solid removal system, direct-contact scrubber with a wet steam generator, direct-contact condenser and a low pressure steam generation and distillation facility for producing distilled water for steam generation for EOR.

FIG. 12 is an illustration of one embodiment of the invention. Fuel 12.2, possibly with water 12.3, is mixed with oxidizing gas 12.1 and injected into a pressurized steam boiler 12.5 where the combustion occurs at an elevated pressure, in the range of 2 bar to 70 bar. The boiler can have solid char discharged from the bottom of the combustion chamber. The boiler produces high-pressure steam 12.12 from distilled feed water 12.15. The steam is injected into the underground formation through injection well 12.49, for EOR.

The combustion gases with carry-on fly solids flow to a direct-contact pressurized spray dryer and steam generator 12.10. The dryer generates steam 12.12 from solid-rich water. The fluid discharged from the dryer contains fly solids that are generated from the evaporated water, as well as solids that were carried with the combustion gas flow from the boiler. The amount of water from steam 12.12 is controlled to verify that all the water is converted to steam and that the remaining solids are in a dry form. As a result, the discharge 12.11 from dryer 12.10 is a dry combustion gas mixture (i.e. it has superheated dry steam). The solid-rich gas flows to a dry solids gas separator 12.8. The separator is a commercially available package which can be used with a variety of gas-solid separation designs. Dry solids are recovered for disposal through pressure reduction chambers (not shown). The solids lean flow from the steam 12.12 is mixed with saturated water 12.19 in a direct-contact steam generation and wet scrubbing vessel 12.17, where the heat carried by the gas 12.13 generates steam. The solids carried by the gas are washed by the saturated liquid water 12.19. The liquid water may include alkali material, like lime, to scrub the SO2 discharged from the boiler. The solids-rich water 12.18 is discharged from the bottom of the vessel 12.17 and recycled as steam 12.12 back to DCSG 12.10, where the liquid water is converted to steam, and where the solids are removed in a dry form for disposal. The combustion gases, saturated with wet steam 12.20, are solids-free and most of the sulfuric gas generated from burning sulfur-rich fuel is removed in the form of calcium sulfite and gypsum. The wet gas mixture 12.20 flows into a direct contact heat exchanger which is also a steam condenser 12.36. Cold, distilled, boiler feed quality water 12.30 is continually sprayed into vessel of the dry solids separator 12.36 while condensing some of the steam that is part of the combustion gases. The amount and the temperature of the liquid injected water 12.30 is controlled to maintain the heated condensation of the liquid water 12.28 at a temperature close to (but not colder than) the saturated temperature of the partial steam pressure in the vessel. The saturated steam in combustion gas 12.20 continually condenses because of its heat exchange with the cold distilled water 12.30 and increased quantities of the saturated liquid water 12.28. The non-condensable combustion gases 12.53 are released from vessel 36 for further environmental-related processing. This occurs after most of the water vapor is condensed. Processing may include CO2 recovery for sequestration. Otherwise, the waste products can be released directly into the environment, if there are no laws stating otherwise, or if there are no economic advantages to CO2 sequestration. There are few developed technologies that separate CO2 from the pressurized discharged flow 12.53 which are able to use the discharged pressure for reduction of energy consumption during separation while still pressurizing and drying the CO2. If oxygen is used as the oxidizer gas, some cooled combustion gases 12.27 (mainly CO2 and H2O) will be recycled back and mixed with the oxygen to maintain combustion temperatures at a usable range, typically less than 2000 C. The technology for Oxy-combustion is well known; boilers designed for this process are commercially available.

The liquid water at saturated temperature 12.28 is delivered to flash tank 12.26 and flashed at a pressure lower than the partial pressure of the steam in vessel of the steam condenser 12.36. It is converted to pure steam 12.39 that is used to drive the distillation process 12.40. The condensation 12.29 from the flash tank 12.26 is recycled back and used for generating steam in boiler 12.5, or in a separate steam generator unit 12.43 for EOR. Distillation unit 12.40 is a commercially available unit. A typical distillation technology can be the Multi Effect Distillation unit, possibly with Thermal Vapor Compression, that uses a steam jet compressor 12.38 to increase the system output by working as a heat pump over the multi evaporator condensers cells, between lines 12.32 and 12.33 (not shown). The distillation produces BFW quality water 12.30 used for steam generation in boiler 12.5. The distillation facility produces brine water 12.23 with a high concentration of dissolved solids. The brine water 12.23 is recycled back to the direct contact steam generator and solids dryer 12.10 where the liquid water is sprayed into the combustion gas and converted to steam and dry solids particles.

Production well 12.51 produces a mixture of bitumen, water and gas 12.48. The produced mixture is separated in commercially available treatment plants that use a variety of separation technologies to separate the produced emulsion into oil products and water. The produced hydrocarbons 12.47 are sold or sent out for further treatment. The produced water is treated to remove carbon contaminants in commercially available processes 12.42. The de-oiled water 12.24 is used as the water source for distillation facility 12.40 and possibly as make-up water for wet scrubbing and steam generation unit 12.17. Any oily water 12.25 is recycled back to dryer 12.10 or used with the fuel 12.3 for preparing the solid fuel and water slurry 12.2 for the boiler 12.5. Additional make-up water 12.45, which may be brackish, can be produced from a deep underground well 12.50. This water is added to the produced water and treated by distillation facility 12.40 or used as make-up water for the wet scrubber and steam generator 12.17. If an additional steam generator facility is used, like Co-Gen or OTSG where approximately 80%-90% quality steam is produced, then the steam is separated and 100% of the quality steam 12.44 is injected through injection well 12.49 for EOR. The blow-down water 12.46 is recycled back to the saturated water steam generator and wet scrubber 12.17.

Distillation unit 12.40 receives de-oiled, produced water 12.35, which is separated into commercially available separation facilities currently in use by the industry. Additional make-up water 12.45 is added. This water can be brackish water from deep underground formations, 12.50 or from other water sources that are locally available to the oil producers. The quality of the make-up water 12.45 is suitable for the distillation facility or unit 12.40, where typically the levels of organics are at very low levels due to their tendency to damage the evaporator's performance or the boiler. Low quality water, 12.35 with high levels of dissolved and suspended solids that include organics, is not accepted by the distillation facility or unit 12.40. These contaminants are sent to the direct contact steam generator within the solids dryer 12.10, where they are converted by direct contact with the hot combustion gas flow to steam and dry solids 12.11.

The cold distilled water produced by distillation facility or unit 12.40 is used to recover the condensed heat in saturated gas flow 12.20, while generating low-pressure steam 12.39 for running the distillation facility or unit 12.40. The rest of the condensation 12.29 and the distilled water 12.31 are combined and sent for generating high-pressure steam in boiler 12.5 and possibly, are also sent to a separate steam generation facility 12.43 where high-pressure steam 12.12 is produced for EOR.

The brine 12.23 that is rejected from the distillation facility is recycled back to dryer 12.10 and to vessel 12.17, together with additional make-up water 12.4. The brine 12.23 and scrubbing water 12.18 is recycled back to 12.12, to the direct contact steam generator and solids dryer 12.10, as previously described.

The high-pressure steam from boiler 12.5 and possibly from a separate steam generator facility 12.43 is injected into the injection well 12.49 for EOR.

The produced well 12.51 produces a mixture of oil, water and other contaminants. The oil and the water are separated 12.41 into de-oiled water 12.24 and oil product 12.47.

Figure 13:
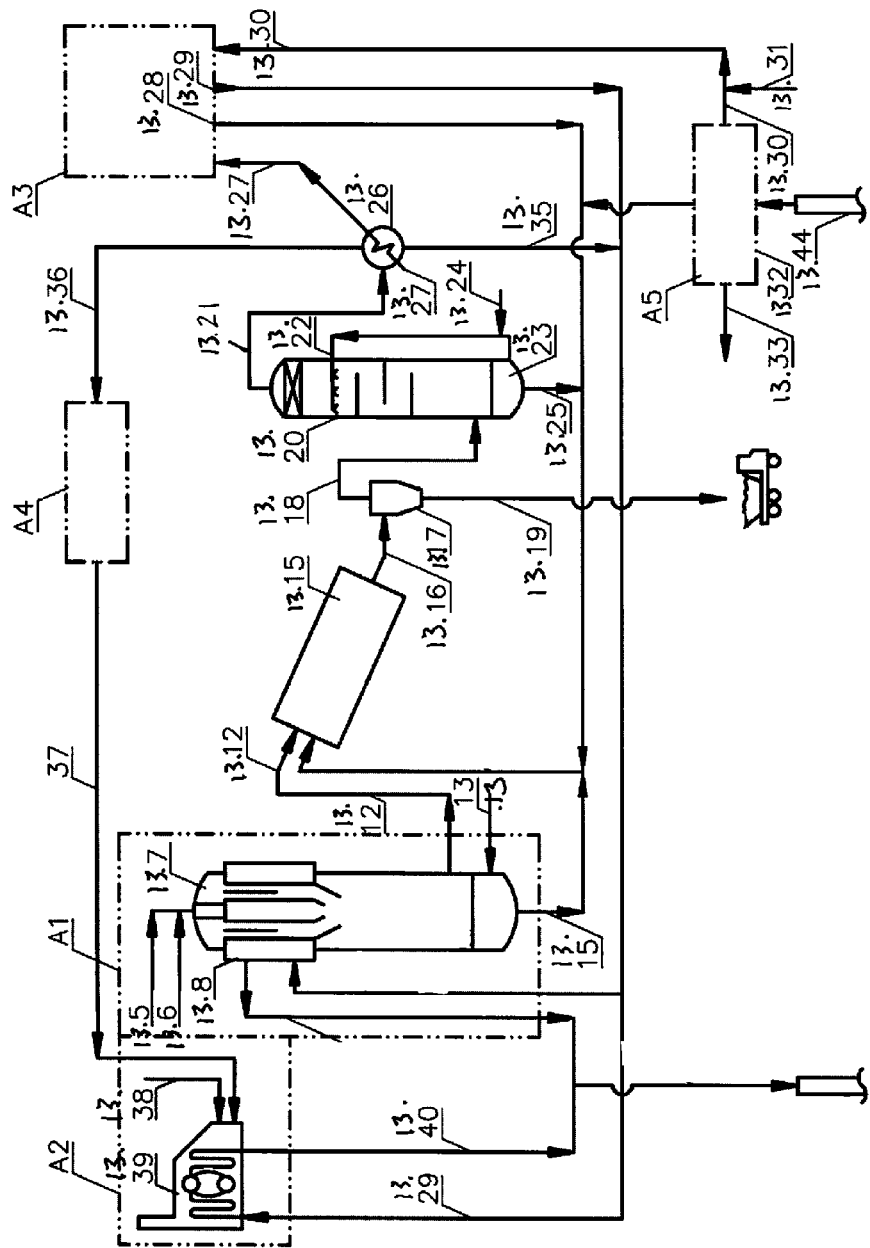
FIG. 13 is a schematic view of an illustration of the use of a gasifier that generates syngas with a water distillation facility and syngas fired steam generation facility of the present invention.

FIG. 13 is an illustration of the use of a partial combustion gasifier with the present invention for the production of syngas for use in steam generation, a DCSG combined with a water distillation facility for ZLD.

The system contains few a commercially available blocks, each of which includes a commercially available facility:

Block A1 includes the gasifier that produces syngas.

Block A2 includes a commercially available steam generation boiler that is capable of combusting syngas.

Block A3 includes a commercially available thermal water distillation plant.

Block A4 includes syngas treatment plant where part of the syngas can be used for hydrogen production etc.

Block A5 includes a water-oil separation facility with the option of oily water discharge for recycling into the DCSG.

Carbon fuel 13.5 is injected with oxygen rich 13.6 gas to a pressurized gasifier 13.7. The gasifier shown is a typical Texaco (GE) design that includes a quenching water bath at the bottom. Any other pressurized partial combustion gasifier design can also be used. The gasifier can include a heat exchanger, located at the top of the gasifier (near the combustion section), to recover part of the partial combustion energy to generate high pressure steam. The heat exchanger 13.8 can be less efficient, without negatively affecting the efficiency of the whole system, because a significant portion of the heat will be used to evaporate water in a direct heat exchange with the syngas. This could allow the use of a radiation heat exchanger in a radial distance from the partial combustion area to avoid any contact with melted slug particles and without the need for an additional pass of the combustion gases through the heat exchanger. (see US Publication No. 2007/0186473A1 published by Wallace).

At the bottom of the gasifier, there is a quenching bath with liquid water to collect solids. Make-up water 13.13 is then injected to maintain the liquid bath water level. The quenching water of the DCSG 13.15, that includes the solids generated by the gasifier, is injected into a DCSG 13.15 where it is mixed with the produced hot syngas discharged from the gasifier 13.12. The DCSG also consumes the produced brine from the water treatment plant that generates the BFW. In the DCSG, the water is evaporated into pressurized steam and solids (which were carried with the water and the syngas into the DCSG). The DCSG generates a stream of gas and solids 13.16. The solids 13.19 are removed from the gas flow by a separator 13.17 for disposal. The solids lean gas flow 13.18 (after most of the solids have been removed from the gas) is injected into a pressurized scrubber 13.20 that removes the solid remains and can generate saturated steam from the heat in gas flow 13.18 as well. Solids rich water 13.25 is continually rejected from the bottom of the scrubber and recycled back to the DCSG 13.15. Heat 13.27 is recovered from the saturated water and syngas mixture 13.21 while condensing steam 13.21 to liquid water 13.35 and water lean syngas 13.36. The condensed water 13.35 can be used as BFW after further treatment to remove contaminations (not shown). The heat 13.27 is used to operate a thermal distillation facility A3.

There are several commercially available facilities for this, like MSF (Multi Stage Flashing) or MED (Multi Effect Distillation). The distillation facility uses de-oiled produced water 13.30, possibly with make-up brackish water 13.31 and heat 13.27 to generate a stream of de-mineralized BFW 13.29 for steam generation and a stream of brine water 13.28, with a high concentration of minerals. The generated brine 13.28 is recycled back to the DCSG 13.15. The syngas can be treated in commercially available facilities A4 to remove H2S using amine or to recover hydrogen. The treated syngas 13.37, together with oxygen 13.38, is used as a fuel source in the commercially available steam generation facility A2. The high pressure steam 13.40 is generated in steam boiler 13.39 from the BFW 13.29. The steam from the boiler 13.40, possibly together with the steam generated by the gasifier 10, is injected into an underground formation for EOR. The produced bitumen and water recovered from production well 13.44 are separated in the water-oil separation facility A5 to produce bitumen 13.33 and de-oiled water 13.30. Oily water 13.34 can be rejected and consumed in the DCSG 13.15. By allowing continuous rejection of oily water, the chemical consumption can be reduced and the efficiency of the oil separation unit can be improved.

Figure 14:
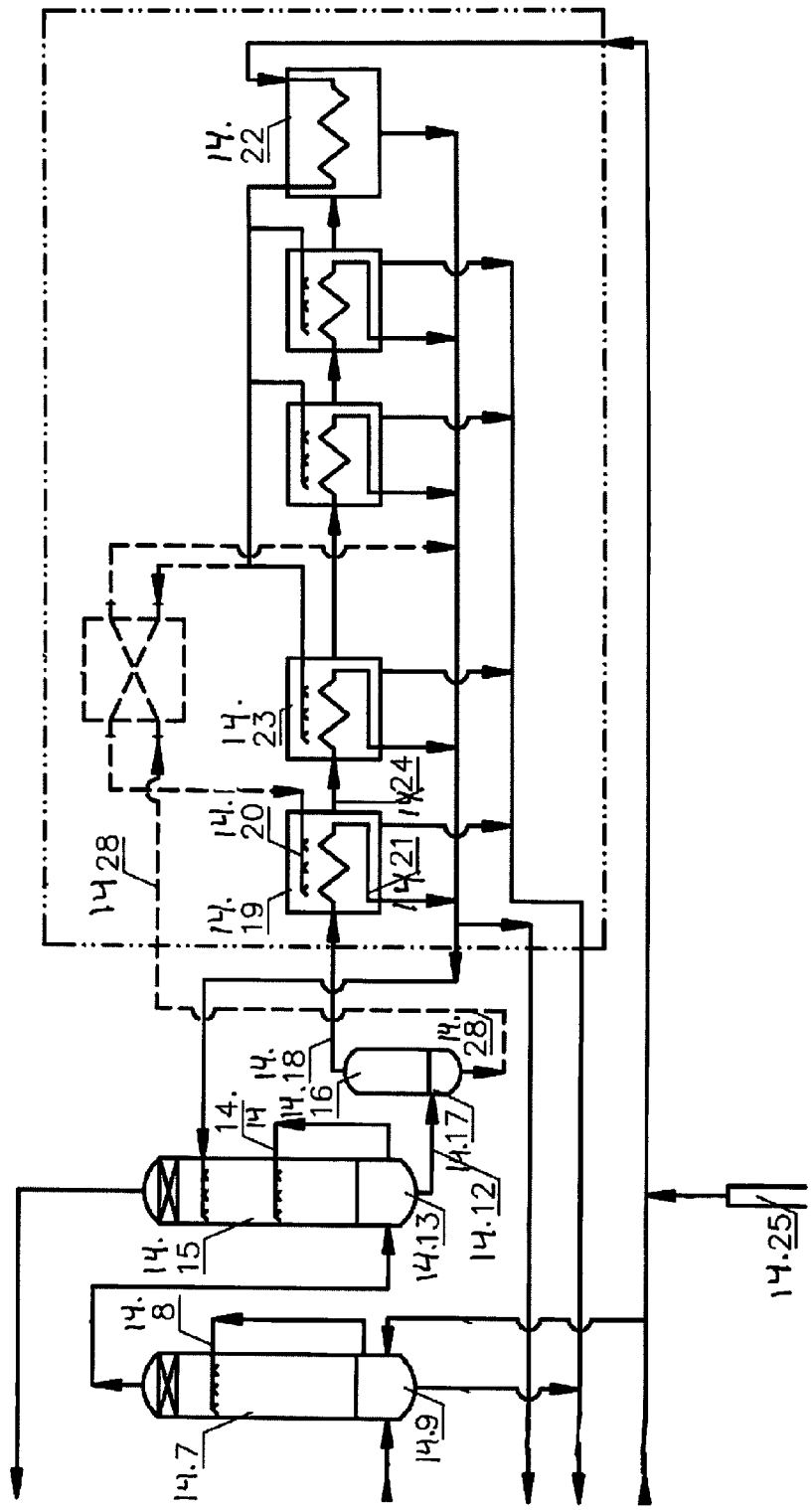
FIG. 14 is a schematic view that shows one option which makes use of an MED (Multi Effect Distillation) unit. This type of commercially available distillation unit may be used within the present invention.

FIG. 14 is a schematic view of integration of the invention with an MED (Multi Effect Distillation) system. Combustion gases 14.6 with flying solids that were not removed by the dry solid-gas separation unit (shown on FIG. 15), are mixed with saturated water 14.9 in a direct contact steam generation and wet scrubbing vessel 14.7. In it, heat carried by gas flow 14.6 generates steam by evaporating some of the saturated water 14.8, then the solids carried by the gas are washed by the saturated liquid water 14.8. The liquid water may include alkali material, like lime, to scrub the SO2 discharged from the boiler. The solids rich water 14.9 is discharged from the bottom of vessel 14.7 and recycled back to the DCSG (shown on FIG. 15), where the liquid water is converted to steam and the solids are removed in a dry form for disposal. The combustion gases, saturated with wet steam 14.4, are solids free. Most of the sulfuric gas generated from burning sulfur rich-fuel is removed in the form of calcium sulfite and gypsum. The wet gas mixture 14.4 flows to a direct contact steam condenser heat exchanger 14.15. Cold, distilled, boiler feed quality water 14.3 is continually sprayed into vessel of the heat exchanger 14.15, while heat and some of the steam, which is part of the combustion gases, are recovered. The amount and temperature of the liquid injected water 14.3 is controlled to maintain the heated liquid water 14.13 at a temperature close to (but not colder than) the saturated temperature of the partial steam pressure in the vessel.

The saturated steam in combustion gas 14.4 continually condenses because of heat exchange with the cold distilled water 14.3 and is added to the distilled injected water 14.3. The non-condensable combustion gases 14.5 are released from vessel of the heat exchanger 14.15 for further processing (like CO2 capturing) or released to the atmosphere, after most of the water vapor is recovered and condensed; part of their pressure energy can be recovered through an expander. The liquid water at saturated temperature 14.12 is delivered to flash tank 14.16 and flashed at a pressure lower than the steam partial pressure in vessel of the heat exchanger 14.15, and close to the MED pressure, to generate pure steam 14.18 (with no combustion gases) that is used to drive the distillation process 14.30. The condensate 14.17 from flash tank 14.16 is recycled back and used (possibly after some processing) as BFW for generating steam for EOR. The condensate 14.28 from separator 14.16 can be also used to heat the feed water 14.31 in the MED. The Multi Effect Distillation takes place in a series of vessels (effects) 14.23 and uses the principles of condensation and evaporation at a reduced pressure. The heat is supplied to the first effect 14.19 in the form of steam 14.8. The steam 14.18 is injected into the first effect 14.19 at a pressure of 0.2 bar to 12 bar. The steam condenses while feed water 14.20 is heated. The condensation 14.21 is collected and used for boiler feed water 14.3 and for injection into vessel 14.15. Each effect consists of a vessel 14.19, a heat exchanger 14.21, and flow connections, 14.20 and 14.24. There are several commercial designs available for the heat exchanger area: horizontal tubes with a falling brine film, vertical tubes with a rising liquid, a falling film, or plates with a falling film. The feed water 14.20 is distributed on the surfaces of the heat exchanger and the evaporator 14.21. The steam produced in each effect condenses on the colder heat transfer surface of the next effect. The last effect consists of the final condenser 14.22, which is continually cooled by the feed water, thus preheating the feed water 14.1. To improve the condensing recovery, the feed water can be cooled by air coolers before being introduced into the MED. The feed water may come from de-oiled produced water, brackish water 14.26 from water wells 14.25 or from any other locally available water source. The brine concentrate 14.2 is recycled back, where it is sprayed and mixed with combustion gases generated by the boiler. All this occurs while steam and dry solids are generated (shown on FIG. 15).

Figure 15:
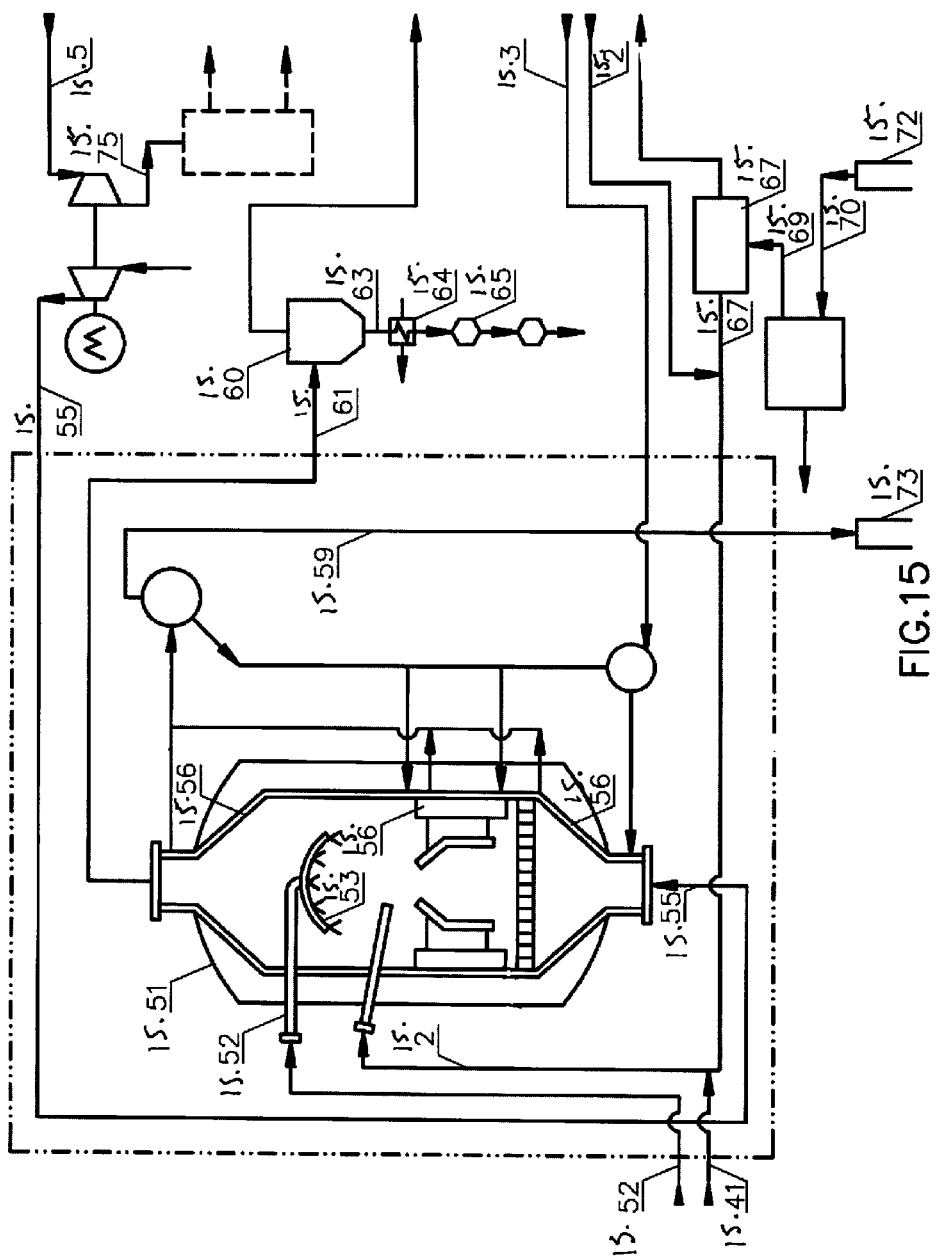
FIG. 15 is a schematic view of a diagram of the combustion side of the system described in FIG. 6 with water injected Pressurized Fluidized-Bed Boiler.

FIG. 15 is a schematic diagram of the combustion side of the system described in FIG. 14. Fuel 15.2 is mixed with air 15.55 and injected into a Pressurized Fluidized-Bed Boiler 15.51. The fuel 15.2 can be generated from the water-bitumen separation process and includes reject bitumen slurry, possibly with chemicals that were used during the separation process and sand and clay remains. Additional low quality carbon fuel 15.41 can be added to the slurry. This carbon or hydrocarbon fuel can include coal, petcoke, asphaltin or any other available fuel. Lime stone can be added to the fuel 15.41 or to the water 15.52 to remove acid gases like SOX. The Fluidized-Bed boiler is modified with water injection 15.52 and with reduced capacity internal heat exchangers to recover less combustion heat. The reduction in the heat exchanger required capacity is because more combustion energy will be consumed due to the direct heat exchange with the water within the fuel slurry 15.2 and the additional injected solid rich water 15.52 leaving less available heat to generate high pressure steam through the boiler heat exchangers 15.56. The boiler produces high-pressure steam 15.59 from distilled, de-mineralized feed water 15.3. There are several pressurized boiler designs that can be modified with direct water injections. One example of such a design is the EBARA Corp. PICFB (see paper No. FBC99-0031 Status of Pressurized Internally Circulating Fluidized-Bed Gasifier (PICFG) development Project dated May 16-19, 1999 and U.S. RE37,300 E issued to Nagato et al on Jul. 31, 2001). Any other commercial available Pressurized Fluidized Bed Combustion (PFBC) can be used as well. Another modification to the fluid bed boiler can be reducing the boiler combustion pressure down to 102 kpa. This will reduce the plant TIC (Total Installed Cost) and the pumps and compressors energy consumption. It will eliminate the need for the turbo expander 15.75. The use of the relatively low pressure system will have an impact on the process performance that has to be evaluated in detaile to choose the optimal combustion pressure. The generated steam is injected into the underground formation through injection well 15.73 for EOR or can be used for any other oil recovery or upgrading purposes.

The discharged NCG 15.5 from FIG. 14 can expand to close to atmospheric pressure 15.75 while providing a portion of the combustion air 15.55 compressing energy. Another option is to use the pressure energy to separate CO2 from the solids free NCG using commercially available membrane technologies. The combustion air is injected at the bottom of the boiler to maintain the fluidized bed. High pressure 100% quality steam 15.59 is generated from distilled water 15.3 through heat exchange inside the boiler 15.56 and injected, through an injection well, into an underground formation for EOR.

Hydrocarbons and water 15.70 are produced from the production well 15.72. The mixture is separated in a commercially available separation facility 68 where the heavy oil product, possibly mixed with diluent 15.71, is separated from the water. The produced water 15.69 is treated by the de-oil unit 15.67 where de-oiled produced water 15.1 is generated and sent to the MED unit (see FIG. 14). The produced water that contains organics 15.62, together with the concentrated brine from the distillation facility 15.2, is recycled back to the boiler 15.52, where it is sprayed at the upper section of the boiler 15.53 and mixed with the up-flowing combustion gases generated by the boiler. The liquids evaporate while steam and dry solids are generated. Most of the solids generate small solid particles which are carried with the up-flowing gas, and large solid particles which fall to the fluidized bed by gravitation. Dry solids can also be discharged in intervals from the bottom of the pressurized boiler (not shown). The solids-rich combustion gases discharged from the boiler 15.61 flow to a dry solids separator 15.60. The dry solid separator is a commercially available package. The dry solids are removed in dry form from the separator 15.63 through heat recovery 15.64 and de-compression 15.65 sections. The solids lean flow 6 flows to vessel 15.7 (see FIG. 14).

Figure 16:
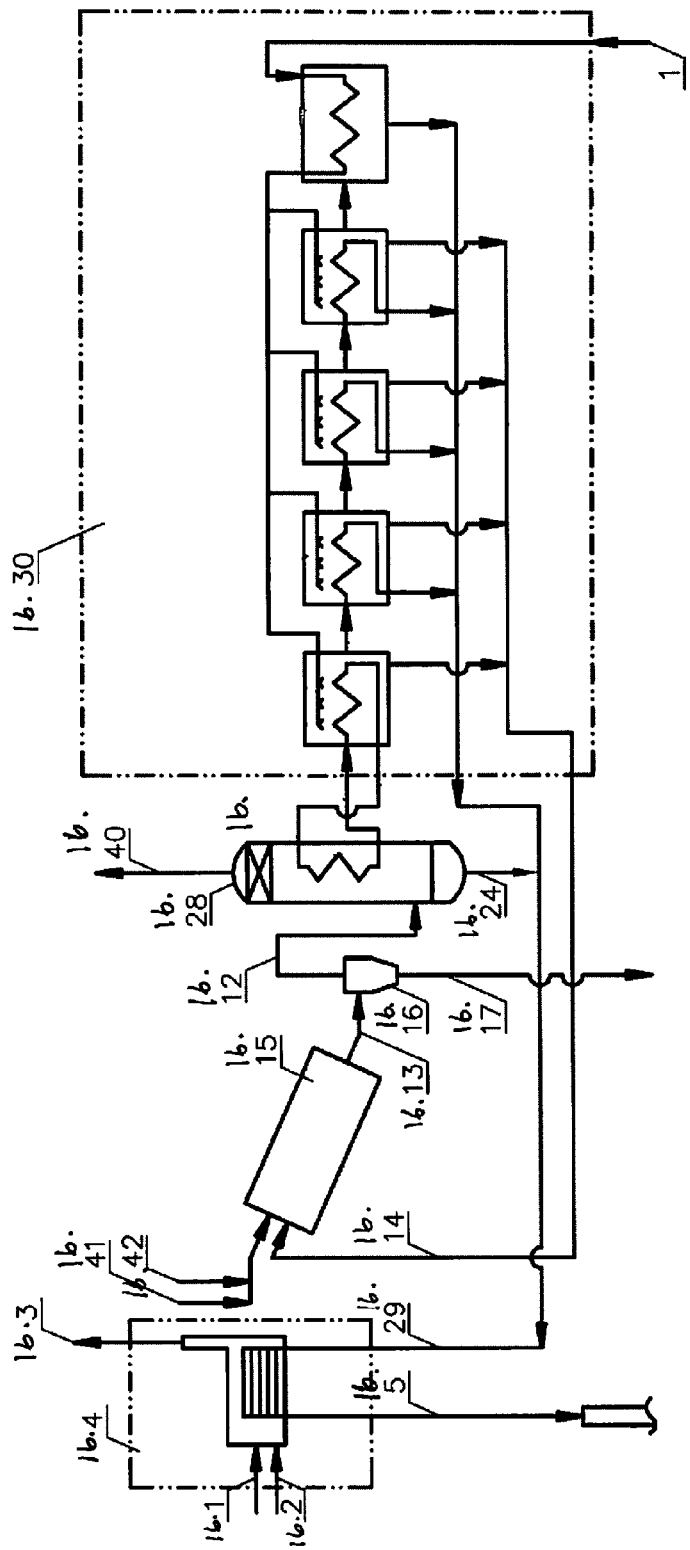
FIG. 16 is a schematic view of a diagram of the present invention that includes fired direct contact steam generator with MED water treatment plant and OTSG steam generation facility.

FIG. 16 is a schematic diagram of the present invention which includes a fired direct contact steam generator with MED water treatment plant and OTSG steam generation facility. Facility 16.4 is a standard, commercially available steam generation facility that includes an atmospheric steam boiler or OTSG 7. Fuel 16.1 and air 16.2 are combusted under atmospheric pressure conditions. The discharged heat is used to generate steam 16.5 from de-mineralized distilled water 16.29. The combustion gas is discharged through stack 16.3. The generated steam is injected into an underground formation 16.5.

Carbon fuel 16.41, like petcoke or coal slurry, is mixed with oxygen-rich gas 16.42 and combusted in a DCSG 16.15. Brine water discharged from the distillation facility 16.30 is mixed with the pressurized combustion gas to generate a stream of steam-rich gas and solids 16.13. To reduce the amount of SO2, lime stone can be added to the brine water or to the fuel 16.41 injected to the DCSG, to react with the SO2. The solids are separated in separator 16.16. The separated solids 16.17 are discharged in a dry form from the solids separator 16.16 for disposal. The steam and combustion gas 16.12 flows to heat exchanger 16.25 and condenser 16.28. The steam in gas flow of the gas 16.12 is condensed to generate condensate 16.24. The condensate is treated (not shown) to remove contaminants and generate BFW that is added to the distillate BFW 16.29 then supplied to the steam generation facility. The NCG (Non-Condensation Gas) 16.40 is released to the atmosphere or used for further recovery as previously described in FIG. 15 or for CO2 extraction. The heat recovered in heat exchanger 16.28 is used to generate steam to operate the MED 16.30 (a commercially available package). The MED was described in FIG. 14. The water 16.1 is de-oiled produced water, possibly with make-up underground brackish water.

Figure 16A:
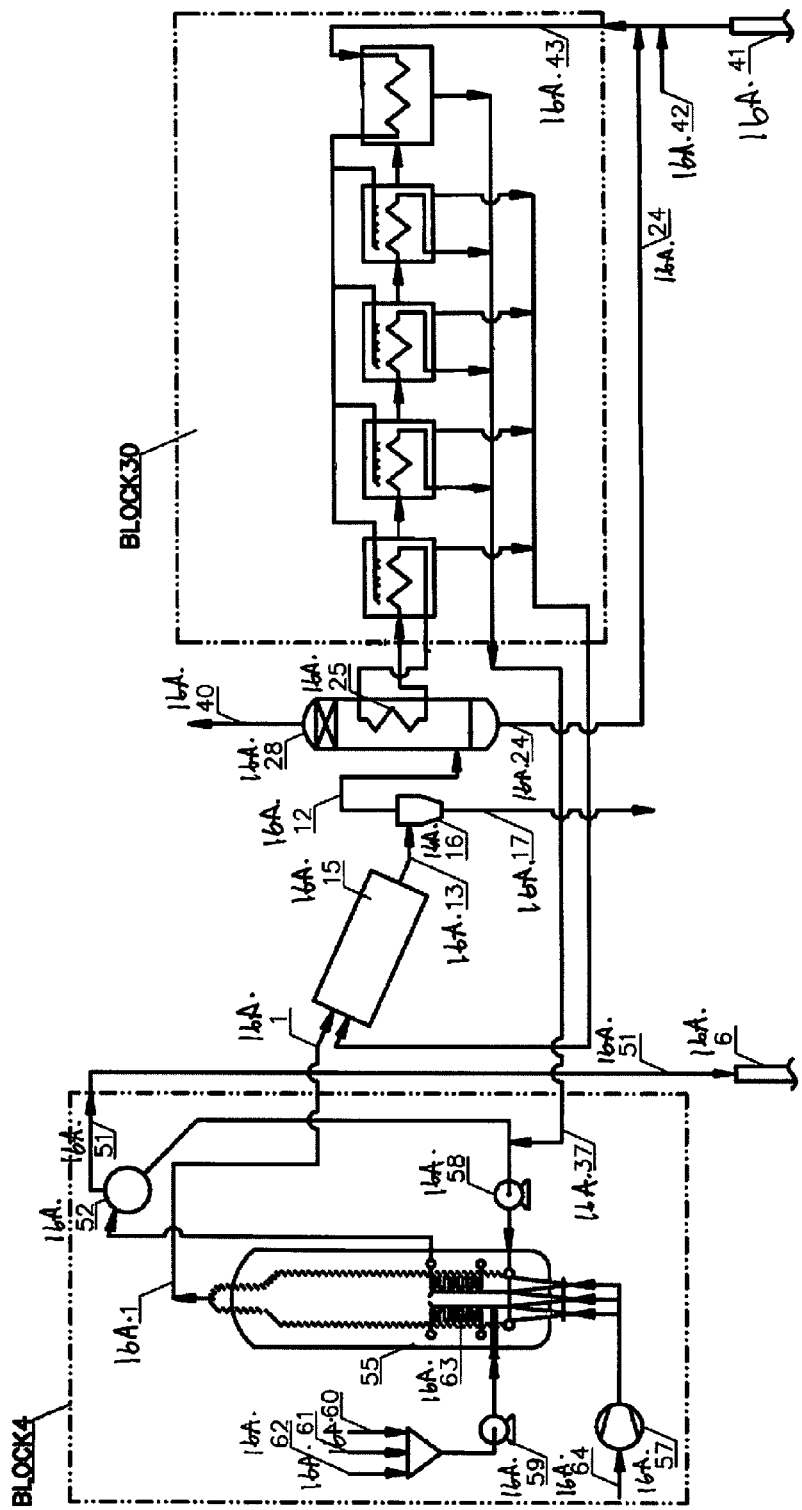
FIG. 16A is a schematic view of the present invention that includes a PFBC (Pressurized Fluid Bed Combustion) boiler that generates steam for EOR and pressurized combustion gases to operate DCSG with MED system.

FIG. 16A is a view of the present invention that includes a PFBC (Pressurized Fluid Bed Combustion) boiler that generates steam for EOR and pressurized combustion gases to operate a DCSG with an MED system. Examples for pressurized boilers are the Pressurized Internally Circulating Fluidized-bed Boiler (PICFB) developed by Ebara, and the Pressurized-Fluid-Bed-Combustion-Boiler (PFBC) developed by Babcock-Hitachi. Any other medium-low pressurized combustion boilers that can combust solid fuel like petcoke or coal can also be used. BLOCK 4 is a prior art pressurized fluid bed boiler. Air 16A.64 is compressed 16A.57 and supplied to the bottom of the fluid bed to support the fluid bed combustion. Fuel 16A.60, like petcoke, is crushed and grinded together with Lime Stone, possibly with Dolomite 16A.61 and water 16A.62, to generate pumpable slurry 16A.59. The boiler includes internal heat exchanger 16A.63 to generate high pressure steam 16A.51 from distilled water 16A.37. The steam 16A.51 is generated from steam boiler drum 16A.52 with boiler water circulation pump 16A.58. The produced steam 16A.51 is injected into an injection well 16A.6 for EOR. The combustion pressurized gas 16A.1, at pressures between 103 kpa and 2 mpa (typically less then 1 mpa) and temperatures between 300 C and 900 C (typically around 800 C), is injected into a DCSG 16A.15. Brine water discharged from the distillation facility in BLOCK 30 is mixed with the pressurized combustion gas to generate a stream of steam-rich gas and solids 16A.13. If the SO2 reduction from the lime stone 16A.61 added to the fluid bed is not sufficient, additional small amounts of lime stone can be added to the brine water 16A.14 injected into the DCSG 16A.15. The solids are separated in a commercially available solid separator 16A.16. The separated solids 16A.17 are discharged for disposal. The steam and combustion gas 16A.12 flows to heat exchanger 16A.25 and condenser 16A.28. The steam in gas flow 16A.12 is condensed to generate condensate 16A.24. The condensate is added to the feed water 16A.43. The NCG (Non-Condensation Gas) 16A.40 is released to the atmosphere, possibly after expansion through an ejector to generate the vacuum for MED or MSF distillation systems or through a turbo expander to recover part from the compression energy as described in FIG. 15. It can also be directed for further treatment to recover the CO2. The heat recovered in heat exchanger 16A.28 is used to generate steam to operate the MED in BLOCK 30 (a commercially available package). The MED was described in FIG. 14. The water 16A.43 is the condensate water 16A.24, de-oiled produced water 16A.42, possibly with make-up underground brackish water from water well 16A.41.

Figure 16B:
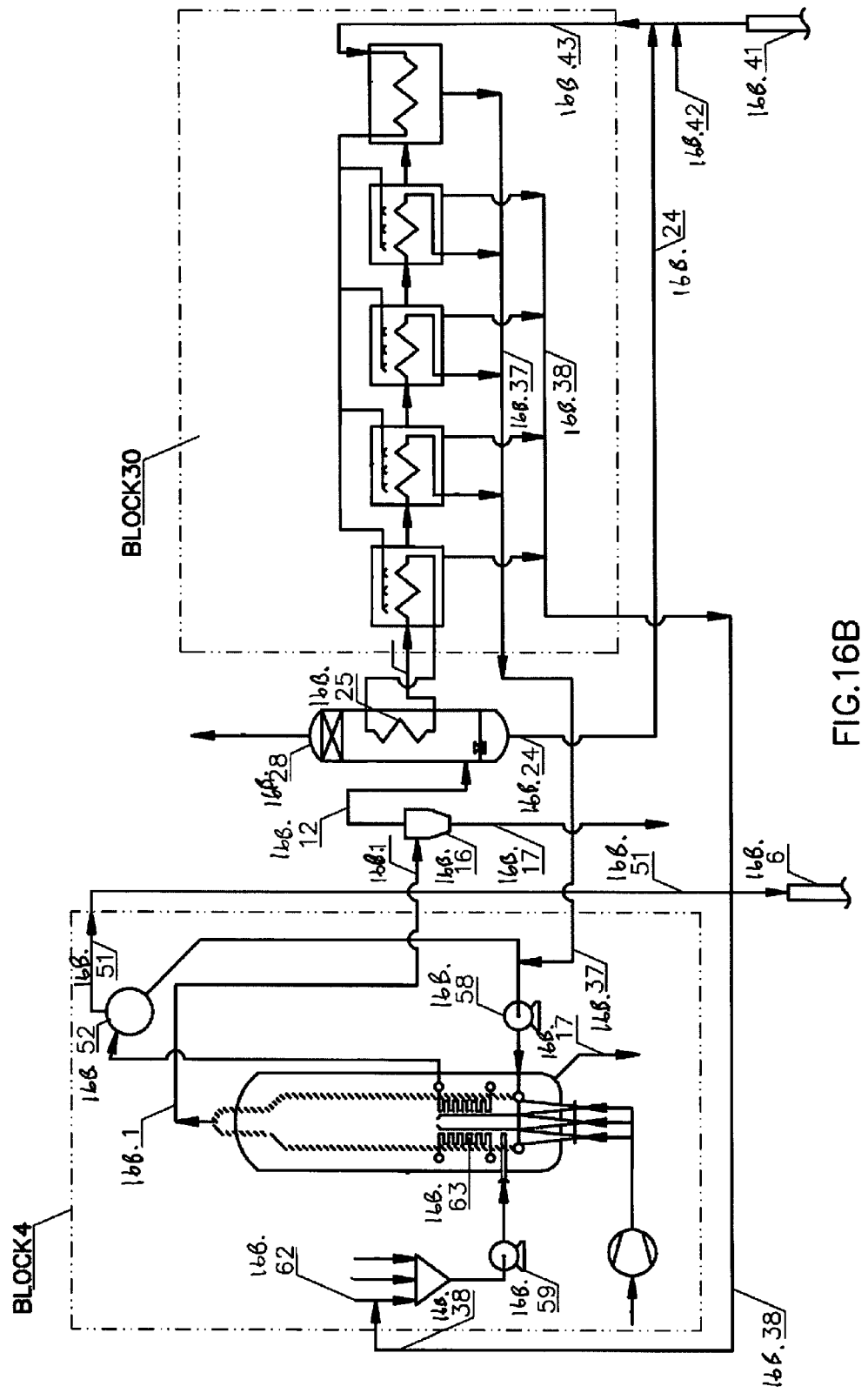
FIG. 16B is a schematic view of the present invention that includes a PFBC (Pressurized Fluid Bed Combustion) boiler that generates steam for EOR, combined with direct brine injection to the fluidized boiler and with an MED system.

FIG. 16B is a view of the present invention that includes a PFBC (Pressurized Fluid Bed Combustion) boiler combined with brine injection for generating steam and combustion gas mixture from the brine (integrated DCSG). The boiler generates steam in a heat exchanger for EOR and it is combined with an MED system. BLOCK 4 is a prior art pressurized fluid bed boiler. The brine from distillation facility 16B.30 is mixed with water 16B.62, to generate pumpable slurry 16B.59 and injected into the boiler with the fuel. The brine 16B.38 can also be injected separately to the upper section of the boiler (not shown). The boiler includes internal heat exchanger 16B.63 to generate high pressure steam 16B.51 from distilled water 16B.37. The steam 16B.51 is generated from steam boiler drum 16B.52 with boiler water circulation pump 16B.58. The produced steam 16B.51 is injected into an injection well 16B.6 for EOR. The combustion pressurized gas 16B.1, at pressures between 103 kpa and 2 mpa (typically less then 1mpa) and temperatures between 150 C and 700 C (the boiler discharge temperature is lower than in FIG. 16A because the boiler generates more steam from the brine water that is injected to it). Brine water discharged from the distillation facility in BLOCK 30 is mixed with the fuel and/or with the pressurized combustion gas in the fluidized bed boiler to generate a stream of steam-rich gas and solids 16B.13. The solids are separated in a commercially available solid separator 16B.16. The separated solids 16B.17 are discharged for disposal. The steam and combustion gas 16B.12 flows to heat exchanger 16B.25 and condenser 16B.28. The steam in gas flow of gas 16B.12 is condensed to generate condensate 16B.24. The condensate is added to the feed water 16B.43. The NCG (Non-Condensation Gas) 16B.40 is released to the atmosphere, possibly after expansion through an ejector to generate the vacuum for MED or MSF distillation systems or through a turbo expander to recover part of the compression energy as described in FIG. 15. It can also be directed for further treatment to recover the CO2. The heat recovered in heat exchanger 16B.28 is used to generate steam to operate the MED in BLOCK 30 (a commercially available package). The MED was described in FIG. 14. The water 16B.43 is the condensate water 16B.24, or de-oiled produced water 16B.42, possibly with make-up underground brackish water from water well 16B.41.

Figure 17:
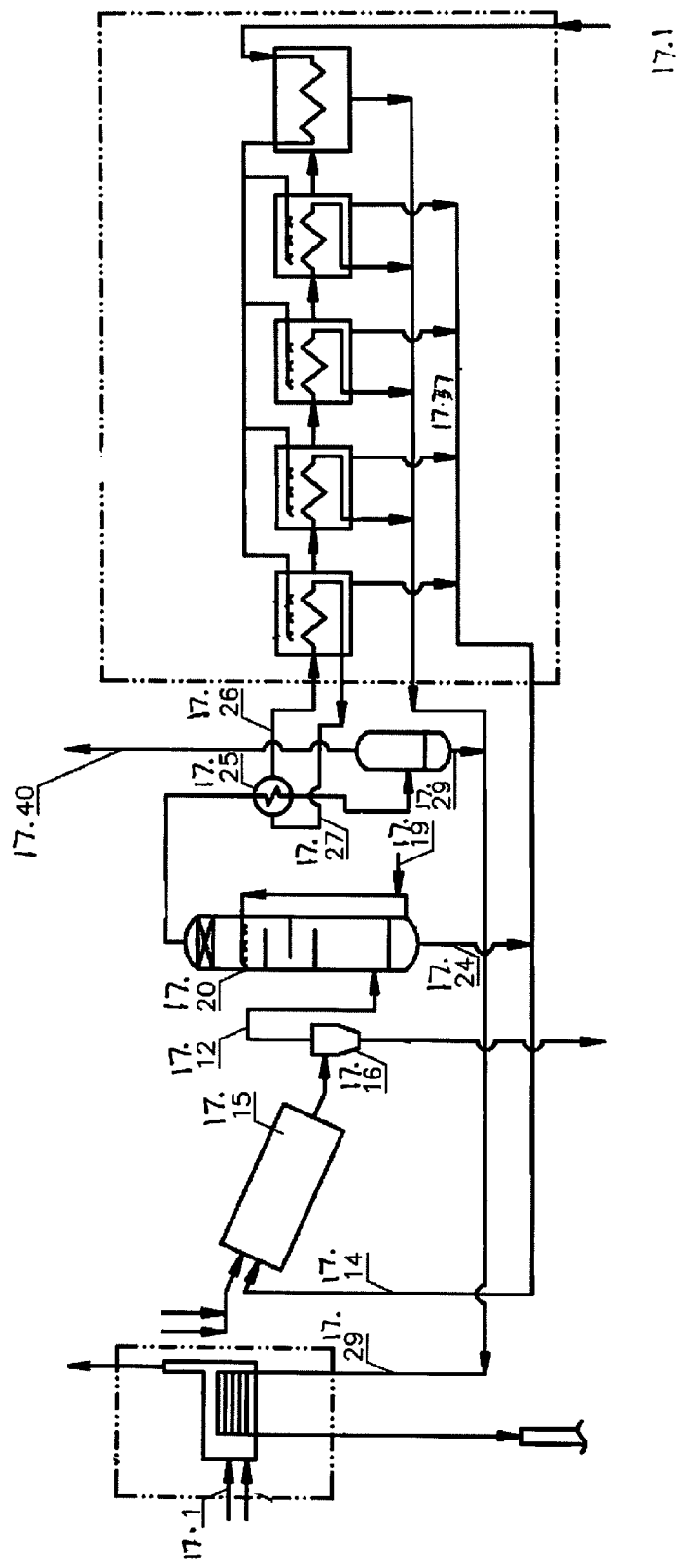
FIG. 17 is a schematic view of an illustration of another embodiment of the present invention that includes fired direct contact steam generator with wet scrubber and steam generator, MED water treatment plant and OTSG steam generation facility.

FIG. 17 is another embodiment of the present invention that includes a fired direct contact steam generator with a wet scrubber and steam generator, MED water treatment plant and OTSG steam generation facility substantially similar to the system described in FIG. 16 but with an additional scrubber that generates saturated steam and recycled solids. The DCSG 17.15 generates a stream of pressurized dry steam, combustion gas and a solids mixture. The solids are removed from the pressurized gas flow in the gas-solid separator 17.16. To reduce the complications and cost of the solid separator, a small percentage of solids are typically carried-on with the gas flow 17.12. Gas flow 17.12 is washed in vessel 17.20 to remove the carry-on solids and to generate saturate wet steam. The recycled saturated water in vessel 17.20 can include lime stone and other alkali materials to remove SO2. The solids rich water that carries the solids, the generated calcium sulfite, calcium sulfate and the remaining lime stone that didn't react with the acid gases 17.24, is recycled back to the DCSG 17.15. The steam and combustion gas flow 17.12 flows to heat exchanger 17.25. The saturated steam in gas flow 17.22 is condensed to generate condensate 17.29. The condensate can be added to the distillate BFW 17.29 supplied to the steam generation facility.

Figure 18:
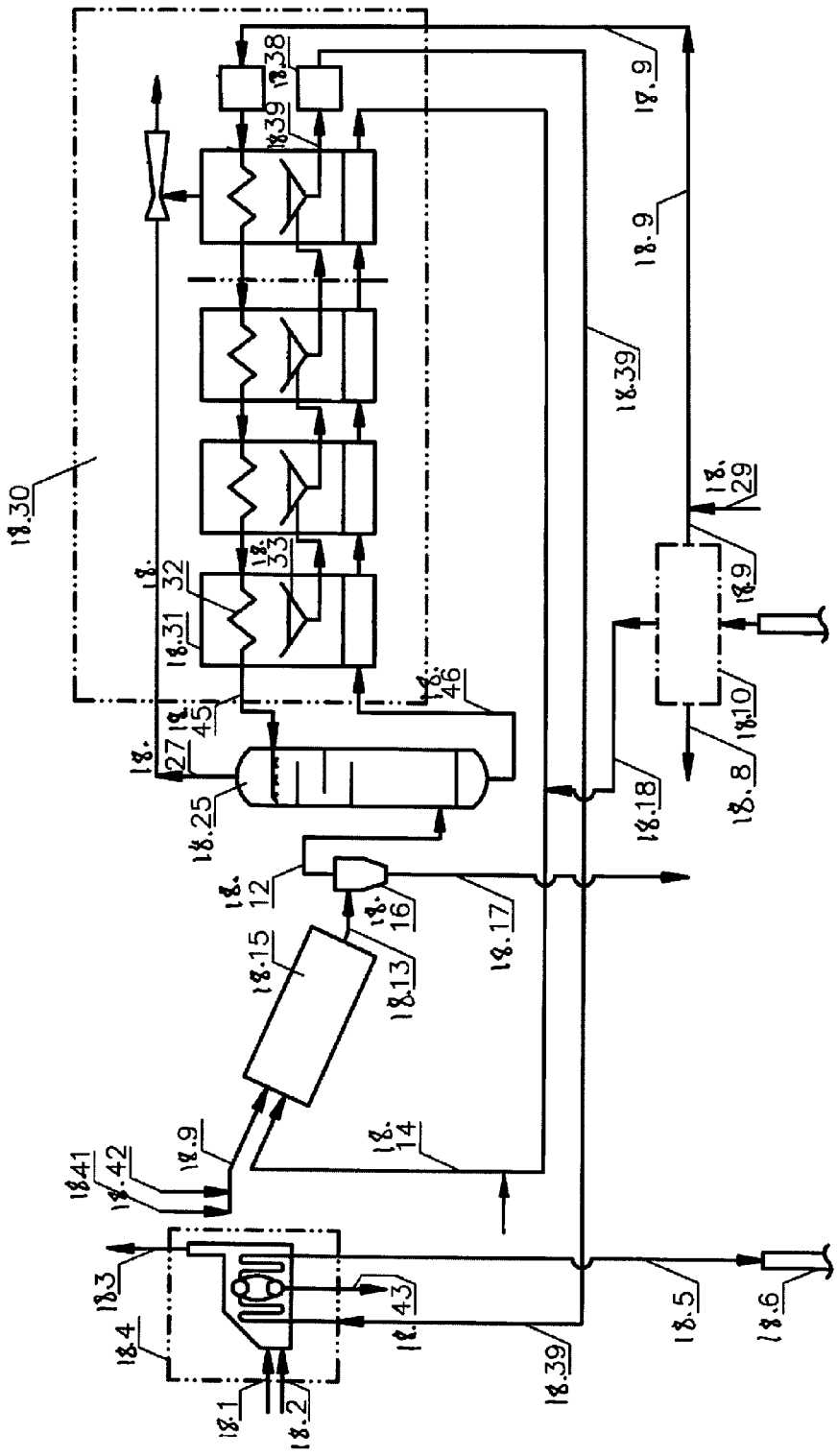
FIG. 18 is a schematic view of a diagram of the present invention that includes fired DCSG with direct heated MSF (Multi Stage Flash) water treatment plant and steam boiler for generating steam for EOR.

FIG. 18 is a schematic diagram of the present invention that includes a fired DCSG with a direct heated MSF (Multi Stage Flash) water treatment plant and a steam boiler for generating steam for EOR. Block 4 includes a commercially available steam generation facility. Fuel 18.2 is mixed with oxidized gas 18.1 and injected into the steam boiler (a commercially available atmospheric pressure boiler). If a solid-fuel boiler is used, the boiler might include a solid waste discharge. The boiler produces high-pressure steam 18.5 from distilled BFW 18.39. The steam is injected into the underground formation through injection well 18.6 for EOR.

The boiler combustion gas may be cleaned and discharged from stack 18.3. If natural gas is used as the fuel 18.2, there is currently no mandatory requirement in Alberta for further treatment of the discharged flue gas or for removal of CO2.

Fuel 18.41, possibly solid fuel in a slurry form, is mixed with oxidizing gas 18.42 and injected into a pressurized DCSG 18.15 where the combustion occurs at an elevated pressure. The DCSG design can be a horizontal sloped rotating reactor, however any other reactor that can generate a stream of gas and solids can also be used. Solids-rich water 18.14 that includes the brine from the MSF, is injected into the direct contact steam generator 18.15 where the water evaporates into steam and the solids are carried on with gas flow 18.13. The amount of water 18.14 is controlled to verify that all the water is converted to steam and that the remaining solids are in a dry form. To remove SO2, lime stone can be added to the DCSG. The solids-rich gas flow 18.13 flows to a dry solids separator 18.16. The dry solids separator is a commercially available package and it can be used in a variety of gas-solid separation designs. The removed solids 18.17 are taken to a land-fill for disposal. The steam and combustion flow flows to tower 18.25. The tower reacts as a direct contact heat exchanger. Typically in MSF processes, the feed water is heated in a vessel called the brine heater. This is generally done by indirect heat exchange by condensing steam on tubes that carry the feed water which passes through the vessel. The heated water then flows to the first stage. In the method described in FIG. 18, the feed water of the MSF 18.45 is heated by direct contact heat exchange (and not through an indirect heat exchanger). The feed water is injected into the up-flowing steam and combustion gas 18.12. The steam in stream of gas 18.12 that contains combustion gases and steam generated by the DCSG, continually condenses because of heat exchange with the feed water 18.45. The cooled non-condensable combustion gases 18.27 (after most of the water vapor has been condensed) are released. To recover the energy from the gas' pressure, they can be released through an ejector to generate a vacuum and remove dissolved contaminate NCG carried with the feed water 18.46.

Any other commercial steam ejectors can be used as well to generate the required vacuum in the system. In the MSF, the heated feed water 18.46 flows to the first stage 18.31 with a slightly lower pressure, causing it to boil and flash into steam. The amount of flashing is a function of the pressure and the feed water temperature, which is higher than the saturate water temperature. The flashing will reduce the temperature to the saturate boiling temperature. The steam resulting from the flashing water is condensed on heat exchanger 18.32, where it is cooled by the feed water. The condensate water 18.33 is collected and used (after some treatment) as BFW 18.39 in the standard, commercially available, steam generation facility 18.4. The number of stages can be up to 18.25. A commercial MSF typically operates at a temperature of 90-110 C. High temperatures increase efficiency but may accelerate scale formation and corrosion in the MSF. Efficiency also depends on a low condensing temperature at the last stage. The feed water for the MSF 18.9 can be treated by adding inhibitors to reduce the scaling and corrosion 18.38. Those chemicals are available commercially and the pretreatment package is typically supplied by the MSF. The feed water is recovered from the produced water in separation unit 18.10 that separates the produced bitumen 18.8, possibly with diluent that improves separation from the water and the viscosity of the heavy bitumen. The de-oiled water from the MSF 18.9 is supplied to the MSF as feed water. There are several commercially available separation units. In my applications, the separation can be simplified as discharged "oily contaminate water" 18.18 is allowed in the process. (In the prior-art EOR Oilsands operations, the oily water cannot be used and cannot be injected back into the underground disposal well, if such a well exists. The disposal of this liquid waste is very expensive. As a result, more chemicals and treatment units will be used to minimize the contaminate water.) Make-up water 18.29, like water from water wells or from any other water source, is continually added to the system.

Figure 19:
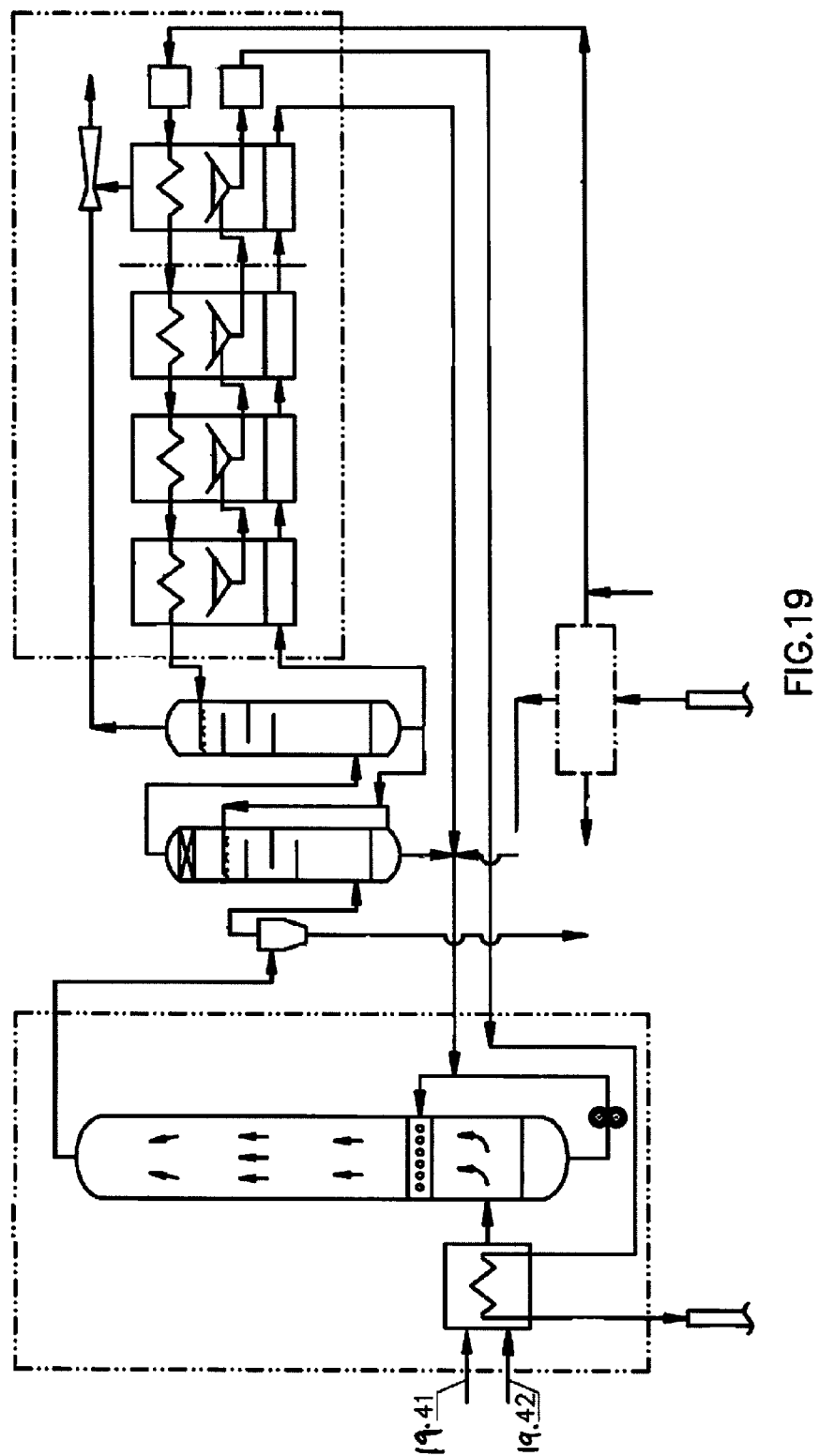
FIG. 19 is another schematic view of the present invention that includes combined boiler and up-flow DCSG with direct heated MSF (Multi Stage Flash) water treatment plant and steam boiler for generating steam for EOR.
Figure 20:
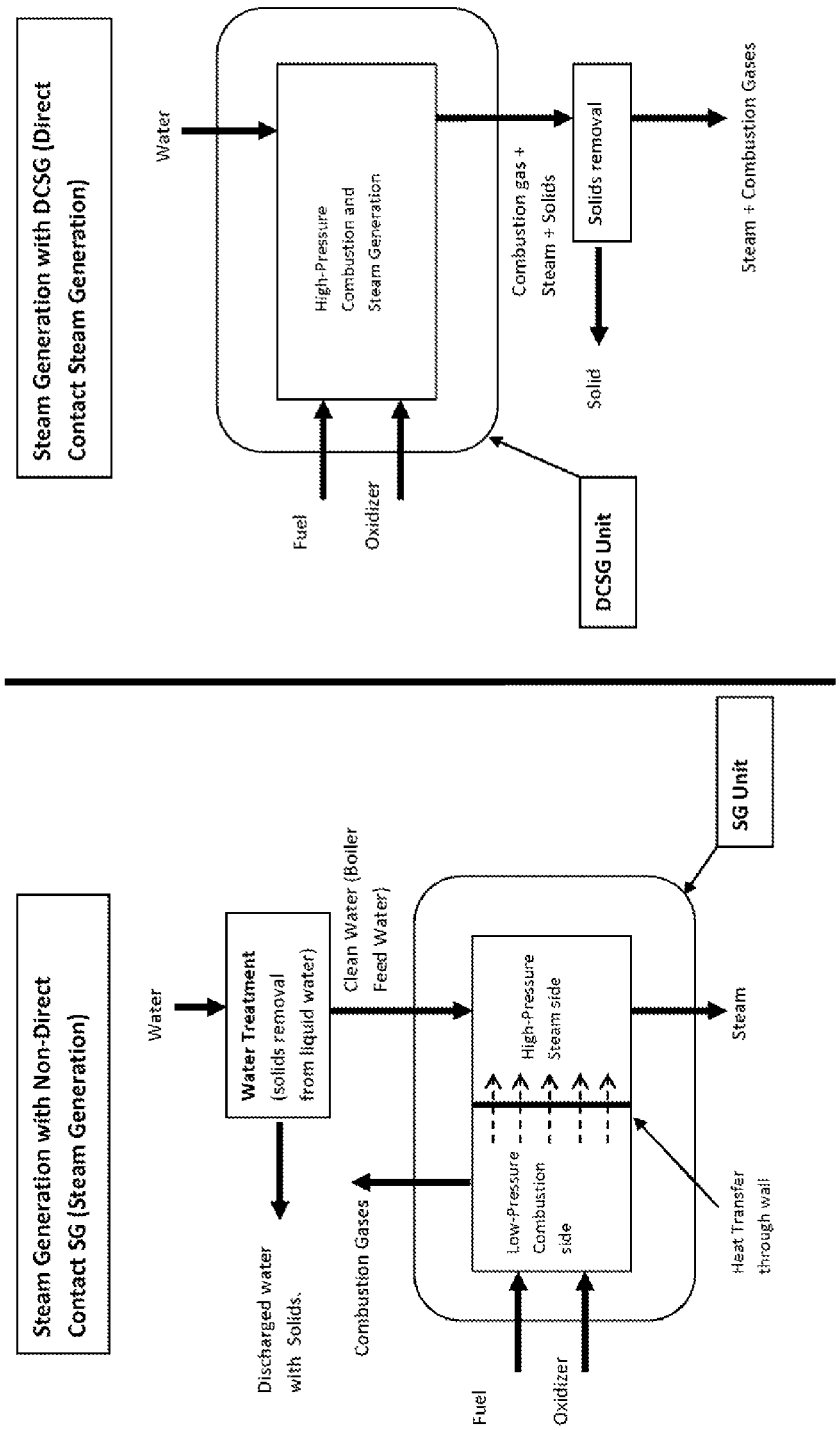
FIG. 20 is a schematic view of a diagram of the principal of Direct Contact Steam Generation and Non-direct Contact Steam Generation.

FIG. 19 is another schematic diagram of the present invention that includes combined boiler and up-flow DCSG with a direct heated MSF (Multi Stage Flash) water treatment plant and steam boiler for generating steam for EOR.

Block 4 includes a pressurized non-direct boiler and up-flow DCSG. The system and method of the steam generator as described in the sketch in Block 4, is described in U.S. Provisional application 61/092,668 filed by the inventor on Aug. 28, 2008 and in Canadian application No. 2,676,720 filed by the inventor on Aug. 28, 2009. Block 4 can include any commercially available facility that can burn fuel, produce steam from BFW for EOR, consume brine water with high levels of TSS and TDS, and produce a pressurized stream of steam, combustion gas and possibly solids resulting from the combustion. The brine water can be used in Block 4 as well.

Block 4 consumes fuels, 19.41, like petcoke, coal, asphaltin, crude oil or natural gas and oxidizes gases 19.42 like air. Some of the combustion heat is used to generate steam from BFW. The steam can be used for EOR by injecting it into a steam injection well.

EXAMPLE 1

The flow table of FIG. 21 is a simulation of a direct-contact steam generation process, as described in BLOCK 2 in FIG. 4. The simulation was done for 3 different pressures as described in the following table. The heat source is petroleum coke slurry, internally combusted. The fuel that was used for the simulation was a high sulfur petroleum coke with 7% sulfur. The oxidizer was oxygen from air separation plant. The water source 4.12 was disposal water with high solids content. The combustion in BLOCK 2 occurred in the high pressure direct contact steam generator and the water mixed with the combustion gases. The combustion pressures were 1500 kpa (kilopascals), 200 kpa, and 103 kpa. The solids introduced mostly from the water were removed in a solid separator that can be a cyclone design. The gas generated by the DCSG was at a temperature of around 250 C, with carry-on solids scrubbed in wet solids scrubber. The wet solids scrubber also generates saturated ("wet") steam product. The water in scrubber includes lime stone slurry to react with the SO2. (Sludge from traditional SAGD or Huff & Puff plant that include lime softener can be used as well). The generated calcium sulfite and sulfate removed by the solid separator with the other solids in a dry form. The simplified analysis result is described in the table of FIG. 21. In the table line S-1 is line 22 in FIG. 4, Line S-2 is line 21 in FIG. 1, Line S-5 is the combination of lines 21+22. Line S-7 is the discharge flow from the DCSG. Line S-9 is line 9 in FIG. 4. Line S-10 is the water evaporating in the wet scrubber/wet steam generator. Line S-11 in the following table is line 18 in FIG. 4.

The analysis result shows the importance of the system pressure on the process. At a pressure of 1500 kpa the temperature of the combustion gas and steam mixture will be 192 C. At a pressure of 200 kpa the product flow temperature will be 116 C and at a pressure of 103 kpa the temperature will be only 97 C. The total produced mass flow for line 4.18 in FIG. 4 is as follow:

For pressure of 1500 kpa the calculated flow rate is 15.8 mt/hour with steam ratio of 74%.

For pressure of 200 kpa the total discharged mass flow will be 16.3 mt/hour with steam ratio of 75%.

For pressure of 103 kpa the total mass flow will be 16.5 mt/hour with steam ratio of 75.5%.

EXAMPLE 2

The charts in FIGS. 22 and 23 show a simulation of the process, as described in FIG. 17. The simulation was done for 2 different pressures, corresponding to the tables in FIGS. 22 and 23. The heat source is petroleum coke slurry, internally combusted. The fuel used in the simulation was a high sulfur petroleum coke with 7% sulfur. The oxidizer was air. The water source 17.12 contained 36,600 TDS. The combustion occurred in the high pressure Direct Contact Steam Generator 17.15 and used concentrated brine water from Multi Effect Distillation facility 17.30. The water mixed with the combustion gases. The combustion pressures were 5,000 kpa (kilopascals) in FIGS. 22 and 10,000 kpa in FIG. 23. The solids introduced mostly from the water were removed in a solid separator 16 that can be a cyclone design. The gas generated by the DCSG was at a temperature of approximately 200 C. To reduce the size of the DCSG and if the feed water 17.14 includes high levels of organics and a large size of solid particles, the DCSG discharge temperature can be up to 600C. The minimum discharge temperature can be as low as 95 C for low pressures DCSG. The SO2 was scrubbed by a wet scrubber 17.20 with saturated water. The wet solids scrubber also generates saturated ("wet") steam product. The water 17.19 in scrubber 17.20 includes lime stone slurry to react with the SO2. (Sludge from traditional SAGD or Huff & Puff plant that include lime softener can be used or directly supplied to the DCSG 17.15, to scrub SO2 immediately after it is generated). The generated calcium sulfite and calcium sulfate were removed by the solid separator 17.16 with the other solids in a dry form. The simplified analysis result is described in the following table. The steam condensed to liquid water 17.29 and was recovered from the saturated steam and combustion gases 17.22. The condensate 17.29 is used for steam generation by the boiler or DCSG in block 4 (possible after some treatment to bring it to BFW specifications). The combustion NCG 17.40 released. The heat, including the condensation heat in flow 17.22 is used through a non-direct heat exchanger 17.25 to generate steam 17.26 from condensate 17.27 to operate a commercially available MED 30. The MED consumes feed water 17.1 with 30,000-40,000 TDS and discharged concentrated brine 38 with 70,000-200,000 TDS. The distillate, de-mineralized water 17.37 is supplied to a commercially available steam generation facility 17.4. The steam generation facility can be a standard boiler (with steam drum and mud drum) or OTSG. The de-mineralized water specifications will depend on the particular system used. Pure steam (without combustion gas) is generated by the steam generation facility.

The analysis result shows the importance of the system pressure on the process:

At a pressure of 5,000 kpa the condensate flow 29 will be 9.7 mt/hour, the distillate flow will be 27.7 mt/hour and the amount of water vapor loss in the NCG will be 3.9 mt/hour.

At a pressure of 10,000 kpa the condensate flow 29 will be 13.1 mt/hour, the distillate flow will be 38.1 mt/hour and the amount of water vapor loss in the NCG will be 1.6 mt/hour.

EXAMPLE 3

The charts and graphs of FIGS. 24 and 25 show a simulation of the process, as described in FIG. 3 (or in FIGS. 14 and 15). The simulation was done at 10 bar and 5 bar pressures in the pressurized boiler (at the combustion side) and the DCSG, as described in the following tables. The heat source is petroleum coke slurry 3.4 combusted under pressure with air 3.5. The water source 3.13 in the simulation contains 38,000 TDS. The combustion occurred in the pressurized boiler 3.1, where a portion of the combustion heat is recovered through non-direct heat exchange to generate 100% quality saturated steam 3.6, at 100 bar, from de-mineralized BFW 3.7. The combustion gas 3.8 flows to a DCSG 3.2. Brine 3.12 from the thermal distillation facility 3.3 (MED was used for this particular simulation) is supplied to the DCSG 3.2 where it is mixed with the combustion gas to generate steam and combustion gas. The solids 3.9 are removed from the generated gas in a dry form. The heat and water condensate are recovered from the generated gas and then supplied to the thermal distillation facility 3.3. The combustion NCG 3.10 is discharged from the system. The distillation facility 3.3 consumes feed water source 3.13 with 30,000-40,000 TDS and discharges concentrated brine 3.12 with 70,000-200,000 TDS. The distillate, de-mineralized water 3.7, is supplied to the pressurized boiler 3.1 to generate 100 bar steam for EOR.

This analysis simulated the impact of the heat extracted at pressurized boiler 3.1 for generating high pressure steam 3.6 from the BFW 3.7 in comparison to the overall combustion energy, where the remaining energy is delivered with the pressurized hot combustion gases 3.8 to the DCSG and to the distillation facility 3.3.

The results are described in FIGS. 24 and 25.

The results show that there is an optimal amount of heat recovered for steam generation in the pressurized boiler non-direct heat exchangers. The optimal percentage in this particular example is such that: all the distilled BFW will be used for steam production and there will be sufficient heat at the pressurized flue gas to operate the distillation facility AND the DCSG unit to recover the distillation facility brine by generating steam and solid waste.

For a 10 bar pressurized system, the results shows that when 70% of the combustion heat is removed from the combustor for generating high pressure steam, 9.6 mt/hour of 100 bar steam 3.6 can be produced. The remaining heat in the combustion gas 3.8 can produce 9.6 mt/hour of distillate BFW. Under these particular conditions, around 70% of the combustion energy should be recovered to generate the 100 bar pressure steam for EOR.

For a 5 bar pressurized system, the results show that when 70% of the combustion heat is removed from the combustor for generating high pressure steam, about the same amount of high pressure steam can be produced (9.6 mt/hour of 100 bar steam 3.6). The remaining heat in the combustion gas 3.8 can produce only 5.9 mt/hour of distillate BFW. Under these particular conditions, around only 60% from the combustion energy should be recovered to generate the 100 bar pressure steam for EOR.

The results show that using a high efficiency heat exchanger in the pressurized boiler (which will be more expensive and complicated to operate) is not required as the discharged combustion gas heat is not wasted and is required to operate the DCSG and the thermal distillation facility. (If a separate standard atmospheric steam generation facility is used as described, for example in FIG. 16, where the combustion gas (most probably from the combustion of natural gas) is released to the atmosphere, then the steam boiler, which is a separate entity, will be highly efficient as the heat from the stack is lost to the atmosphere.) For this case, the operation of the DCSG and the distillation facility can be done by a separate pressurized combustion.

I claim:

1. A method for steam production for extraction of heavy bitumen, with zero liquid discharge, said method comprising the steps of:
   mixing carbon-based fuel and oxidizing gases, wherein said carbon-based fuel is comprised of carbon fuel or hydrocarbon fuel and wherein said oxidizing gases are comprised of oxygen, air, or enhanced air;
   combusting the mixture under pressure and temperature so as to produce a combustion gas;
   mixing said combustion gas with liquid water having solids and organics so as to transfer said liquid water from a liquid phase to a gas phase;
   separating solids and the gas phase;
   evaporating water to produce de-mineralized water and concentrated brine;
   mixing said concentrated brine with said combustion gas;
   generating steam from the produced de-mineralized water through non-direct heat exchange; and
   recovering oil with generated steam to recover oil.

2. The method described in claim 1, wherein said liquid water having solids and organics controls the combustion temperature and transfer of said liquid water from a liquid phase to a gas phase.

3. The method for steam generation of claim 1, further comprising:
generating steam with a portion of said combustion heat from the de-mineralized water.

4. The method of steam generation of claim 1, further comprising:
mixing said combustion gas with liquid water to wet-scrub solids and acid gases in order to produce a clean, wet saturated steam and combustion gas mixture and liquid water with the scrubbed solids and gases; and
recycling at least some of said liquid water containing the scrubbed material back to the step of transferring said liquid water from a liquid phase to a gas phase.

5. The method of steam generation of claim 1, wherein the carbon-based fuel contains sulfur, the method further comprising:
mixing the fuel or the water with alkaline compounds so as to remove SO2 at the combustion stage and to produce a lean SO2 gas mixture.

6. The method of steam generation of claim 5, wherein said alkaline compounds contains lime softening sludge which is a lime softening water treatment facility waste to remove the acid gases.

7. The method of steam generation of claim 1, wherein the carbon-based fuel contains sulfur, the method further comprising:
mixing the combustion gas with liquid water and alkaline compounds, said alkaline compound being comprised of calcium, so as to remove SOX in order to produce a clean, wet saturated steam and gas mixture and liquid water with the scrubbed solids and gases; and
recycling at least some water containing the scrubbed solids and gases back to the step of transferring said liquid water from a liquid phase to a gas phase.

8. The method of steam generation of claim 1, wherein the step of combustion and mixing said combustion gas with liquid water having solids and organics so as to transfer said liquid water from a liquid phase to a gas phase is located in an integrated combustion and direct contact steam generator reactor, wherein most water evaporates to steam.

9. The method of steam generation of claim 1, wherein the step of mixing said combustion gas is located in a direct contact steam generator reactor, wherein most water evaporates during conversion to steam, said direct contact steam generator reactor comprising a horizontal rotating reactor, a fluidized bed reactor, or an up-flow reactor to generate a stream of gas and solids.

10. The method of steam generation of claim 1, wherein the step of mixing said combustion gas is located in a pressurized spray dryer, consuming contaminated water for conversion to steam.

11. The method of steam generation of claim 1, wherein the combustion gas, after the step of evaporating water to produce de-mineralized water and concentrated brine, is non-condensable combustion gas, said method further comprising:
generating a vacuum with residual pressure of the non-condensable combustion gas to operate the distillation facility before releasing the non-condensable combustion gas to atmosphere.

12. The method of steam generation of claim 11, further comprising:
separating CO2 from the non-condensable combustion gas with a membrane, wherein discharged pressure will be used for the step of separating the gases on the membrane; and
recovering oil with the CO2.

13. The method of claim 1, wherein a distillation facility evaporates water in said step of evaporating water to produce de-mineralized water and concentrated brine, said distillation facility being is comprised of at least one of a group consisting of a Multi Effect Distillation facility, Multi Stage Flashing facility, and Mechanical Vapor Compression.

14. The method of claim 13, where heat transfer in said distillation facility to produce de-mineralized water and concentrated brine, is done in a direct contact heat exchange between liquid water and the gas phase.

15. The method of claim 1, wherein steam from said de-mineralized water for steam generation through non-direct heat exchange, is generated through at least one of a group consisting of a fluidized bed boiler, Once Through Steam Generator, Co-Gen and an industrial steam boiler.

16. The method of claim 1, where the separated solids are mixed with sludge waste to generate a stable solid material that can be disposed in a land-fill and support traffic.

17. The method of claim 1, where the generated steam is injected through an injection well into an underground formation to recover heavy oil.

18. The method of claim 1, further comprising:
flashing solvents with the generated steam in an open oil-sands mine.

19. A method for steam production for heavy oil extraction with zero liquid discharge, said method comprising the steps of:
combusting carbon-based fuel and oxidizing gases to produce combustion heat and gas;
evaporating liquid from a fluid having solids and organics with said combustion heat, said liquid transferring to a gas phase;
separating said solids and said gas phase;
evaporating liquid water to generate de-mineralized water and concentrated brine;
generating steam from said de-mineralized water; and
recovering oil with generated steam.

* * * * *